United States Patent
Rubin et al.

(10) Patent No.: US 11,043,879 B2
(45) Date of Patent: Jun. 22, 2021

(54) ELECTRIC MOTOR WITH FLUX BARRIERS

(71) Applicant: Tau Motors, Inc., San Francisco, CA (US)

(72) Inventors: Matthew J. Rubin, Indianapolis, IN (US); Walter Wesley Pennington, III, San Francisco, CA (US); Gregory Gordon Stevenson, Austin, TX (US); Adam Daniel Ambrecht, Kennesaw, GA (US); Euzeli Cipriano dos Santos, Jr., Zionsville, IN (US)

(73) Assignee: Tau Motors, Inc., San Carlos, CA (US)

( * ) Notice: Subject to any disclaimer, the term of this patent is extended or adjusted under 35 U.S.C. 154(b) by 120 days.

(21) Appl. No.: 16/534,217

(22) Filed: Aug. 7, 2019

(65) Prior Publication Data
US 2020/0052557 A1 Feb. 13, 2020

Related U.S. Application Data

(60) Provisional application No. 62/715,386, filed on Aug. 7, 2018.

(51) Int. Cl.
*H02K 11/028* (2016.01)
*H02K 1/02* (2006.01)
(Continued)

(52) U.S. Cl.
CPC .......... *H02K 11/028* (2013.01); *H02K 1/02* (2013.01); *H02K 1/165* (2013.01); *H02K 1/246* (2013.01);
(Continued)

(58) Field of Classification Search
CPC .......... H02K 1/02; H02K 1/16; H02K 1/165; H02K 1/246; H02K 3/28; H02K 3/50;
(Continued)

(56) References Cited

U.S. PATENT DOCUMENTS

| 2,844,748 A | 7/1958 | Hutchins et al. |
| 3,659,129 A | 4/1972 | Pettersen |

(Continued)

FOREIGN PATENT DOCUMENTS

| DE | 102014007247 | 11/2015 |
| EP | 0736952 | 10/1996 |

OTHER PUBLICATIONS

PCT International Search Report and Written Opinion in International Appln. No. PCT/US2019/045456, dated Nov. 28, 2019, 17 pages.

(Continued)

*Primary Examiner* — Tulsidas C Patel
*Assistant Examiner* — Rashad H Johnson
(74) *Attorney, Agent, or Firm* — Fish & Richardson P.C.

(57) ABSTRACT

An electric motor has a stator defining multiple stator poles with associated electrical windings, and a rotor having multiple rotor poles. The rotor has flux barriers between adjacent rotor poles, the flux barriers each having a material with an electrical conductivity higher than the rotor pole material. The flux barriers are electrically isolated from one another external to the ferromagnetic material. Eddy currents are induced in the flux barrier to cause destructive interference of an impending magnetic field, such that the flux barrier effectively acts to inhibit magnetic flux during motor operation, which in some cases will result in a repulsive force that will act to increase an induced motive force on the rotor poles.

17 Claims, 36 Drawing Sheets

(51) Int. Cl.
   *H02K 1/16*  (2006.01)
   *H02K 1/24*  (2006.01)
   *H02P 23/14* (2006.01)
   *H02K 3/28*  (2006.01)
   *H02P 27/14* (2006.01)
   *H02K 11/30* (2016.01)
   *H02K 3/50*  (2006.01)

(52) U.S. Cl.
   CPC ............... *H02P 23/14* (2013.01); *H02K 3/28* (2013.01); *H02K 3/50* (2013.01); *H02K 11/30* (2016.01); *H02K 2203/09* (2013.01); *H02P 27/14* (2013.01)

(58) Field of Classification Search
   CPC .. H02K 11/0094; H02K 11/028; H02K 11/20; H02K 11/33; H02K 2203/09; H02K 2203/15; H02P 23/14; H02P 27/14
   USPC ... 310/71, 68 D, 216.015, 216.016, 216.017, 310/261.1
   See application file for complete search history.

(56) References Cited

U.S. PATENT DOCUMENTS

| | | |
|---|---|---|
| 4,568,846 A | 2/1986 | Kapadia |
| 5,097,166 A | 3/1992 | Mikulic |
| 5,726,516 A | 3/1998 | Randall |
| 5,949,162 A | 9/1999 | Mishkevich et al. |
| 7,932,658 B2 | 4/2011 | Ionel |
| 9,520,751 B2 | 12/2016 | Raminosoa et al. |
| 2007/0029890 A1 | 2/2007 | Deodhar et al. |
| 2010/0187935 A1 | 7/2010 | Nam et al. |
| 2010/0207480 A1* | 8/2010 | Reutlinger ........... H02K 21/042 310/181 |
| 2014/0028139 A1* | 1/2014 | Hamer ................. H02K 1/2766 310/156.11 |
| 2016/0105062 A1* | 4/2016 | Aoyama ................. H02K 1/24 310/51 |
| 2018/0083500 A1 | 3/2018 | Buttner et al. |
| 2018/0123435 A1 | 5/2018 | Zhang et al. |
| 2018/0337565 A1* | 11/2018 | Reddy ................. H02K 17/165 |
| 2019/0273455 A1* | 9/2019 | Lau ..................... H02M 7/5395 |
| 2020/0021229 A1* | 1/2020 | Said ........................ H02K 3/50 |

OTHER PUBLICATIONS

PCT International Preliminary Report on Patentability Ch. II in International Appln. No. PCT/US2019/045456, dated Nov. 13, 2020, 21 pages.

Wikipedia.org [online], "Reluctance motor," Apr. 14, 2018, [Retrieved on Dec. 2, 2020], retrieved from: URL<https://en.wikipedia.org/w/index.php?title=Reluctance_motor&oldid=836378270>, 3 pages.

PCT Second Written Opinion in International Appln. No. PCT/US2019/045456, dated Jul. 24, 2020, 9 pages.

* cited by examiner

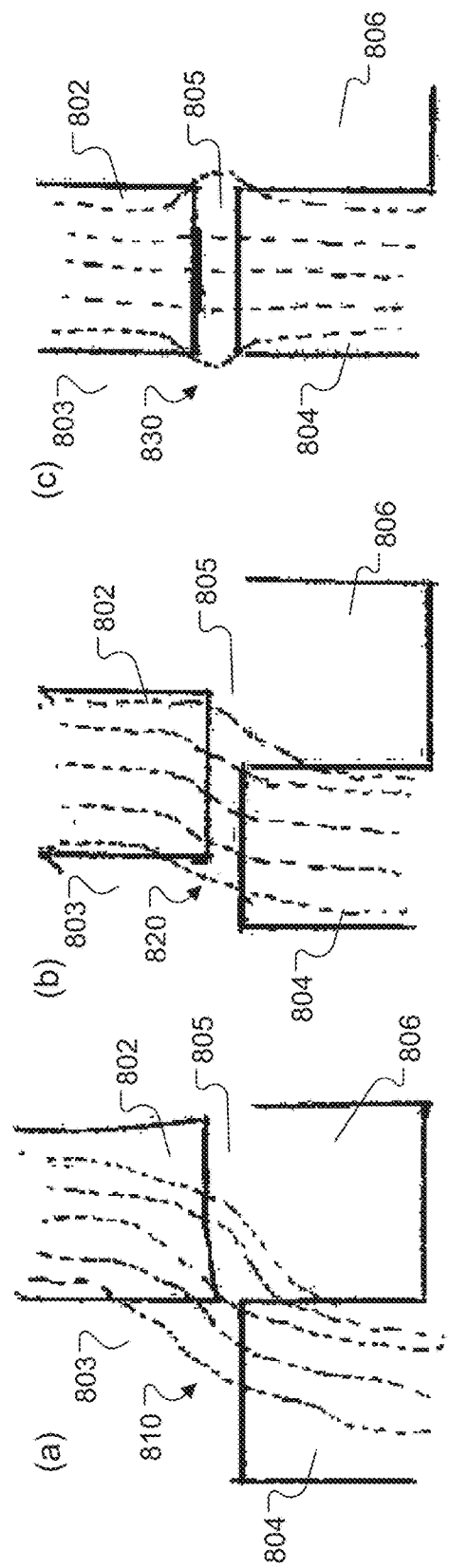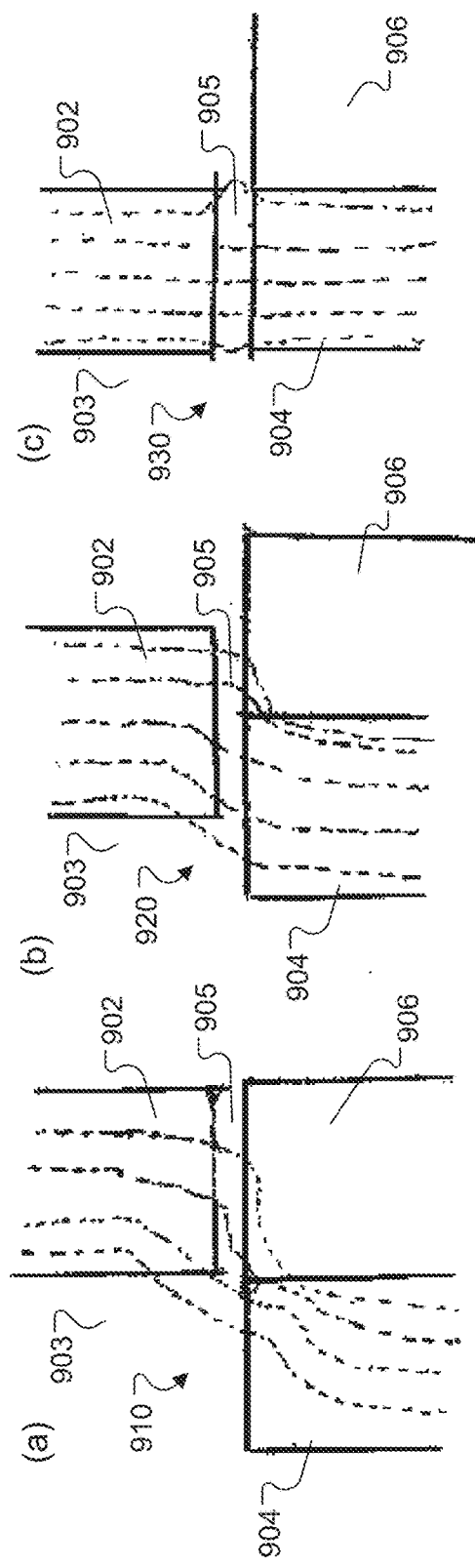

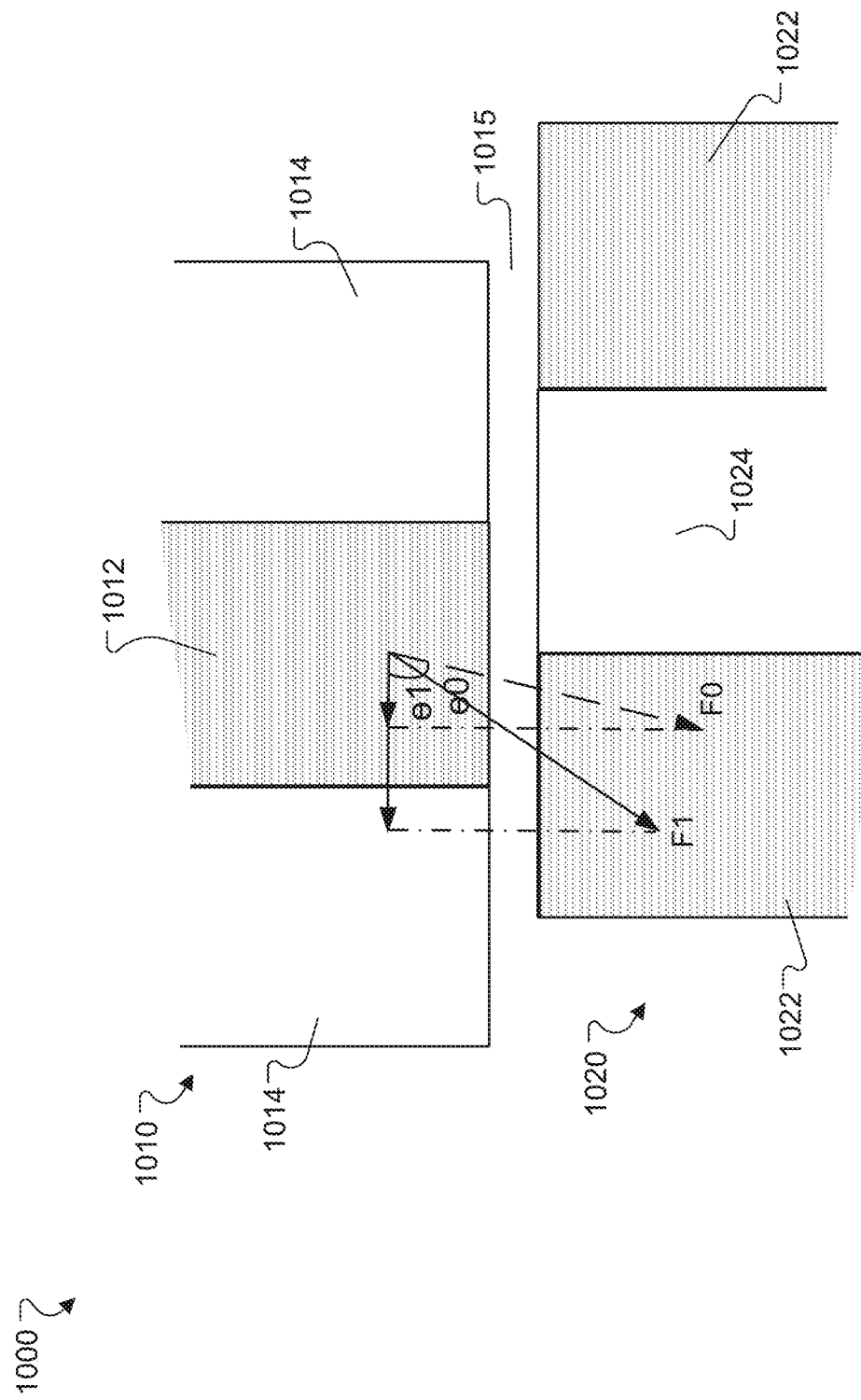

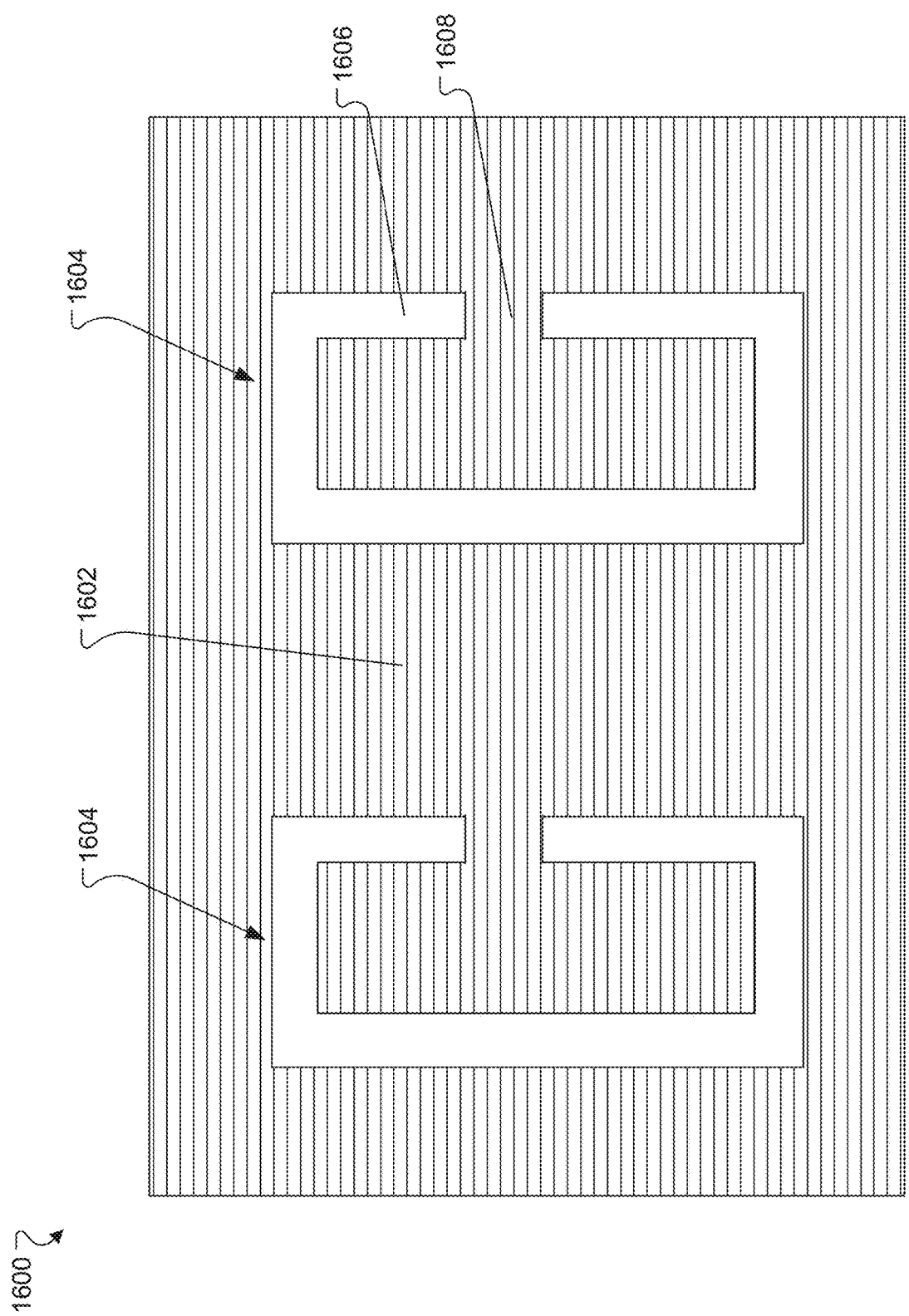

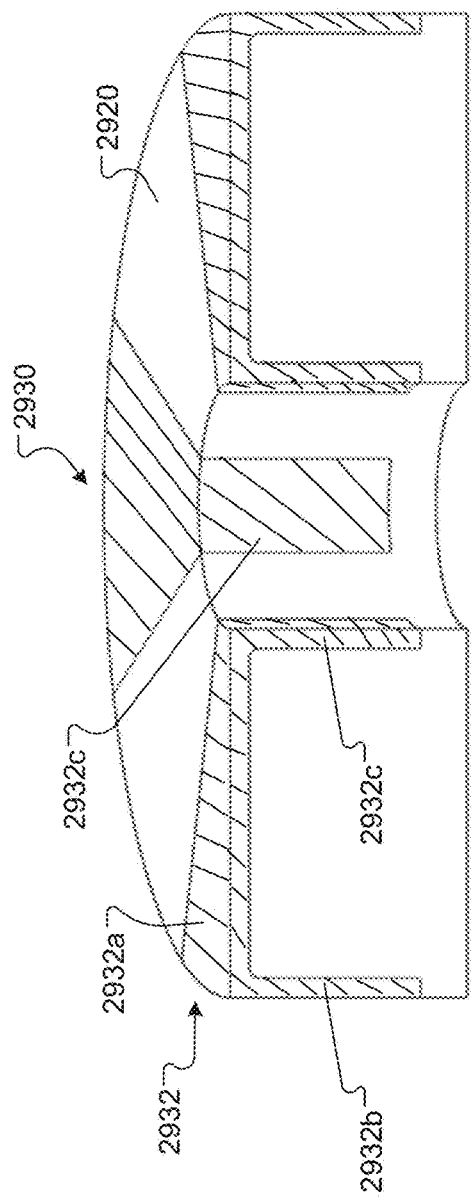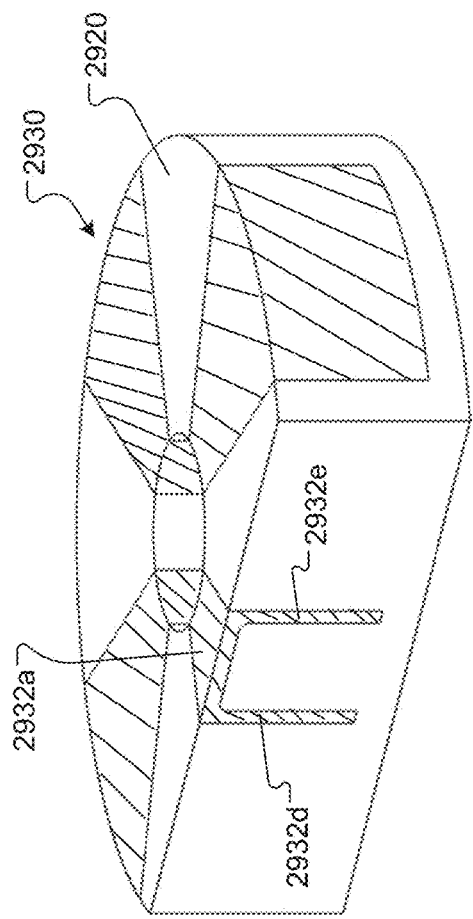

ELECTRIC MOTOR WITH FLUX BARRIERS

TECHNICAL FIELD

This invention relates to electric motors and operation of such motors.

BACKGROUND

Two of the ways in which the performance of electric motors may be characterized is by their torque/force and their output power. The output power of a rotary motor is a product of a torque that a motor generates and an angular velocity of its output shaft. For a linear motor, the output power is a product of linear force and speed. Conventionally, there are two primary means to directly increase the motor performance: (1) by increasing the size of the motor and (2) by creating a stronger magnetic field within the motor itself. While the ultimate size of a motor limits its specific useful applications, increasing the magnetic field to thereby increase the electromagnetic force may be considered as a key to enable greater motor performance and further broader applications of motor technology. There is a need for new motor designs that offer acceptably high performance to enable direct drive applications in a compact package, e.g., high torque/force and power densities.

SUMMARY

Various aspects of the invention feature a motor with flux barriers disposed between passive poles to alter the path of magnetic flux to provide a greater component of magnetically induced motive force aligned with movement direction (to provide useful torque and/or linear force).

According to one aspect of the invention, an electric motor has a stator defining multiple stator poles with associated electrical windings, and a rotor having multiple rotor poles. The rotor is movable with respect to the stator and defines, together with the stator, a nominal gap between the stator poles and the rotor poles. The rotor poles are of a stack of layers of ferromagnetic material separated from one another, at least at a surface of the rotor, by interfaces less electrically conductive than the ferromagnetic material. The rotor has flux barriers between adjacent rotor poles, the flux barriers each having a material with an electrical conductivity higher than the ferromagnetic material. The flux barriers are electrically isolated from one another external to the ferromagnetic material.

As used herein, the term "electric motor" also includes electric generators that generate electrical power from mechanical power.

By 'nominal gap' we mean a gap between relatively moving surfaces of the stator (or active magnetic component) and rotor (or passive magnetic component) poles, across which gap magnetic flux extends during motor operation to induce a force on the rotor (or passive magnetic component). We use the term 'active magnetic component' to refer to that portion of a motor that includes electrical windings associated with respective magnetically permeable structures in which magnetic flux is generated by current flowing in the windings. The poles of an 'active magnetic component' are referred to as 'active poles'. The electrical windings will generally be held in fixed relation to corresponding active poles. A wound stator is an example of an active magnetic component. We use the term 'passive magnetic component' to refer to that portion of the motor upon which a motive force is induced by magnetic flux generated by the active magnetic component, to extend into the passive magnetic component across the nominal gap. The poles of a 'passive magnetic component' are referred to as 'passive poles'. A non-wound rotor is an example of a passive magnetic component. The nominal gap may be radial, as in a radial gap motor, or axial, as in an axial gap motor, for example, and may be filled with air or other gas, or even a liquid, such as a coolant.

By 'flux barrier' we mean structure that defines at least one electrically conductive path in which a flow of current is induced by a changing magnetic field. Generally, eddy currents will be induced in the flux barrier that cause destructive interference of an impending magnetic field, such that the flux barrier effectively acts to inhibit a change in magnetic flux during motor operation, which in some cases will result in a repulsive force that will act to increase an induced motive force on the passive poles.

By 'electrical conductivity' we mean the propensity of a material to conduct electricity. With respect to structures in which current is constrained to flow in a principal direction, such as a wire, we mean the conductivity in that principal direction.

By 'electrically isolated from one another' we mean that the ohmic resistance to an electric potential within a flux barrier is at least 10 times less than the ohmic resistance between flux barriers. To say that they are isolated from one another external to the ferromagnetic material does not preclude that they are in electrical communication through the ferromagnetic material of the layers. In fact, in many cases the flux barriers are electrically connected through the ferromagnetic material.

In some embodiments, at least some of the flux barriers each comprises an electrically conductive bar crossing multiple interfaces of the stack.

By 'electrically conductive' we mean that a material or structure is at least as conductive as amorphous carbon at typical motor operating voltages, or has a conductivity greater than 1000 Siemens per meter. Examples of electrically conductive materials include silver, copper, aluminum, nickel, iron, and electrical steel (grain oriented or otherwise). Examples of non-conductive materials include non-filled resins, air, wood and cotton. We use the term 'insulator material' to refer to materials that are non-conductive or not electrically conductive.

In some examples, the electrically conductive bar contains at least 20 percent, in some cases 40 percent, or in some cases 60 percent, by mass fraction, of an element, or combination of elements, selected from the group consisting of iron, nickel and cobalt. In some cases, each of the flux barriers having an electrically conductive bar also has an electrically conductive layer of a different material than the bar and at least partially forming an outer surface of the rotor.

In some configurations, the bar contains at least one percent, in some cases five percent, or in some cases 15 percent by mass fraction, of an element selected from the group consisting of copper, aluminum, brass, silver, zinc, gold, pyrolytic graphite, bismuth, graphene, and carbon-nanotubes.

The bar may have, or consist of, discrete layers extending parallel to the nominal gap and forming interlayer interfaces of differing materials. In some cases, one of the differing materials includes or consists essentially of copper, and another of the differing materials includes or consists essentially of nickel.

In many instances, the bar has an exposed surface facing the nominal gap.

In some motors, each of the flux barriers having an electrically conductive bar includes at least two electrically conductive bars electrically connected to each other at opposite ends of the stack to form a conductive loop.

In some embodiments, at least some of the flux barriers each has a shape, in cross-section taken parallel to the ferromagnetic material layers of the stack, that includes two spaced apart projections extending away from the nominal gap, and a surface layer connecting the two projections. The two projections may be disposed, for example, on opposite sides of a portion of the stack of ferromagnetic material layers.

In some embodiments, at least some of the flux barriers each has an electrically conductive layer of finite width (in a direction of relative motion between the rotor and stator), and of finite thickness (perpendicular to the nominal gap), crossing multiple interfaces of the stack and having an exposed surface forming a surface of the rotor at the gap.

By 'finite width' we mean that the layer has opposite edges and does not, for example, extend around an entire circumference of the rotor (or along an entire length of a linear passive magnetic component).

Similarly, by 'finite thickness' we mean that the layer extends to a limited depth and does not, for example, extend entirely through the rotor.

In some cases, the width of the layer is more than two times, in some cases more than five times, and in some cases more than 10 times the thickness of the layer.

In some motors, the layer is formed of a material having an electrical current skin depth, at motor operating conditions, greater than the layer thickness.

By 'electrical current skin depth' we mean the depth from the surface of a conductor at which electric current mainly flows, particularly eddy current induced from a magnetic field changing at a given frequency. For a given material, skin depth can be calculated as:

$$\delta \approx 1/\sqrt{\pi f \mu \sigma}$$

'f' is the magnetic switching frequency, $\mu$ is the magnetic permeability (in H/mm) of the material, and $\sigma$ is the electrical conductivity (in % AICS) of the material.

By 'magnetic permeability' we generally mean the ability for a material to support the formation of a magnetic field. The magnetic permeability of a material can be determined in accordance with ASTM A772. When we say that a material is 'magnetically permeable' we mean that it has a magnetic permeability of at least $1.3 \times 10^{-6}$ Henries per meter.

In some examples, the layer is disposed within a channel defined by the ferromagnetic material and may be in electrical contact with the ferromagnetic material of multiple, or all of the, plates.

In some cases, the nominal gap is thinner at the layer than adjacent the layer.

In some embodiments, each flux barrier includes an electrically conductive material forming a loop about a core of a core material more magnetically permeable (i.e., that has a greater magnetic permeability) than the electrically conductive material. In some cases, the core material is also ferromagnetic. For example, the core material and the ferromagnetic material of the rotor poles may both form contiguous portions of the laminated stack of plates.

In some arrangements, the loop forms a portion of an outer surface of the rotor bounding the nominal gap. The core may form a portion of the outer surface of the rotor surrounded by the loop.

In some cases, the loop is disposed beneath a surface of the rotor bounding the nominal gap and including edges of the layers of ferromagnetic material.

In some motors, the loop defines a capacitance, which may be formed at a discrete location along the loop, such as by a non-conductive break in the loop.

The loop preferably has a resonant frequency in a transmissible range of the ferromagnetic material.

By 'transmissible range' we mean the frequency range over which the magnetic permeability depreciates by no more than 10 db relative to the permeability at 60 hz, as measured under static frequency conditions (e.g., with permeability measurements for a given frequency taken over at least 5 cycles of the applied field).

In many motors, the interfaces between the layers of the stack consist of oxidized surfaces of the ferromagnetic material. In some other motors, the interfaces include sheets of insulator material, such as sheets of resin film, interleaved with the ferromagnetic layers.

In many embodiments, the rotor is disposed within the stator. In some other embodiments, the rotor poles are disposed outboard of the stator poles.

In some motors, the nominal gap is a radial gap at least partially bounded by a radially outer surface of the rotor. In some other motors, the nominal gap is an axial gap perpendicular to a rotational axis of the rotor.

In some motors, each rotor pole (and/or each stator pole) has multiple teeth defining recesses therebetween.

In some embodiments, each stator pole has flux shields extending along opposite edges of the stator pole and formed of a material having a greater electrical conductivity than material of the stator pole disposed between the flux shields.

According to another aspect of the invention, an electric motor includes an active magnetic component having a first surface defining multiple active poles with associated electrical windings, and a passive magnetic component having a second surface movable with respect to the first surface in a first direction and spaced from the first surface to define a gap. The second surface forms a series of spaced-apart passive poles of a first material defining slots therebetween, the slots extending at a non-zero angle to the first direction. Each slot contains a respective flux barrier including a second material extending along the slot and forming an electrically conductive path along the slot. The flux barriers are secured to the first material within the slots and are connected to each other only through the first material.

In some embodiments, the slots extend perpendicular to the first direction (i.e., the non-zero angle is 90 degrees).

In some cases the flux barriers fill the slots.

In some motors, the flux barriers are in contact (preferably, electrical contact) with the first material on opposite sides of the slots.

In some configurations, the flux barriers have exposed surfaces forming portions of the second surface.

In some motors, the passive poles include edge surface regions of a stack of plates stacked such that the slots cross several plates of the stack. Preferably, the second material of each flux barrier crosses several plates of the stack, and/or is in direct contact with each of the plates of the stack.

The second material preferably has a greater electrical conductivity than the first material.

In some examples, each of the flux barriers consists essentially of the second material.

In some cases, the second material contains at least 20 percent, in some cases 40 percent, or in some cases 60 percent, by mass fraction, of an element, or combination of elements, selected from the group consisting of iron, nickel and cobalt.

In some examples, each of the flux barriers includes an electrically conductive layer of the second material, and an electrically conductive layer of a third material at least partially forming an outer surface of the rotor.

In some embodiments, the second material contains at least one percent, in some cases five percent, or in some cases 15 percent, by mass fraction, of an element selected from the group consisting of copper, aluminum, brass, silver, zinc, gold, pyrolytic graphite, bismuth, graphene, and carbon-nanotubes.

In some arrangements, each flux barrier includes multiple, discrete layers extending parallel to the nominal gap and forming interlayer interfaces of differing materials. In some examples, one of the differing materials includes or is copper and another of the differing materials includes or is nickel.

In some embodiments, at least some of the flux barriers each has a cross-sectional shape that includes two spaced apart projections extending away from the nominal gap, and a surface layer connecting the two projections. In some cases, the flux barriers having the cross-sectional shape each further includes magnetically permeable material disposed between the two projections and under the surface layer.

In some cases, the second material of each flux barrier forms an electrically conductive loop about a respective core of a core material more magnetically permeable than the second material. The core material may be ferromagnetic. In some configurations, the core material and the first material form contiguous portions of a single stack of plates.

In some examples, the loop forms a portion of an outer surface of the rotor bounding the nominal gap. For example, the core may form a portion of the outer surface of the rotor surrounded by the loop.

In some motors, the loop is disposed beneath a surface of the passive magnetic component bounding the nominal gap and formed of the first material.

In some motors, the loop defines a capacitance, which may be formed at a discrete location along the loop, such as by a non-conductive break in the loop.

The loop preferably has a resonant frequency in a transmissible range of the first material.

In some embodiments, the active magnetic component is a stator of the motor, and the passive magnetic component is a rotor of the motor. In some examples, the nominal gap is a radial gap at least partially bounded by a radially outer surface of the rotor. In some other examples, the nominal gap is an axial gap perpendicular to a rotational axis of the rotor.

In some cases, each passive pole and/or each active pole has multiple teeth defining recesses therebetween.

In some cases, each active pole has flux shields extending along opposite edges of the pole and formed of a material having a greater electrical conductivity than material of the stator pole disposed between the flux shields.

In some examples, the motor is a linear motor.

According to another aspect of the invention, an electric motor includes an active magnetic component defining multiple active poles with associated electrical windings, and a passive magnetic component movable with respect to the active magnetic component and having multiple passive poles of magnetically permeable pole material. The active and passive magnetic components define therebetween a nominal magnetic gap between the active poles and the passive poles. The passive magnetic component has flux barriers connecting adjacent passive poles of the passive magnetic component, the flux barriers each including an electrically conductive material differing from the magnetically permeable pole material and defining at least one electrically conductive path about magnetically permeable core material. The flux barriers are electrically isolated from one another external to the pole material, and adjacent flux barriers are arranged such that any conductive path defined within the electrically conductive material of one flux barrier does not encircle any portion of any conductive path defined within the electrically conductive material of another flux barrier.

Preferably, the core material is more magnetically permeable than the electrically conductive material.

In some cases, the core material and pole material have identical material properties.

In some examples, the flux barriers extend into adjacent pole pairs.

In some motors, the flux barriers each include at least one loop of the electrically conductive material spanning a magnetically active extent of the passive magnetic component. In some cases, each flux barrier has multiple loops of electrically conductive material each isolated from one another external to the pole material and core material.

In some embodiments, each flux barrier contains at least 20 percent, in some cases 40 percent, or in some cases 60 percent, by mass fraction, of an element, or combination of elements, selected from the group consisting of iron, nickel and cobalt.

In some cases, each flux barrier contains at least one percent, in some cases five percent, or in some cases 15 percent, by mass fraction, of an element selected from the group consisting of copper, aluminum, brass, silver, zinc, gold, pyrolytic graphite, bismuth, graphene, and carbon-nanotubes.

In some examples, the core material is ferromagnetic. In some arrangements, the core material and pole material comprise contiguous portions of a single stack of plates.

The loop, in some motors, forms a portion of an outer surface of the passive magnetic component bounding the nominal gap. The core may form a portion of the outer surface of the passive magnetic component surrounded by the loop.

The loop may be disposed beneath a surface of the passive magnetic component bounding the nominal gap and formed of a first material.

In some cases, the loop defines a capacitance, such as a capacitance formed at a discrete location along the loop.

Preferably, the loop has a resonant frequency in a transmissible range of the first material.

In some embodiments, at least some of the flux barriers each has an electrically conductive layer of finite width (in a direction of relative motion between the passive and active magnetic components), and of finite thickness (perpendicular to the nominal gap), crossing multiple interfaces of the stack and having an exposed surface forming a surface of the passive magnetic component at the gap.

In some applications, the width of the layer is more than two times, in some cases more than five times, in some cases more than 10 times the thickness of the layer.

In some cases, the layer is formed of a material having an electrical current skin depth greater than the layer thickness.

The layer may be disposed within a channel defined by the first material.

In some cases, the nominal gap is thinner at the layer than adjacent the layer.

In some motors, the active magnetic component is a stator of the motor, and the passive magnetic component is a rotor of the motor. The nominal gap may be a radial gap at least partially bounded by a radially outer surface of the rotor, or an axial gap perpendicular to a rotational axis of the rotor.

In some embodiments, each passive magnetic component pole and/or each active magnetic component pole has multiple teeth defining recesses therebetween.

In some examples, each active magnetic component pole has flux shields extending along opposite edges of the pole and formed of a material having a greater electrical conductivity than material of the active magnetic component pole disposed between the flux shields.

In some cases, the motor is a linear motor.

According to another aspect of the invention, an electric motor includes an active magnetic component having a first surface defining multiple active poles with associated electrical windings, and a passive magnetic component having a second surface movable with respect to the first surface and spaced from the first surface to define a gap. The second surface has a series of spaced-apart pole surface regions of a first material, separated by inter-pole surface regions of the second surface. The passive magnetic component includes magnetically permeable material defining internal paths connecting respective adjacent pairs of the pole surface regions on opposite sides of respective inter-pole surface regions, which include an electrically conductive, low energy product second material and are each electrically isolated from one another external to the magnetically permeable material.

By 'low energy product' we mean a material that has an energy product (B×H) that is less than 100 kilo-Joules per cubic meter. Energy product is also understood to be the product of remanence and coercive force. Generally, permanent magnet materials used in PM motors do not have low energy products.

In some embodiments, the magnetically permeable material forms a stack of layers of ferromagnetic material separated from one another, at least at the pole surface regions, by interfaces less electrically conductive than the ferromagnetic material.

In some examples, the passive magnetic component includes bars of a third material, each bar underlying a respective inter-pole surface region within the passive magnetic component and extending across the current-inhibiting interfaces. The third material may be or include, for example, iron, nickel and cobalt. Preferably, the third material has a higher magnetic permeability than the second material.

In some configurations, the second material extends between one side of the bar and edges of the layers of ferromagnetic material.

In some motors, the second material has a magnetic permeability lower than that of the first material.

In some embodiments, the second material of at least one of the inter-pole surface regions extends into the passive magnetic component to an overall depth, from the second surface, of between about 1 and 50 mm, in some cases between 2 and 25 mm, or in some cases between 5 and 15 mm.

In some arrangements, the second material of at least one of the inter-pole surface regions has an extent in the first direction and extends into the passive magnetic component to an overall depth, from the second surface, that is between 2 and 2000 percent (or in some cases between 5 and 500 percent, or in some cases between 10 and 200 percent) of that extent.

In some cases, the second surface is movable with respect to the first surface along a first direction, and the inter-pole surface regions are continuous in a second direction, perpendicular to the first direction, across an entire magnetically active extent of the pole surface regions.

In some motors, the magnetically permeable material forms a stack of layers of ferromagnetic material, each layer extending in the first direction.

In some cases, the second material includes, or essentially consists of, copper.

In some motors, the passive magnetic component is a rotor and the active magnetic component is a stator. The inter-pole surface regions and pole surface regions may together form a cylindrical surface of the rotor, for example, with the gap being a radial gap between the rotor and stator. Or the inter-pole surface regions and pole surface regions may together form an end surface of the rotor, with the gap being an axial gap between the rotor and stator. In some cases, the end surface is perpendicular to an axis of rotation of the rotor.

In some embodiments, the inter-pole surface regions each further include magnetically permeable core material surrounded by the second material. In some cases, the core material is the same material as the first material.

In some examples, the pole surface regions of the second surface define slots therebetween, and the inter-pole surface regions of the second surface are formed by the second material disposed within the slots. Preferably, the slots extend at a non-zero angle (such as 90 degrees) to a direction of relative motion between the first and second surfaces. In some cases, the second material is secured to the first material within the slots. In some examples, the slots are filled with second material, and/or the second material is in contact with the first material on opposite sides of the slots.

In some examples, the pole surface regions include edge surface regions of a stack of plates stacked such that the slots cross several plates of the stack. Preferably, the second material in each slot crosses several plates of the stack, and/or is in direct contact with each of the plates of the stack.

The second material preferably has a greater electrical conductivity than the first material.

In some motors, each of the inter-pole surface regions consists essentially of the second material.

The second material contains, in some examples, 20 percent, in some cases 40 percent, or in some cases 60 percent, by mass fraction, of an element, or combination of elements, selected from the group consisting of iron, nickel and cobalt.

In some examples, the second material contains at least one percent, in some cases five percent, or in some cases 15 percent, by mass fraction, of an element selected from the group consisting of copper, aluminum, brass, silver, zinc, gold, pyrolytic graphite, bismuth, graphene, and carbon-nanotubes.

In some embodiments, the inter-pole surface regions include surfaces of flux barriers disposed between the pole surface regions.

In some cases, each flux barrier has discrete layers extending parallel to the nominal gap and forming interlayer interfaces of differing materials, such as copper and nickel.

In some examples, at least some of the flux barriers each has a cross-sectional shape that includes two spaced apart projections extending away from the nominal gap, and a surface layer connecting the two projections, such as with magnetically permeable material disposed between the two projections and under the surface layer.

In some configurations, the second material of each inter-pole surface region forms an electrically conductive loop about a respective core of a core material more magnetically permeable than the second material. In some cases, the core material is ferromagnetic. In some cases, the core material and the first material are contiguous portions of a single stack of plates. In some examples, the core forms a portion of the second surface surrounded by the loop. The loop may be spaced from the second surface, and/or may define a capacitance, such as a capacitance is formed at a discrete location along the loop. Preferably, the loop has a resonant frequency in a transmissible range of the first material.

In some motors, each pole surface region (and/or each pole of the active magnetic component) has multiple teeth defining recesses therebetween.

In some examples, each pole of the active magnetic component has flux shields extending along opposite edges of the pole and formed of a material having a greater electrical conductivity than material of the pole of the active magnetic component disposed between the flux shields.

In some cases, the motor is a linear motor.

According to another aspect of the invention, an electric drive system includes a reluctance motor and a motor controller. The reluctance motor includes an active magnetic component defining multiple active poles with associated electrical windings, and a passive magnetic component having multiple passive poles and movable with respect to the active magnetic component and defining, together with the active magnetic component, a nominal gap between the active poles and the passive poles. The motor controller has multiple switches coupled to respective electrical windings or sets of windings of the active magnetic component, and is configured to (a) sequentially operate the switches for respective pole energization duty cycles to generate magnetic flux across the nominal gap between the active poles and passive poles; and (b) during an energization duty cycle of each active pole, to pulse current through the winding of the active pole, including a sequence of at least three pulses during which sequence windings of adjacent active poles are not energized. The electrical windings of the motor are configured such that a ratio of maximum and minimum current through the winding of an energized active pole during current pulsing is at least 4:1.

In some embodiments, the motor controller is configured to pulse current during the energization duty cycle of each active pole at a pulse frequency of between 2 Hz and 1 MHz, in some cases between 10 Hz and 20 kHz, and in some cases between 100 Hz and 5 kHz.

In some examples, the motor controller is configured to maintain pulse frequency during motor speed changes, up to at least a motor speed at which an energization duty cycle frequency for each active pole is at least one-half the pulse frequency.

For some applications, the motor controller is configured to pulse current only below a motor speed corresponding to one pulse per energization duty cycle.

In some cases, at least one of the electrical windings has multiple coils conductively connected in parallel and wound about a common core.

In some cases, at least one of the electrical windings is a winding of braided wire.

In some embodiments, the active magnetic component is a stator and the passive magnetic component is a rotor movable with respect to the stator by rotation about a rotor axis. The rotor may be disposed within the stator. The nominal gap may be a radial gap at least partially bounded by a radially outer surface of the rotor, or an axial gap perpendicular to the rotor axis, for example.

In some examples, the passive magnetic component further includes flux barriers between adjacent passive poles, the flux barriers each having an electrical conductivity higher than the passive poles. The flux barriers are electrically isolated from one another external to the passive poles.

In some cases, the passive poles are formed by a stack of layers of magnetically permeable material. At least some of the flux barriers may each include an electrically conductive bar crossing multiple layers of the stack. In some cases, the bar contains at least 20 percent, in some cases 40 percent, or in some cases 60 percent, by mass fraction, of an element, or combination of elements, selected from the group consisting of iron, nickel and cobalt. Each of the flux barriers with an electrically conductive bar may further include an electrically conductive layer of a different material than the bar and at least partially forming an outer surface of the passive magnetic component. In some examples, the bar contains at least one percent, in some cases five percent, or in some cases 15 percent, by mass fraction, of an element selected from the group consisting of copper, aluminum, brass, silver, zinc, gold, pyrolytic graphite, bismuth, graphene, and carbon-nanotubes. In some configurations, the bar has discrete layers extending parallel to the nominal gap and forming interlayer interfaces of differing materials, such as copper and nickel.

The bar may have an exposed surface facing the nominal gap.

In some cases, each of the flux barriers with an electrically conductive bar includes at least two electrically conductive bars electrically connected to each other at opposite ends of the stack to form a conductive loop.

In some embodiments, at least some of the flux barriers each has a shape, in cross-section taken parallel to the layers of the stack, that includes two spaced apart projections extending away from the nominal gap, and a surface layer connecting the two projections. The two projections may be disposed on opposite sides of a portion of the stack.

In some configurations, at least some of the flux barriers each includes an electrically conductive layer of finite width in a direction of relative motion between the passive magnetic component and the active magnetic component, and of finite thickness perpendicular to the nominal gap, crossing multiple layers of the stack and having an exposed surface forming a surface of the passive magnetic component at the gap. In some applications, the width of the layer is more than two times, in some cases more than five times, and in some cases more than 10 times the thickness of the layer.

The layer may be formed of a material having an electrical current skin depth greater than the layer thickness, and/or may be disposed within a channel defined by the magnetically permeable material. In some cases, the nominal gap is thinner at the layer than adjacent the layer.

In some embodiments, each flux barrier includes an electrically conductive material forming a loop about a core of a core material more magnetically permeable than the electrically conductive material. The core material may be ferromagnetic, and/or the core material and the magnetically permeable material of the passive poles may be contiguous portions of the laminated stack of plates.

In some cases, the loop forms a portion of an outer surface of the passive magnetic component bounding the nominal gap.

In some cases, the core forms a portion of the outer surface of the passive magnetic component surrounded by the loop.

The loop may be disposed beneath a surface of the passive magnetic component bounding the nominal gap and including edges of the layers of the stack.

In some examples, the loop defines a capacitance, such as a capacitance formed at a discrete location along the loop. Preferably, the loop has a resonant frequency in a transmissible range of the magnetically permeable material of the passive poles In some embodiments, the passive magnetic component further includes flux barriers connecting adjacent passive poles of magnetically permeable pole material, the flux barriers each having an electrically conductive material differing from the pole material and defining at least one electrically conductive path about magnetically permeable core material. Preferably, the flux barriers are electrically isolated from one another external to the pole material, and adjacent flux barriers are arranged such that any conductive path defined within the electrically conductive material of one flux barrier does not encircle any portion of any conductive path defined within the electrically conductive material of another flux barrier.

In some cases, each passive pole and/or each active pole has multiple teeth defining recesses therebetween.

In some examples, each active pole has flux shields extending along opposite edges of the active pole and formed of a material having a greater electrical conductivity than material of the active pole disposed between the flux shields.

In some applications, the ratio of maximum and minimum current is at least 7:1. In some instances, the ratio of maximum and minimum current is at least 10:1

Another aspect of the invention features a method of driving an electric motor. The method includes:

(a) energizing a first active pole of a series of active poles disposed along an air gap between the series of active poles and a passive magnetic component having a series of passive poles disposed along the air gap, by pulsing current through an electrical winding associated with the first active pole, including a sequence of at least three pulses during which sequence windings of adjacent active poles of the series of active poles are not energized; and then (b) energizing a second active pole of the series of active poles, by pulsing current through an electrical winding associated with the second active pole, including a sequence of at least three pulses during which sequence the winding of the first active pole is not energized, causing current to pass through the electrical winding associated with the second active pole according to a current waveform in which a ratio of a maximum current to a minimum current during pulsing of current through the electrical winding associated with the second active pole is at least 4:1.

In some examples, energizing the first active pole includes pulsing current at a pulse frequency of between 2 Hz and 1 MHz, in some cases between 10 Hz and 20 kHz, and in some cases between 100 Hz and 5 kHz.

In some cases, energizing the first active pole and then energizing the second active pole generates a first force between the first active pole and a passive pole across the air gap from the first active pole, and a second force between the second active pole and a passive pole across the air gap from the second active pole.

In some instances, the first and second forces induce a relative motion between the active poles and the passive poles. The relative motion may include a motion of the passive magnetic component with respect to the active poles.

In some cases, the passive magnetic component is a rotor of the motor, and the relative motion includes rotation of the rotor.

Some examples of the method also include detecting rotor speed and controlling a frequency of the pulsed current as a function of the detected rotor speed.

Some examples also include maintaining current pulse frequency during rotor speed changes, up to at least a rotor speed at which a frequency at which each active pole is energized is at least one-half the pulse frequency.

In some cases, current is pulsed through the electrical windings associated with the first and second poles only below a rotor speed corresponding to one pulse per pole energization.

In some examples, the method includes, after energizing the second active pole, energizing a third active pole of the series of active poles, disposed on an opposite side of the second active pole than the first active pole, by pulsing current through an electrical winding associated with the third active pole, including a sequence of at least three pulses during which sequence the windings of the first and second active poles are not energized.

In some embodiments the method further includes, after energizing the third active pole, again energizing the first active pole by pulsing current through the electrical winding associated with the first active pole, and then again energizing the second active pole by pulsing current through the electrical winding associated with the second active pole, and then again energizing the third active pole.

In some instances, pulsing current through the electrical winding associated with the first active pole causes current to pass through the electrical winding associated with the first active pole according to a current waveform in which a ratio of a maximum current to a minimum current during pulsing of current through the electrical winding associated with the first active pole is at least 4:1, or in some cases, at least 7:1.

In some examples, pulsing current through the electrical winding associated with the first active pole includes pulsing current through multiple coils conductively connected in parallel and wound about a common core.

In some cases, pulsing current through the electrical winding associated with the first active pole includes operating a first switch to open and close in multiple cycles between a voltage source and the electrical winding associated with the first active pole.

In some embodiments, pulsing current through the electrical winding associated with the first active pole generates eddy current in a first flux barrier adjacent a passive pole across the air gap from the first active pole, the flux barrier having an electrical conductivity higher than the passive pole across the air gap.

In some examples, the passive magnetic component further includes a second flux barrier, with the passive pole across the air gap from the first active pole disposed between the first and second flux barriers, and with the first and second flux barriers electrically isolated from one another external to the passive poles.

In some cases, the passive poles are formed by a stack of layers of magnetically permeable material.

In some instances, the eddy current in the first flux barrier acts to repel magnetic flux from the first active pole.

In some configurations, the first flux barrier is disposed between the passive pole across the air gap from the first active pole and an adjacent passive pole, with the flux barrier forming a conductive loop of an electrically conductive material about a core of a core material more magnetically permeable than the electrically conductive material.

In some embodiments, the passive magnetic component further includes flux barriers between adjacent pairs of passive poles of the series of passive poles, the flux barriers each comprising an electrically conductive material differing from material forming the passive poles and defining at least one electrically conductive path about magnetically permeable core material.

In some cases, the flux barriers are electrically isolated from one another external to the series of passive poles.

Adjacent flux barriers are preferably arranged such that any conductive path defined within the electrically conductive material of one flux barrier does not encircle any portion of any conductive path defined within the electrically conductive material of another flux barrier.

In some examples, the motor has flux shields extending along opposite edges of each active pole and formed of a material having a greater electrical conductivity than material of the active pole disposed between the flux shields. In some cases, the flux shields extend into gaps between adjacent electrical windings. The flux shields may extend from the air gap to a magnetically permeable yoke connecting adjacent active poles, for example.

In some cases, the ratio of maximum and minimum current is at least 7:1, or at least 10:1

Several aspects of the invention feature flux barriers to increase the performance of an electric motor, e.g., in high torque and power densities. The flux barriers have dynamic (or transient) diamagnetic properties. By utilizing the flux barriers in the motor, significant gains in torque can be achieved by directing magnetic flux substantially more tangential, where the magnetic field is altered by redirecting a radial force (or normal force) along the tangential direction. That is, the average force vector during operation is substantially more tangential where the predominant force vector in traditional motor designs is radial in nature.

The magnetic permeability of the flux barriers can be controlled by adjusting a magnetic frequency of eddy currents in the flux barriers, e.g., by pulsing current through electrical windings of active poles. In such a way, the electric motors can have significantly different magnetic properties at different magnetic frequencies: at low frequencies, the properties of the flux barriers are ferromagnetic; at medium to high operational frequencies, the magnetic permeability of the flux barrier can be less than that of air, and the properties of the flux barriers are diamagnetic.

The invention can also create a high reactance circuit where the magnetic field does not permeate through the electromagnetic cycle but is substantially reflected. This can reduce or eliminate flux fringing. Unlike a traditional permanent magnet (PM) motor, substantially zero flux permeates flux barriers in the motors designed according to the invention, which can avoid demagnetization (coercive force) and excessive heat during operation. Moreover, the diamagnetic flux barriers do not produce any field during operation, so they behave unlike PM motors because there is an absence of a field entirely, not a field that exists in a reverse direction that then closes itself.

The invention can be applied to various types of motors to improve their performances. The motors can be radial-gap motors or axial-gap motors or linear motors. The motors can be switched reluctance motors (SRMs), induction motors (IMs), or permanent magnet motors (PMs), for example.

Various examples of the invention disclosed herein can provide particularly high motor performance with significant torque/force and power densities, and can be used to provide essentially smooth and efficient output shaft power for propelling vehicles, as well as in stationary systems. The design concepts can more effectively increase torque and power by increasing the saliency ratio of the motor itself, avoiding some of the traditional trade-offs of harnessing one at the expense of the other. This motor may also obtain higher system efficiency during cycled operation due to the avoidance of magnetic breaking that can occur with permanent magnet motors under passive conditions.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 8A-C illustrate magnetic flux with air between poles at misaligned position (FIG. 8A), half-aligned position (FIG. 8B), and aligned position (FIG. 8C).

FIGS. 9A-C illustrate magnetic flux with flux barriers between poles at misaligned position (FIG. 9A), half-aligned position (FIG. 9B), and aligned position (FIG. 9C).

FIG. 10 illustrates forces with or without flux barriers between adjacent poles.

FIG. 16 is a schematic view of another rotor with flux barriers each made of a shielded pole with a discrete capacitor.

FIG. 26A illustrates a distributed portion of the flux barrier of FIG. 26.

FIGS. 31-32 are open views of the rotor with the shielded poles of FIG. 29.

Like reference symbols in the various drawings indicate like elements.

DETAILED DESCRIPTION

Implementations of the present disclosure provide systems, devices, and methods of using flux barriers to increase performance of electric motors. Various designs/configurations of flux barriers for the motors are presented and discussed. The flux barriers are configured to exhibit diamagnetic properties in operational frequencies, such that magnetic flux through a magnetic gap between active magnetic component (e.g., stator) and passive magnetic component (e.g., rotor) can be concentrated and redirected to be substantially more tangential to thereby increase torque.

Example Electric Drive System

Figure 1:
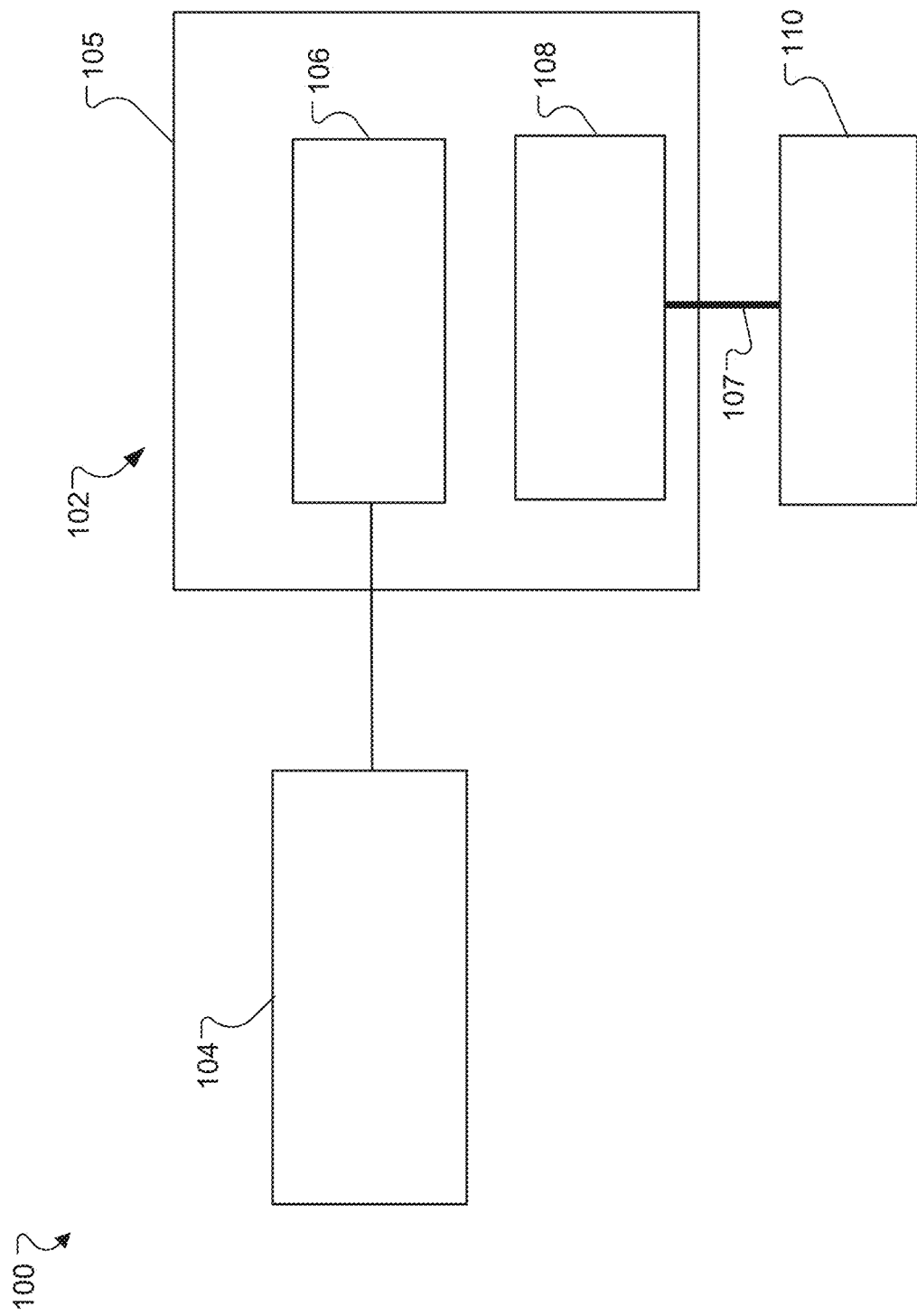
FIG. 1 is a schematic illustration of an example of an electric drive system.

FIG. 1 illustrates an electric drive system 100 that includes an electric motor 102 and a motor controller 104 coupled to the electric motor 102. The motor controller 104 is configured to operate the electric motor 102 to drive a load 110. The load 110 can be an additional gear train such as a planetary gear set or another motor where multiple motors can be linked and operated in parallel.

The electric motor 102 has an output shaft 107 rotatable with respect to a motor housing 105, which is considered to be a datum with respect to rotations and other motions of motor components. In use, the output shaft 107 can be coupled to the load 110 to which the motor 102 can impart rotary power when electrically activated by appropriate electrical power and signals from the motor controller 104. The output shaft 107 may extend through the motor and be exposed at both ends, meaning that rotary power can be transmitted at both ends of the motor. Housing 105 can be rotationally symmetric about the rotation axis of output shaft, but may be of any external shape and can generally include means for securing the housing to other structure to prevent housing rotation during motor operation.

The electric motor 102 includes an active magnetic component 106 such as a stator and a passive magnetic component 108 such as a rotor. For illustration purposes, in the following, stator is used as a representative example of the active magnetic component and rotor is used as a representative example of the passive magnetic component.

The rotor 108 is associated with the stator 106 and can be disposed within the stator 106, e.g., in an internal rotor radial-gap motor, or parallel to the stator, e.g., in an axial-gap motor, or in a linear motor. As described more fully below, electrical activity in the stator 106, properly controlled, drives motion of the rotor 108. The rotor 108 is rotationally coupled to the output shaft 107, such that any rotational component of resultant rotor motion is transmitted to the output shaft 107, causing the output shaft 107 to rotate. The stator 106 is fixed to the motor 102 such that during operation the rotor 108 moves about the stator 106 or parallel to the stator 106.

Figure 2:
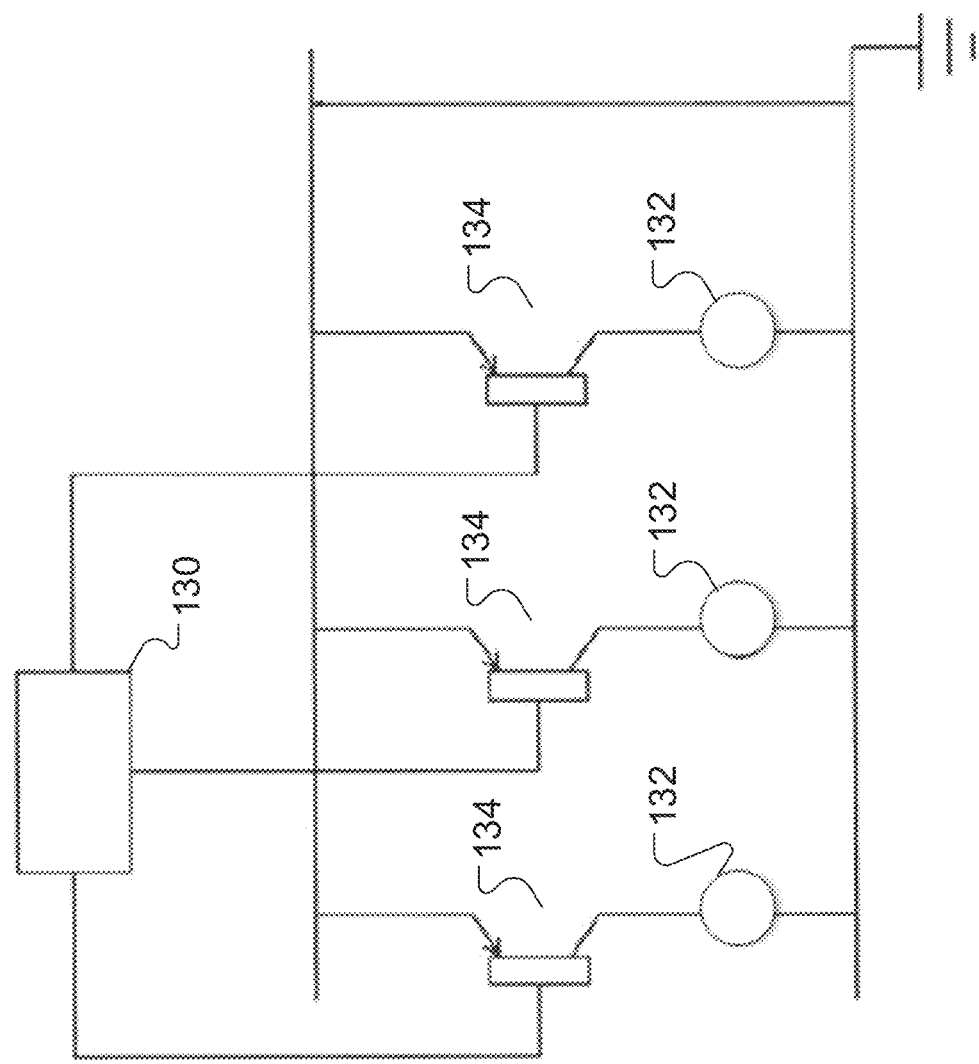
FIG. 2 is a schematic illustration of a motor controller including power switching.
Figure 4:
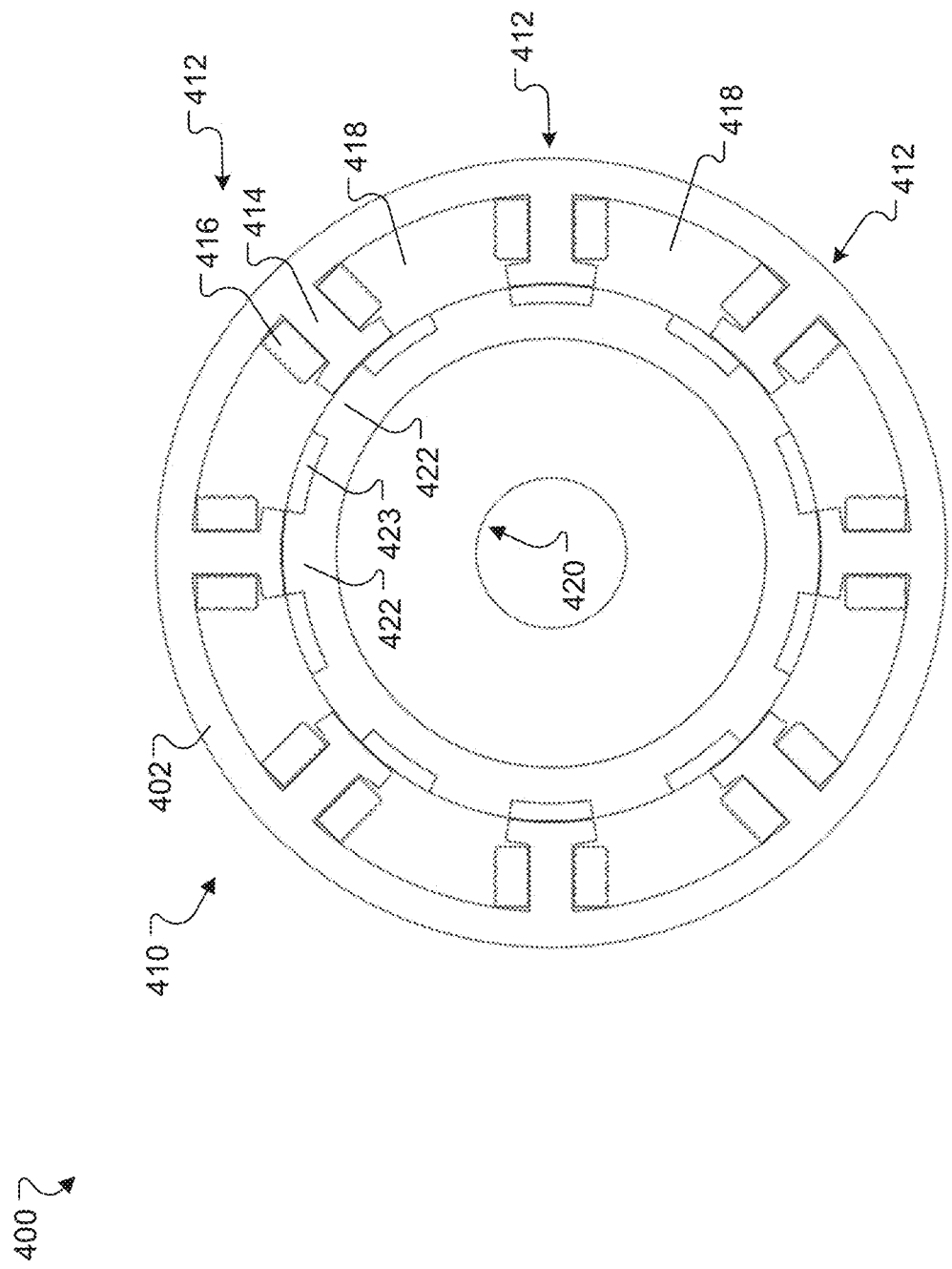
FIG. 4 illustrates a radial-gap motor including a rotor and a stator.

The stator 106 defines multiple stator poles with associated electrical windings and the rotor 108 includes multiple rotor poles, as illustrated with further details in FIG. 4. The rotor 108 defines, together with the stator 106, a nominal air gap between the stator poles and the rotor poles, as illustrated with further details in FIG. 5 below. The rotor 108 is movable with respect to the stator 106 along a motion direction. As illustrated in FIG. 2, the stator 106 has multiple independently activatable windings 132 spaced apart circumferentially about the rotor 108. The multiple adjacent windings 132 of the stator 106 are activatable simultaneously as a winding set, and the stator 106 can include multiple such multi-winding sets spaced about the stator 106. The motor 102 may also include a winding controller 130 with a set of switches 134 operable to activate the windings 132 of the stator 106. The switches 134 can be semiconductor switches, e.g., transistors such as metaloxide-semiconductor field-effect transistors (MOSFETs). The winding controller 130 is coupled to gates of the switches 134 and operable to send a respective control voltage to each switch 134. The control voltage can be a direct current (DC) voltage. The winding controller 130 can be in the motor controller 104.

While only three switches are shown in FIG. 2, it will be understood that the motor controller 104 can have a switch for each stator pole, or multiple switches to energize multiple coils. Adjacent pole pairs may be wired in series via a common switch, but in such cases the instantaneously faster of the two moving rotors can generate a slightly larger counter-electromotive force (EMF) or back-EMF and instantaneously draw more relative electrical power as compared to the slower pole, thereby providing additional acceleration and separation of relative velocities. Higher frequency excitation can decrease effects of low frequency harmonic ripple during operation. The switches 134 can be wired in parallel to balance relative speed between multiple rotors in a nested configuration by using parallel inductive load reactors. In certain embodiments with nested rotor configurations, individual rotors in the system can be driven individually and any harmonic frequency may be bypassed from one rotor to another by decreasing the loading on a given rotor. In other embodiments, rotors can be nested as pairs to balance the force between an inner and outer ring locally.

FIG. 2B shows another example power switch 200 for an individual electrical winding 132. The power switch 200 can have an H-bridge circuit including four switching elements 202a, 202b, 202c, 202d, with the electrical winding 132 at the center, in an H-like configuration. The switching elements 202a, 202b, 202c, 202d can be bi-polar or FET transistors. Each switching element 202a, 202b, 202c, 202d can be coupled with a respective diode D1, D2, D3, D4. The diodes are called catch diodes and can be of a Schottky type. The top-end of the bridge is connected to a power supply, e.g., a battery $V_{bat}$, and the bottom-end is grounded. Gates of the switching elements can be coupled to the winding controller 130 which is operable to send a respective control voltage signal to each switching element. The control voltage signal can be a DC voltage signal or an AC (alternating current) voltage signal.

The switching elements can be individually controlled by the controller 130 and can be turned on and off independently. In some cases, if the switching elements 202a and 202d are turned on, the left lead of the stator is connected to the power supply, while the right lead is connected to ground. Current starts flowing through the stator, energizing the electrical winding 132 in a forward direction. In some cases, if the switching elements 202b and 202c are turned on, the right lead of the stator is connected to the power supply, while the left lead is connected to ground. Current starts flowing through the stator, energizing the electrical winding 132 in a reverse, backward direction. That is, by controlling the switching elements, the electrical winding 132 can get energized/activated in either of two directions.

The motor controller 104, e.g., the winding controller 130, can be configured to sequentially operate the switches 134 or 200 for respective pole energization duty cycles to generate magnetic flux across the air gap between the stator poles and rotor poles, as described with further details in FIGS. 8A-8C. The switches can be controlled to sequentially energize stator poles to create a local attraction force pulling on the rotor. Such a sequential energization (or activation) can cause a rotation of the rotor 108, the output shaft 107, and the load 110.

As discussed with further details below, various types and configurations of flux barriers can be implemented in the rotor 108 and/or the stator 106. The flux barriers generally have greater diamagnetic properties than air during operation.

In some examples, a flux barrier is made of a single material, such as aluminum, copper, brass, silver, zinc, gold, pyrolytic graphite, bismuth, graphene, or carbon-nanotubes. In some examples, ferromagnetic combinations of materials, such as copper-iron, nickel-iron, lead-iron, brass-iron, silver-iron, zinc-iron, gold-iron, bismuth-iron, aluminum-iron, pyrolytic graphite-iron, graphene-iron, carbon-nanotubes-iron, or Alinco (aluminum-nickel-cobalt) alloys can be used as a flux barrier, in many cases with an electric conductivity higher than ferromagnetic material (e.g., iron) making up the rotor poles. In some cases, the flux barrier, e.g., made of copper-iron, has an effective magnetic permeability lower than the ferromagnetic material. In some cases, the flux barrier, e.g., made of nickel-iron, has an effective magnetic permeability higher than the ferromagnetic material. In some examples, the flux barrier is constructed as a shielded pole of an electrically conductive material forming a loop about a core of a core material more magnetically permeable than the electrically conductive material. Due to the electrically conductive material of the loop, the shielded pole can also have an effective electric conductivity higher than the core material (which may be, e.g., iron).

Another material property of interest, which we refer to as the EMF Shielding Factor, is the quotient of electrical conductivity and magnetic permeability (e.g., Siemens per Henry). The EMF Shielding Factors of two materials may be determined simultaneously by placing equally sized samples of the materials on a non-conductive support and moving them between two parallel Helmholtz coils with a diameter greater than the samples, such that their primary plane of conduction (e.g., the orientation of the plane as is experienced during operation in a magnetic system) is perpendicular to the magnetic fields produced during excitation of the Helmholtz coils. For a given excitation waveform (e.g., voltage, shape, and frequency) the current of the Helmholtz coils will be proportional to the EMF Shielding Factor of the material between the coils, such that an increase in the EMF Shielding Factor will be observed as an increase in the current during constant excitation.

As noted above and discussed with further details below, the flux barrier is configured to be diamagnetic. The magnetic permeability of the flux barrier can be controlled by adjusting a magnetic frequency through the flux barrier. In such a way, the motor can have significantly different magnetic properties at different magnetic frequency: at low frequencies, the flux barrier may have a magnetic permeability at or near ferromagnetic; at medium to high operational frequencies, the magnetic permeability of the flux barrier is preferably less than that of air, and the properties of the flux barrier are diamagnetic.

As illustrated with further details in FIGS. 9A-9C, implementing the diamagnetic material or structure in the rotor and/or the stator can offer a means to better concentrate magnetic flux during operation of the motor. Specifically, when the stator and rotor poles are positioned in a perfectly unaligned state, significant internal electromagnetic reflection (due to the diamagnetic properties of the flux barrier) significantly inhibits magnetic communication through the flux barrier. The flux shielding can be significantly greater than if the flux barrier were replaced with an air slot between adjacent poles, as in some conventional motors. This diamagnetic shielding causes the flux barriers to effectively push the rotor while the reluctance of the electromagnetic poles pull the rotor. This effect allows more energy per cycle to be produced from the motor system.

Figure 3:
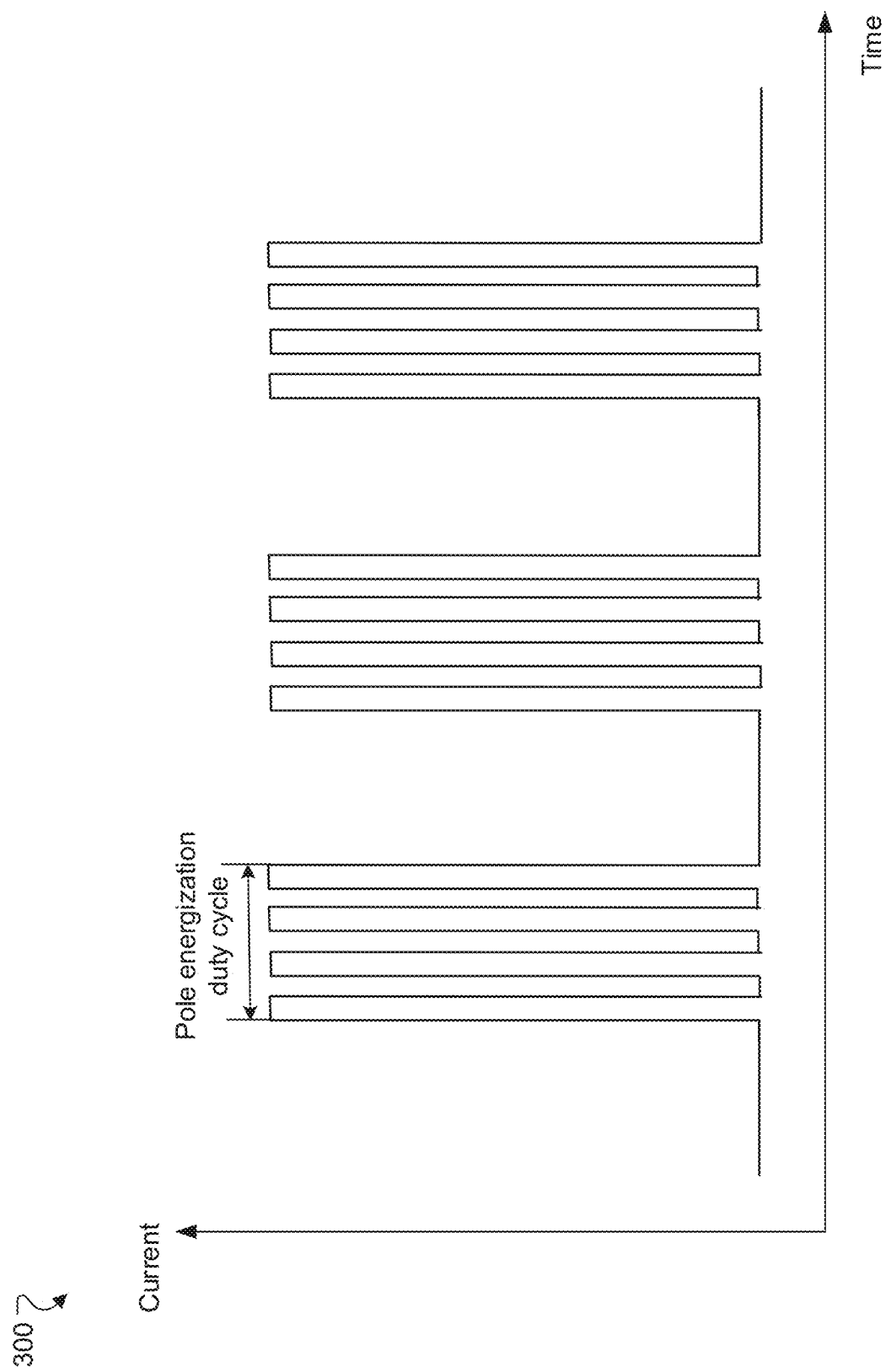
FIG. 3 illustrates a current profile of pole energization duty cycles including pulsed currents in each duty cycle.

To operate the diamagnetic flux barrier under operational frequencies, as illustrated in FIG. 3, during an energization duty cycle of each active pole the motor controller 104 is configured to pulse a current through the winding of the pole at a pulse frequency. Unlike induction motors that pulse each pole once in succession at low speeds, motor controller 104 pulses the current multiple times for a single pole at low speeds. Such multiple pulses to the same pole, before pulsing a subsequent pole, make up one energization duty cycle. In some examples, the motor controller pulses current through the winding of an active pole during an energization duty cycle of the pole, including a sequence of at least 3 pulses, during which sequence the windings of adjacent active poles are not energized. The electrical circuit including the electrical windings of each pole is configured such that a ratio of maximum and minimum current through the winding of an energized pole during current pulsing is at least 4:1, in some cases at least 7:1, or in some cases even at least 10:1. The minimum current through the winding between pulses may be as low as zero.

The pulsed current causes alternating magnetic intensities, e.g., magnetic fields, which induce eddy currents in the diamagnetic flux barrier. For a given flux barrier material, the higher the pulse frequency the greater the eddy current. The induced eddy current generates a secondary magnetic field opposing the applied alternating magnetic field, thereby producing a repelling force. As illustrated with more details in FIGS. 9A-9C and 10, the repelling force can concentrate and redirect the magnetic flux substantially more tangentially along a direction of relative motion between the rotor and the stator, to therefore increase the force available to do work. Also, flux barriers having different materials or designs can have different diamagnetic properties. The higher the diamagnetic property of the flux barrier, the greater the induced eddy current at a given magnetic (pulse) frequency. Thus, the generated horizontal force is with a function of the magnetic frequency and the structure of the flux barrier, as discussed in further detail below with respect to FIG. 20.

The magnetic frequency for the diamagnetic flux barrier (and the generated horizontal force) is determined by the pulse frequency of the current through the winding of the pole during the energization duty cycle for each active pole. The pulse frequency can be, for example, in some cases between 2 Hz and 1 MHz, in some cases between 10 Hz and 20 kHz, and in some cases between 100 Hz and 5 kHz. In some cases, the motor controller is configured to maintain pulse frequency during motor speed changes, up to at least a motor speed at which an energization duty cycle frequency for each active pole is at least one-half the pulse frequency. In some cases, the motor controller is configured to pulse current only below a motor speed corresponding to one pulse per energization duty cycle. In some implementations, at least one of the electrical windings includes multiple coils conductively connected in parallel and wound about a common core. Such electrical winding can have a low reactance, enabling faster decay of current between pulses.

Example Motors

Figure 5:
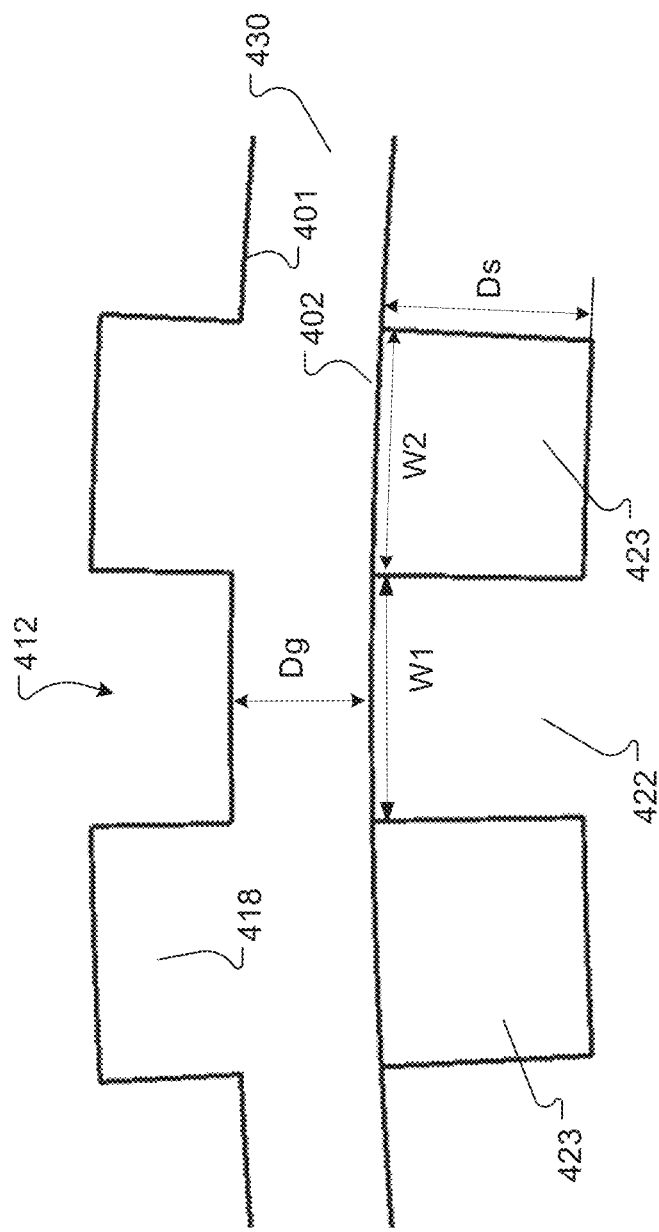
FIG. 5 is an enlarged view of a portion of FIG. 4.

FIG. 4 illustrates an example motor 400 including a stator 410 and a rotor 420. The motor 400, the stator 410, and the rotor 420 can be the electric motor 102, the stator 106, and the rotor 108 of FIG. 1, respectively. The motor 400 is a radial-gap motor such as a switched reluctance motor (SRM), and the rotor 420 is disposed within the stator 410. FIG. 5 is an enlarged view of a portion of FIG. 4.

The stator 410 features a series of circumferentially spaced-apart stator poles 412 each including a stator core 414 and associated electrical windings 416 surrounding the stator core 414. The stator 410 may have, for example, a plurality of stator projections that may protrude from a stator back plate 402 (e.g., a yoke or back iron), thereby creating stator slots 418 and stator cores 414. Between adjacent stator poles 412, there exists a slot 418. The stator cores 414 may be of one continuous material or a combination of discrete components assembled in the motor. While a continuous material may provide greater dimensional consistency with zero air permitted into the stator assembly, a series of discrete stator poles maintained in mechanical alignment by a stator housing may enable efficient manufacturing and assembly. The terminal ends of the stator projections may be diffuse, straight or inferior with respect to the stator projections and back iron or yoke. In this example, the stator projections are straight and of constant cross-section from the yoke to their distal end at an air gap 430 defined between the stator 410 and the rotor 420, as illustrated in FIG. 5.

The stator poles 412 enable electromagnetic communication between the power electronics and the stator core 414, with electrical isolation between pole windings. The electrical winding 416 can include an electrically conductive coil of wire, such as insulated or enameled magnet wire, or a plurality of welded electrically conductive bars, such as insulated copper bars. The electrical windings 416 can include a winding of braided wire such as Litz wire. The Litz wire may be used for higher frequency operation while other configurations such as square or flat wire may be used to increase winding density and increase skin effect. Each electrical winding 416 can include multiple coils conductively connected in parallel and wound about a common stator core 414.

The rotor 420 also has a series of circumferentially spaced-apart rotor poles 422 that define slots 423 therebetween. The rotor 420 has a surface 402 movable with respect to a surface 401 of the stator 410 in a motion direction. The slots 423 extend at a non-zero angle, e.g., at 90 degree, to the motion direction. The surface 402 of the rotor 420 is spaced from the surface 401 of the stator 410 to define the air gap 430 between the stator poles 412 and the rotor poles 422. It is noted that the air gap 430 may be filled with another fluid other than air.

The air gap 430 can be maintained as consistent throughout operation. In the motors described below, the stator poles 412 and the rotor poles 422 should maintain a non-zero air gap to prevent catastrophic damage resulting from contact of the rotor poles 422 relative to the stator poles 412. As illustrated in FIG. 5, the air gap 430 has a depth Dg perpendicular to the motion direction. The depth Dg may be in a range of 0.05 to 2.0 millimeters, e.g., for motors with a power under 250 kilowatts (kW). The rotor pole 422 can have a width W1 along the motion direction, and the rotor slot 423 can have a width W2 along the motion direction and a depth Ds perpendicular to the motion direction. As discussed with further details below, the size of the air gap 430 can affect the generated horizontal force. In some examples, the slots 423 have a preferred depth Ds of 50 to 500 times of that of the air gap 430 (Dg) and a preferred width W2 at the surface 402 of 25 to 100 times of the depth Dg of the air gap 430. As discussed with further details below, flux barriers can be disposed within the slots 423 between the rotor poles 422 and/or the slots 418 between the stator poles 412, which can alter magnetic flux flow between the stator 410 and the stator 420 and change the performance of the motor 400. In this example, the flux barriers fill the slots. The sizes of the air gap 430 and the slots 423 can affect the performance of the motor 400.

Figure 6:
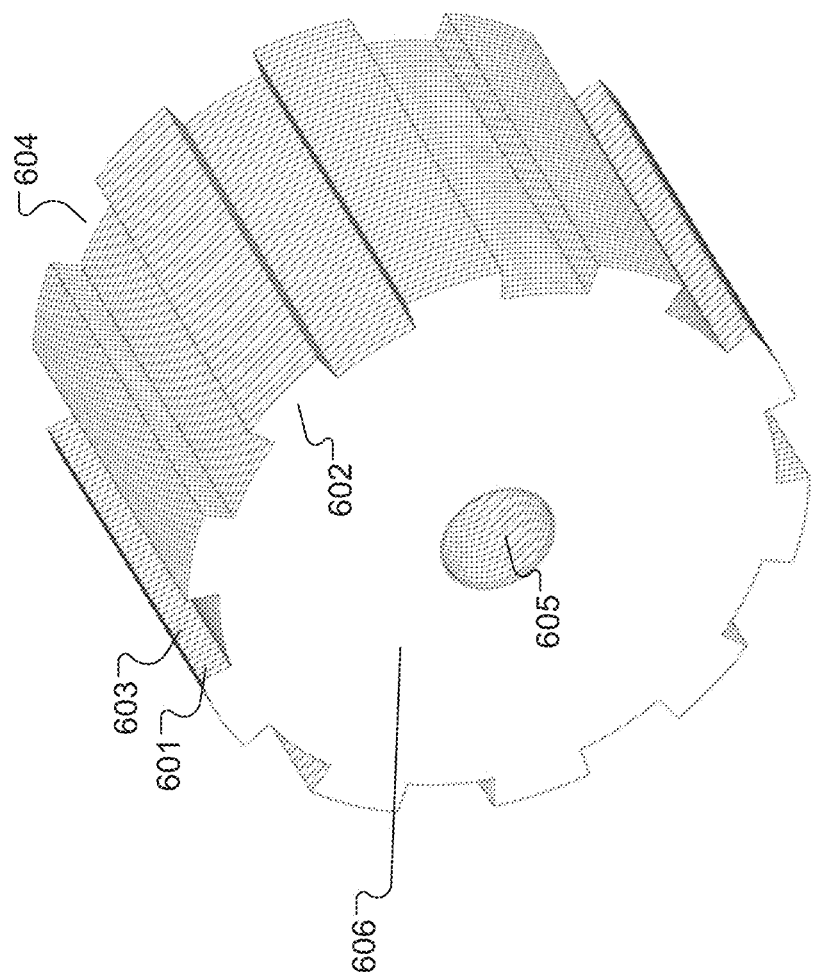
FIG. 6 is a perspective view of a rotor made of a stack of laminated plates.

FIG. 6 is a perspective view of an example rotor core 600 made of a stack of laminated layers 601 of ferromagnetic material. The rotor core 600 can be used for the rotor 420 of FIG. 4. The laminated layers 601 are separated from one another, at least at a surface of the rotor 600, by interfaces 603 less electrically conductive than the ferromagnetic material. Thus, the interfaces are current-inhibiting, as compared to the ferromagnetic material of the layers. In some cases, the interfaces 603 consist of oxidized surfaces of the ferromagnetic material. For example, the ferromagnetic material can be iron (Fe), and the interfaces can be made of iron oxide (FeOx). In some cases, the interfaces 603 include sheets of insulator material interleaved with the ferromagnetic layers 601. For example, the sheets of insulator material can include sheets of resin film.

The laminated layers 601 define a rotor body 606 having an axial hole 605 where an output shaft, e.g., the output shaft 107 of FIG. 1, can be inserted and movable together with the rotor core 600. The laminated layers 601 also define a series of spaced-apart rotor poles 602 radially protruding from the rotor body 606 and axially extending parallel to the axial hole 605. The protruded rotor poles 602 define slots 604 axially extending parallel to the axial hole 605.

Example Flux Barriers

In the following, various designs/configurations of flux barriers for electric motors, including SRMs, axial-gap motors, and linear motors are presented and discussed.

Example Flux Barrier Having a Conductive Bar

Figure 7:
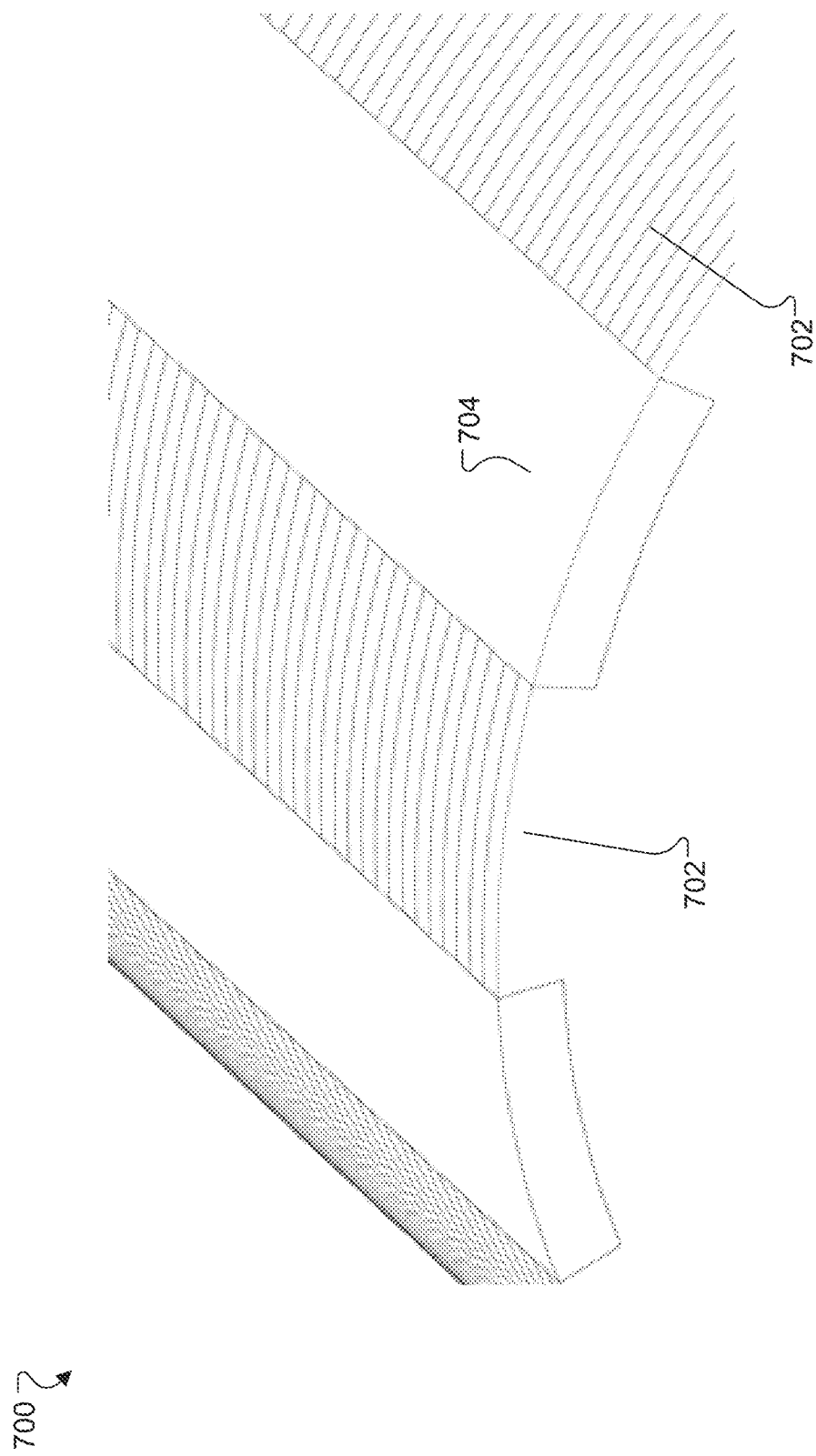
FIG. 7 illustrates a rotor with flux barriers filled in slots between adjacent poles.

FIG. 7 illustrates an example rotor 700 with flux barriers filling slots between adjacent rotor poles. The rotor 700 can include the rotor core 600 of FIG. 6, and the rotor poles 702 can be the rotor poles 602 of FIG. 6. The rotor poles 702 can be of a stack of layers of ferromagnetic material separated from one another by interface less electrically conductive than the ferromagnetic material.

Adjacent rotor poles 702 define slots, e.g., the slots 604 of FIG. 6. The rotor 700 includes flux barriers 704 between adjacent rotor poles 702 and in the slots of the adjacent rotor poles 702. The flux barriers 704 each have a electrical conductivity higher than the ferromagnetic material. The flux barriers 704 are electrically isolated from one another external to the ferromagnetic material of the rotor 700, although they may be electrically connected to one another through the rotor material.

As illustrated in FIG. 7, a flux barrier 704 can be in the form of an electrically conductive bar extending along an axial direction of the rotor 700, e.g., parallel to an axial hole 605 of FIG. 6, and crossing multiple interfaces of the stack of layers. In some examples, the bar is formed of a single material such as aluminum, copper, brass, silver, zinc, gold, pyrolytic graphite, bismuth, graphene, or carbon-nanotubes. In some examples, the bar contains combinations of materials, such as copper-iron, nickel-iron, lead-iron, brass-iron, silver-iron, zinc-iron, gold-iron, bismuth-iron, aluminum-iron, pyrolytic graphite-iron, graphene-iron, carbon-nanotubes-iron, or Alinco (aluminum-nickel-cobalt) alloys, such that the bar (e.g., copper-iron) can have an electric conductivity higher than the ferromagnetic material of the rotor core. In some cases, the bar contains at least one percent, in some cases five percent, in some cases 15 percent, by mass fraction, of an element selected from the group consisting of copper, aluminum, brass, silver, zinc, gold, pyrolytic graphite, bismuth, graphene, and carbon-nanotubes. In some cases, the bar contains at least 20 percent, in some cases 40 percent, in some cases 60 percent, by mass fraction, of an element, or combination of elements, selected from the group consisting of iron, nickel and cobalt. The rotor 700 can be fabricated by casting one or more materials of the flux barriers 704 directly in the slots between the rotor poles 702, such that the slots are filled with the flux barriers.

The rotor 700 with the flux barriers 704 in the slots between the rotor poles 702 can be used as the rotor 420 of FIG. 4 in a motor, e.g., the motor 400 of FIG. 4. The rotor 700, together with a stator, e.g., the stator 410 of FIG. 4, defines a nominal gap, e.g., the gap 630 of FIG. 6, between the stator poles and the rotor poles. The bar has an exposed surface facing the nominal gap. In many cases, the exposed surfaces of the bars form a cylindrical surface with the surfaces of the rotor poles.

Effect of Flux Barriers

FIGS. 8A-C and 9A-C illustrate the effect of flux barriers on magnetic flux between stator poles and rotor poles and through the nominal gap. FIGS. 8A-C illustrate magnetic flux without flux barriers (e.g., with air filling the slots) between rotor poles at a fully unaligned position (FIG. 8A), a half-aligned position (FIG. 8B), and a fully aligned position (FIG. 8C).

When a stator pole 802, e.g., the stator pole 412 of FIG. 4, is energized, a magnetic field is generated and magnetic flux flows between the stator pole 802 and a rotor pole 804, e.g., the rotor pole 422 of FIG. 4 or the rotor pole 602 of FIG. 6. The rotor pole 804 is movable with respect to the stator pole 802 in a motion direction parallel to the nominal gap 805 defined between the rotor pole 804 and the stator pole 802.

At the fully unaligned position, as illustrated in FIG. 8A, magnetic flux 810 flows with an angle with respect to the motion direction. Some portion of the magnetic flux 810 flows to the rotor pole 804 through a slot 803 adjacent to the stator pole 802 and filled with air; some portion of the magnetic flux 810 flows to the rotor pole 804 through a slot 806 adjacent to the rotor pole 804 and filled with air. At the half-aligned position, as illustrated in FIG. 8B, magnetic flux 820 has more portions flowing through the nominal gap 805 and less portions flow through the stator slot 803 and the rotor slot 806. The angle between the magnetic flux 820 and the motion direction becomes larger. At the aligned position, as illustrated in FIG. 8C, magnetic flux 830 flows to the rotor pole 804 substantially and radially through the nominal gap 805. The angle between the magnetic flux 830 and the motion direction becomes almost 90 degrees.

FIGS. 9A-C illustrate the same three relative rotor-stator positions, but with flux barriers filling the slots between adjacent rotor poles 904: with the poles at a fully unaligned position (FIG. 9A), a half-aligned position (FIG. 9B), and a fully aligned position (FIG. 9C). When a stator pole 902 is energized, a magnetic field is generated and magnetic flux flows from the stator pole 902 to a rotor pole 904, and the rotor pole 904 and the stator pole 902 define a nominal gap 905.

At the unaligned position, as illustrated in FIG. 9A, magnetic flux 910 flow with an angle with respect to the motion direction. Some portion of the magnetic flux 910 flows to the rotor pole 904 through a slot 903 adjacent to the stator pole 902; some portion of the magnetic flux 910 flows to the rotor pole 904 through a flux barrier 906 filled in a slot adjacent to the rotor pole 904. However, compared to the magnetic flux 810 of FIG. 8A, the portion of magnetic flux through the flux barrier 906 is greatly suppressed and deflected to extend more along the nominal gap 905, such that the magnetic flux 810 is concentrated and redirected more tangentially along the motion direction. Similarly, at the half-aligned position, as illustrated in FIG. 9B, magnetic flux 920 is more concentrated compared to the magnetic flux 820 of FIG. 8B, particularly the portion of magnetic flux through the flux barrier 906 being greatly suppressed and repelled. At the aligned position, as illustrated in FIG. 9C, magnetic flux 930 is similar to the magnetic flux 830 and flows substantially through the nominal gap 905 to the rotor pole 904.

Under an operational magnetic frequency, the flux barrier exhibits diamagnetic properties to repel the magnetic flux to thereby generate a repelling force against the rotor pole. When the stator and rotor poles are positioned in an unaligned state, significant internal electromagnetic reflection at the flux barrier alters the net direction of magnetic flux between the poles. The diamagnetic shielding at the slot filled with flux barrier effectively pushes the rotor in a desired motion direction, while the magnetic attraction between the stator and rotor poles pull the rotor in the same direction. In this way, by using such a diamagnetic barrier, the vector of the magnetic field line can be modified during operation of the motor, such that the radial force is directed substantially more along the motion direction. This increases the proportion of magnetically-induced force that works to propel the rotor with respect to the stator. This effect generates more useful kinetic energy per cycle, from a given input energy from an electric drive system, e.g., the electric drive system 100 of FIG. 1. For example, when the rotor pole travels from the fully unaligned position to the fully aligned position with respective to the stator pole, the difference in co-energy for slots with flux barriers is much larger than the difference in co-energy for slots without flux barriers such as air, which can also better avoid fringing fields. In other words, the effective saliency ratio has been increased.

FIG. 10 illustrates net magnetically-induced forces with and without flux barriers between adjacent poles. When a stator pole 1012 of a stator 1010, e.g., the stator pole 412 of FIG. 4, is energized, a magnetic field is generated and magnetic flux flows from the stator pole 1012 to a rotor pole 1022 of a rotor 1020, e.g., the rotor pole 422 of FIG. 4 or the rotor pole 602 of FIG. 6. The rotor 1020 is movable with respect to the stator 1010 in a motion direction and defines, together with the stator 1010, a nominal gap 1015.

When there is only air in the slots 1024 between adjacent rotor poles 1022, attraction between the stator pole 1012 and the rotor pole 1022 causes a net instantaneous pulling force F0 at an angle Θ0 with respect to the motion direction. When there is a flux barrier 906 in the slot 1024 between adjacent rotor poles 1022 and/or in slot 1014 between adjacent stator poles 1012, attraction between the stator pole 1012 and the rotor pole 1022 causes a net pulling force F1 at an angle Θ1 with respect to the motion direction. As discussed above in FIGS. 9A and 9B, the flux barrier can exhibit diamagnetic properties to repel the magnetic flux, effectively generating a repelling force against the stator pole. As a result, the net pulling force F1 is redirected to have a larger component along the motion direction. That is, F1 cos Θ1>F0 cos Θ2, where F1 can be substantially identical to F0. When the rotor pole 1022 is at the fully unaligned position, as illustrated in FIG. 9A, the angle is smallest and the horizontal force is the largest. When the rotor pole 1022 is at the half-aligned position, as illustrated in FIG. 9B, there is the greatest change in reluctance and a maximum torque can be obtained.

Example Flux Barrier with a Conductive Layer Over a Bar

Figure 11:
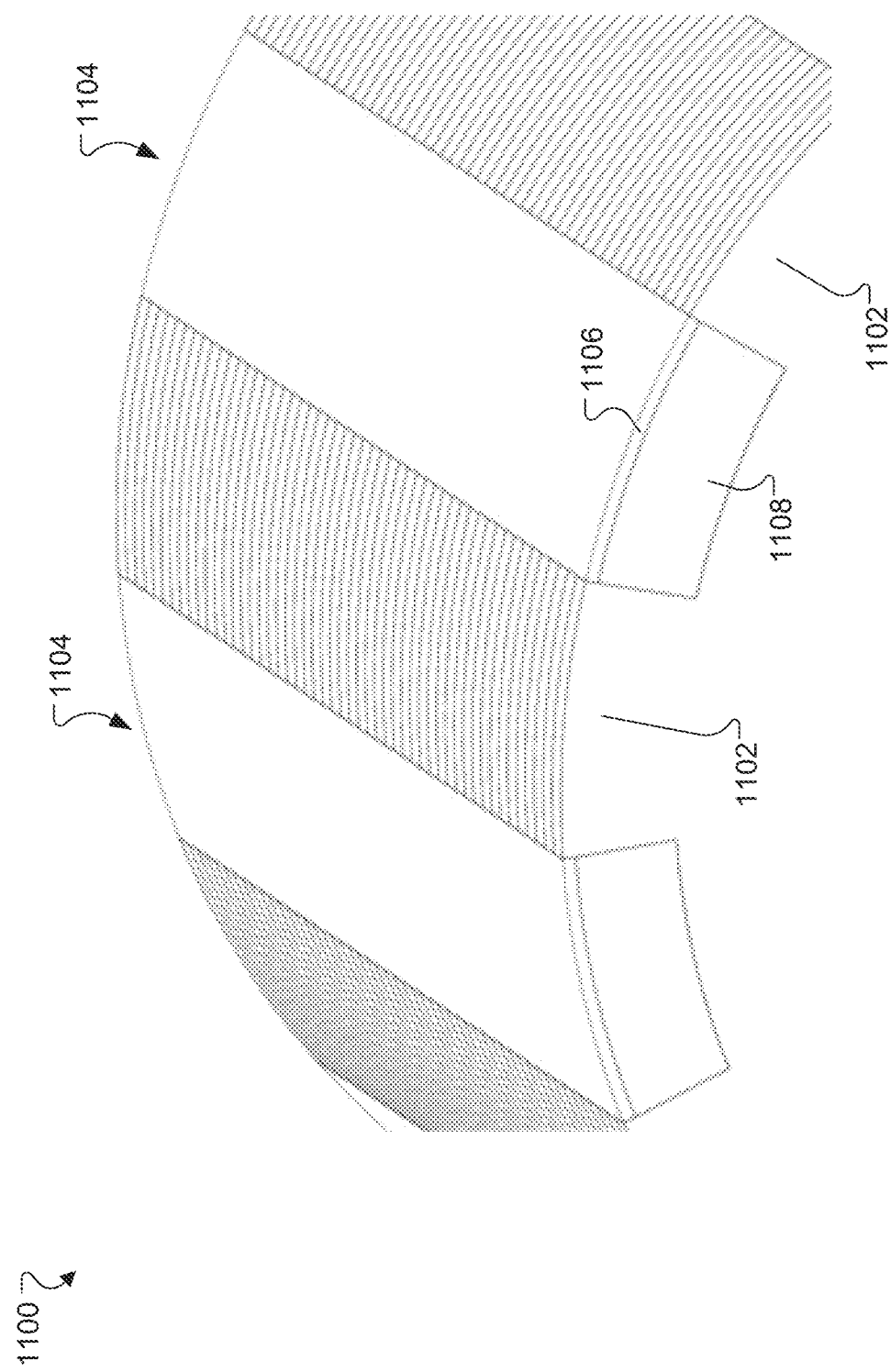
FIG. 11 is a perspective view of another rotor with flux barriers including an electrically conductive layer on top of magnetically permeable material in slots between adjacent poles.

FIG. 11 is a perspective view of another rotor 1100 with flux barriers 1104 in slots between adjacent rotor poles 1102. Similar to the rotor 700 of FIG. 7, the rotor poles 1102 is made of a stack of layers of ferromagnetic material separated from one another by interfaces less electrically conductive than the ferromagnetic material. The interfaces can be current-inhibiting. The flux barriers 1104 each include an electrically conductive bar 1108 crossing multiple interfaces and are electrically isolated from one another external to the ferromagnetic material. Different from the flux barrier 704 of the rotor 700 of FIG. 7, the flux barrier 1104 of rotor 1100 additionally includes an electrically conductive layer 1106 covering a bar 1108. The electrically conductive layer 1106 is made of a different material than the bar 1108 and can have a higher electrically conductivity than the bar 1108. In some example, bar 1108 is made of iron, nickel, or cobalt, and the electrically conductive layer 1106 is made of copper, aluminum, brass, silver, zinc, gold, pyrolytic graphite, bismuth, graphene, or carbon-nanotubes. The rotor 1100 can be fabricated by casting a material of the bar 1108 into the slots of the rotor poles 1102 and depositing the electrically conductive layer 1106 on top of the bar 1108, such as by plating or sputtering.

Figure 12:
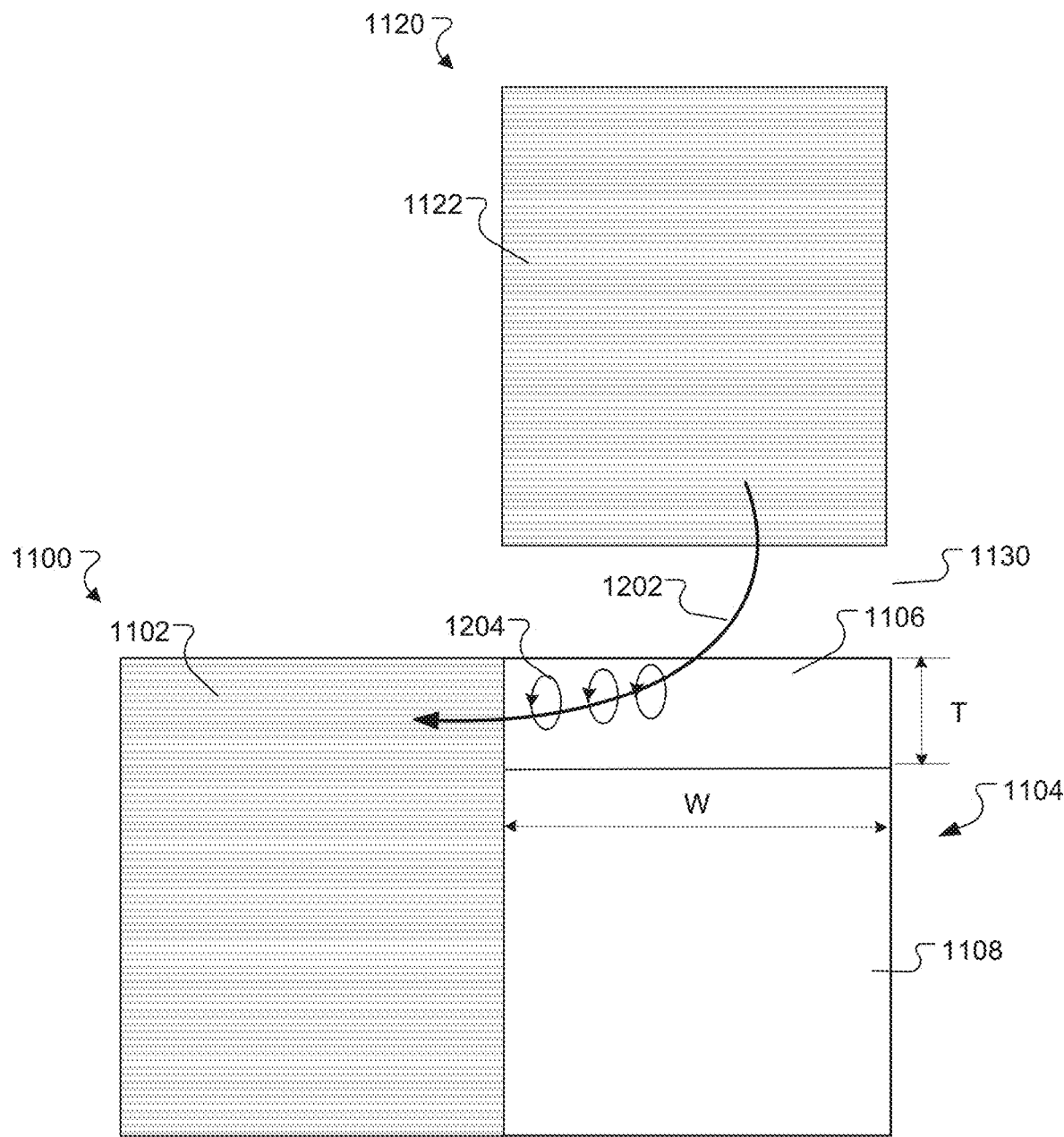
FIG. 12 illustrates magnetic flux between stator and rotor of FIG. 11 during operation.

An outer surface of the rotor 1100 and an outer surface of a stator 1120 define a nominal gap 1130, as illustrated in FIG. 12. The rotor 1100 is movable with respect to the stator 1120 in a motion direction. The electrically conductive layer 1106 at least partially forms the outer surface of the rotor 1100. During operation, when a stator pole 1122 of the stator 1120 is energized, e.g., by pulsed current in a duty cycle as illustrated in FIG. 3, an alternating magnetic field is generated and a corresponding magnetic flux 1202 flows from the stator pole 1122 to the rotor pole 1102 through the nominal gap 1130. The pulsing magnetic field induces an eddy current 1204 in the electrically conductive layer 1106 of the flux barrier 1104. The eddy current 1204 can generate a secondary magnetic field opposing the applied alternating magnetic field, thereby producing a repelling force to alter the net direction of magnetic flux 1202, as discussed above.

The electrically conductive layer 1106 has a finite width W in the motion direction and a finite thickness T from the outer surface of the rotor 1100 along a direction perpendicular to the motion direction (or the nominal gap 1130), crossing multiple interfaces of the stack of layers. The width W of the layer 1106 is preferably more than two times, in some cases more than five times, and in some cases more than 10 times the thickness T of the layer 1106. The bar 1108 can be of greater thickness than the layer 1106.

In some examples, the thickness T of the layer 1106 is larger than an electric current skin depth of the material of the layer 1106 at a particular operational frequency, such that the eddy current 1204 flows mainly at the skin of the layer 1106 between the outer surface and the skin depth and propagates over a long distance in the layer 1106 along the motion direction, towards the adjacent rotor pole 1102. In such a way, the magnetic flux 1202 can be concentrated more in the layer 1106 and redirected more tangentially to cause a larger horizontal force along the motion direction.

Example Flux Barrier Having Pairs of Alternating Layers

Figure 13:
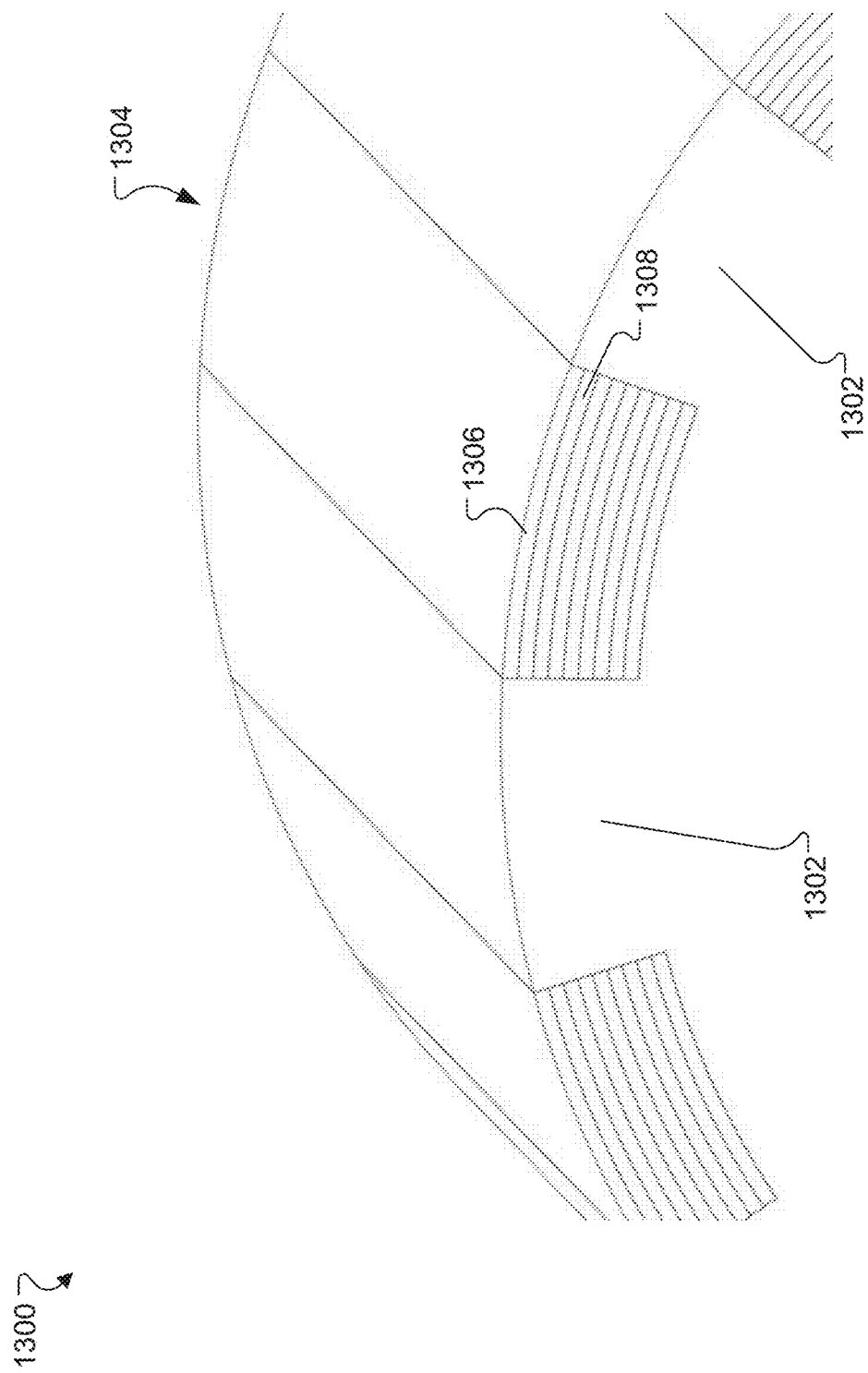
FIG. 13 is a perspective view of another rotor with flux barriers made of alternating electrically conductive layer and magnetically permeable layer in slots between adjacent poles.

FIG. 13 is a perspective view of another rotor 1300 with flux barriers 1304 in slots between adjacent rotor poles 1302. Similar to the rotor 1100 of FIG. 11, the rotor poles 1302 can be made of a stack of layers of ferromagnetic material separated from one another by interfaces less electrically conductive than the ferromagnetic material. The flux barriers 1304 are electrically isolated from one another external to the ferromagnetic material of the rotor 1300. Different from the flux barrier 1104 of the rotor 1100 of FIG. 11, each flux barrier 1304 of the rotor 1300 is made of multiple pairs of alternating layers 1306 and 1308 disposed in slots between adjacent rotor poles 1302. The discrete layers 1306 and 1308 extend parallel to the nominal gap and form interlayer interfaces of differing materials. In a particular example, layer 1306 is made of copper and layer 1308 is made of nickel. Layer 1306 can be more electrically conductive than layer 1308, while layer 1308 can be more magnetically permeable than layer 1306. The rotor 1300 can be fabricated by alternatingly depositing the layers 1306 and 1308 in the slots between rotor poles 1302.

Figure 13A:
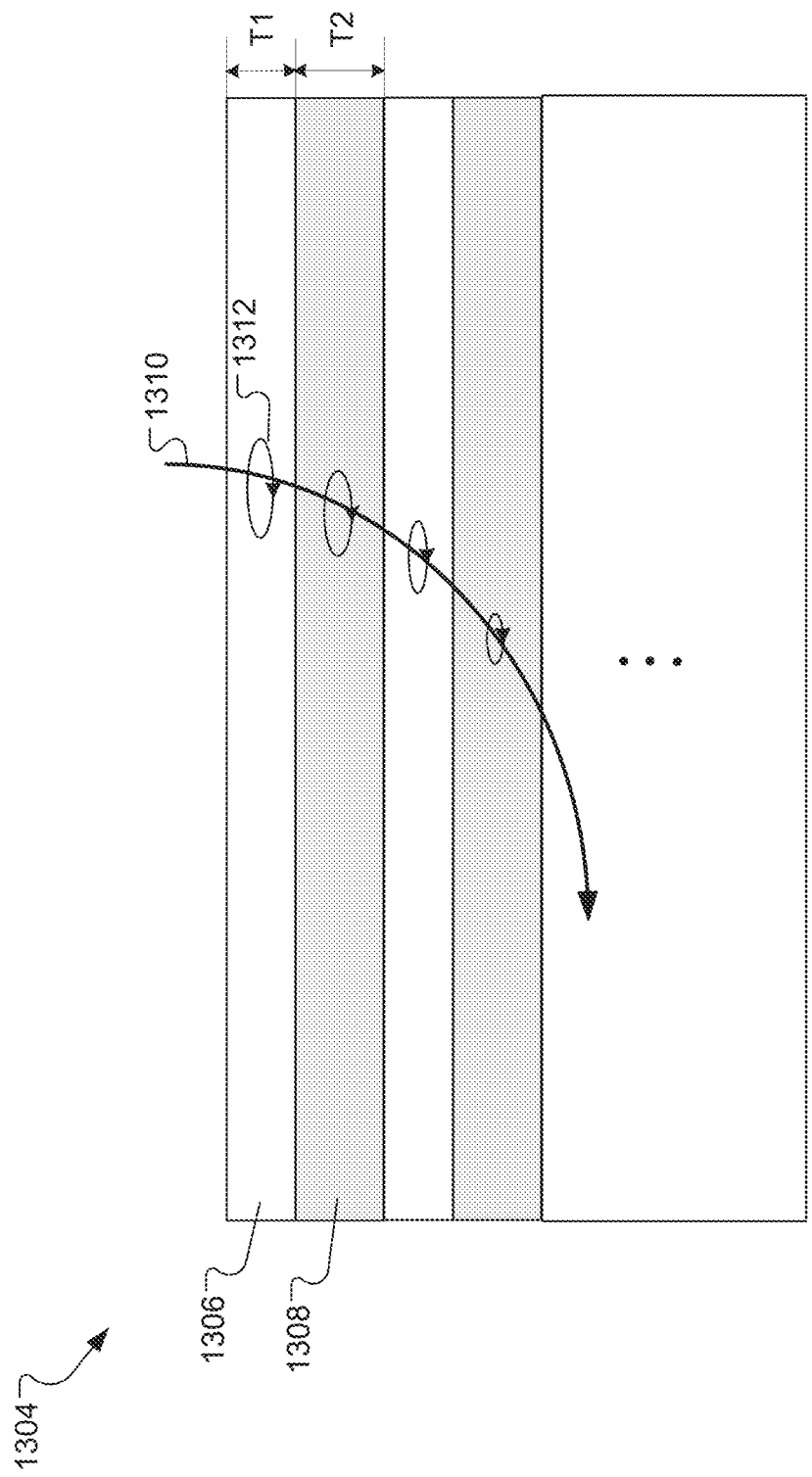
FIG. 13A illustrates a magnetic flux path in the rotor of FIG. 13.

As illustrated in FIG. 13A, each layer 1306 has a finite thickness T1 in a direction perpendicular to the nominal gap and each layer 1308 has a finite thickness T2 in the direction perpendicular to the nominal gap. In some examples, the thickness T1 of the layer 1306 is configured to be smaller than an electrical current skin depth of a material of the layer 1306 at a particular operational frequency, and the thickness T2 of the layer 1308 is configured to be smaller than an electrical current skin depth of a material of the layer 1308 at the particular operational frequency. In such a way, as illustrated in FIG. 13A, a magnetic flux 1310 flowing from a stator to the rotor 1300 can propagate through the multiple layers 1306 and 1308, causing eddy currents 1312 and accordingly a secondary magnetic field to be generated in the multiple layers 1306 and 1308.

Example Flux Barriers Having Shielded Poles

Figure 14:
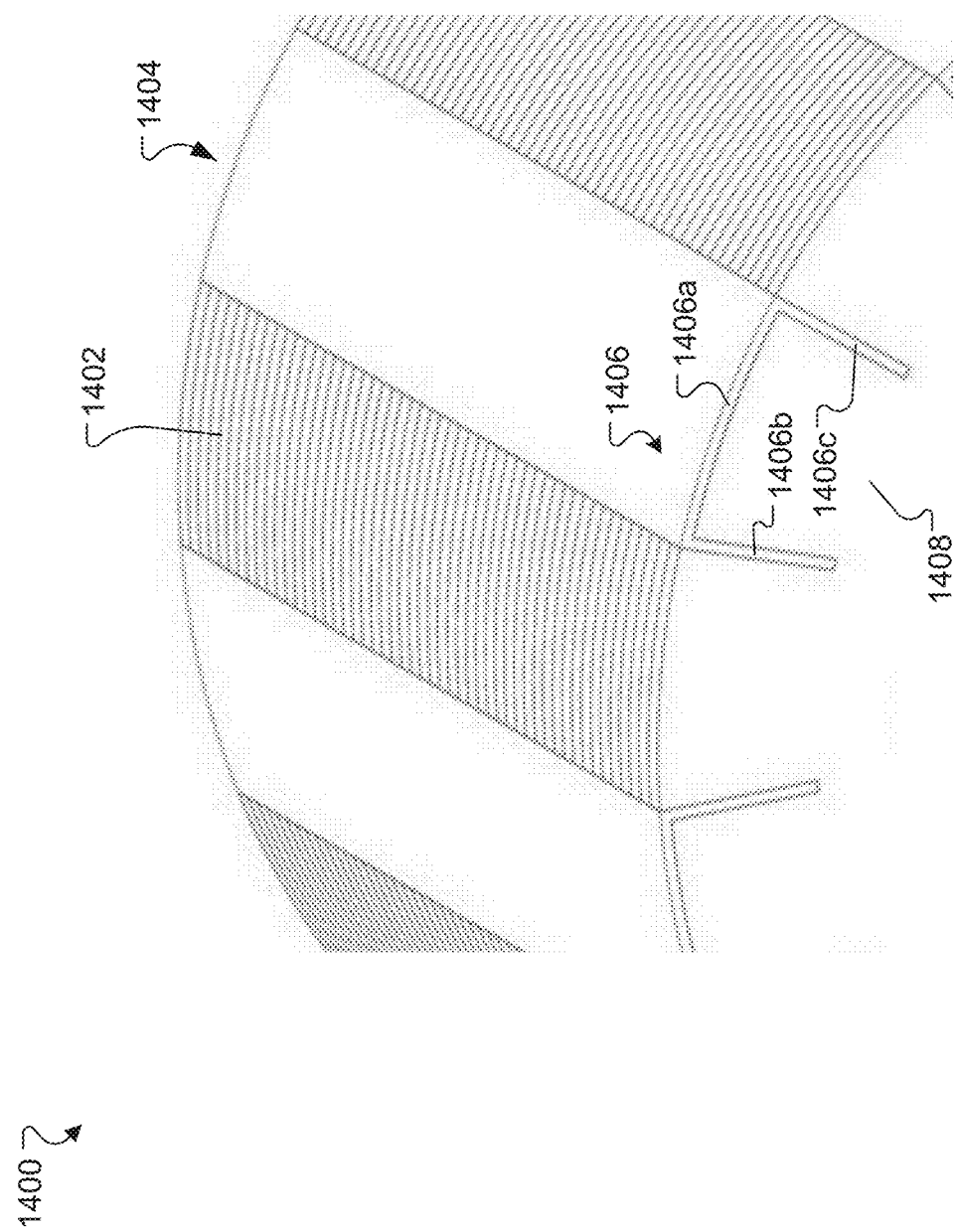
FIG. 14 is a perspective view of another rotor with flux barriers made of electrically conductive layer surrounding magnetically permeable material in slots between adjacent poles.

FIG. 14 is a perspective view of another rotor 1400 with flux barriers 1404 in slots between adjacent rotor poles 1402. Similar to the rotor 1100 of FIG. 11, the rotor poles 1402 is made of a laminated stack of layers of ferromagnetic material separated from one another by interfaces less electrically conductive than the ferromagnetic material. The interfaces can be current-inhibiting. The flux barriers 1404 are each electrically isolated from one another external to the ferromagnetic material. Different from the flux barrier 1104 of the rotor 1100 of FIG. 11 that has an electrically conductive layer on a top of a bar, the flux barrier 1404 of the rotor 1400 has a layer 1406 of electrically conductive material surrounding a core 1408 of a core material in the slots between adjacent rotor poles 1402. The core material of the core 1408 can be more magnetically permeable than the electrically conductive material of the layer 1406. The core 1408 can be of the same material as the rotor poles.

The layer 1406 includes three layer portions 1406a, 1406b, 1406c. The layer portion 1406a covers an inter-pole surface region between adjacent rotor poles 1402 and forming a portion of an outer surface of the rotor 1400. Each core 1408 underlies a respective inter-pole surface region. The inter-pole surface region can be continuous in a direction perpendicular to the motion direction across an entirely magnetically active extent of the pole surface regions of the rotor 1400. The layer portions 1406b, 1406c extend from the layer portions 1406a across the interfaces of the stack of layers and between the adjacent rotor poles 1402 and the core 1408 of the flux barrier.

Similar to the layer 1106 of FIG. 11, each layer portion 1406a, 1406b, 1406c can have a thickness larger than an electric current skin depth of the electrically conductive material of the layer 1406, such that magnetic flux through the layer portion 1406a is redirected more tangentially towards adjacent rotor poles 1402, and layer portions 1406b and 1406c act to inhibit or shield magnetic flux between the poles and the core 1408. The layer portion 1406a has a finite width extending in the motion direction. The layer portions 1406b and 1406c extend into the ferromagnetic material to an overall depth from the outer surface of the rotor 1400. The overall depth can be between about 1 and 50 mm, in some cases between about 2 and 25 mm, and in some cases between about 5 and 15 mm, for example, and between 2 and 2000 percent, in some cases between 5 and 500 percent, and in some cases between 10 and 200 percent of the width of layer portion 1406a.

The electrically conductive material of the layer 1406 can include copper. In some implementations, the core material of the core 1408 and the ferromagnetic material of the rotor poles 1402 have identical material properties, e.g., made of iron. The cores 1408 and the rotor poles 1402 can be contiguous portions of the laminated stack of layers.

In some cases, the rotor 1400 can be fabricated by depositing the core material into slots between adjacent poles of a rotor, e.g., the rotor 600 of FIG. 6, to form the cores 1408 with gaps between the poles 1402 and the adjacent cores 1408 and then depositing the electrically conductive material into the gaps and the top of the cores 1408 to form the layer 1406. In some cases, layers of shaped ferromagnetic material are stacked in alignment to form slots to receive the conductive material; and then the electrically conducive material is cast or otherwise deposited into the gaps and on top of the top surface region to form the electrically conductive layer 1406.

The flux barrier 1404 can be considered as a shielded pole. Each shielded pole can have a same size as a rotor pole. While at low frequency or DC-static conditions there is little differentiation between a rotor pole and a shielded pole, under moderate and high frequency operation, the magnetic reluctance of the shielded pole exceeds the magnetic reluctance of air, which results in a higher torque density. Thus, by forming a shielded pole between adjacent rotor poles, the vector of the magnetic field line during operation of reluctance poles (stator poles and rotor poles) can be uniquely modified, such that the magnetic field is substantially more tangential. This allows a motor to utilize the radial force (or the normal force or a radial pressure) as a tangential force, which can be an order of magnitude larger than the tangential force. Shielded poles can also be extended to neighboring stator-pole sets to further decrease the flux fringing properties of the motor.

Figure 15:
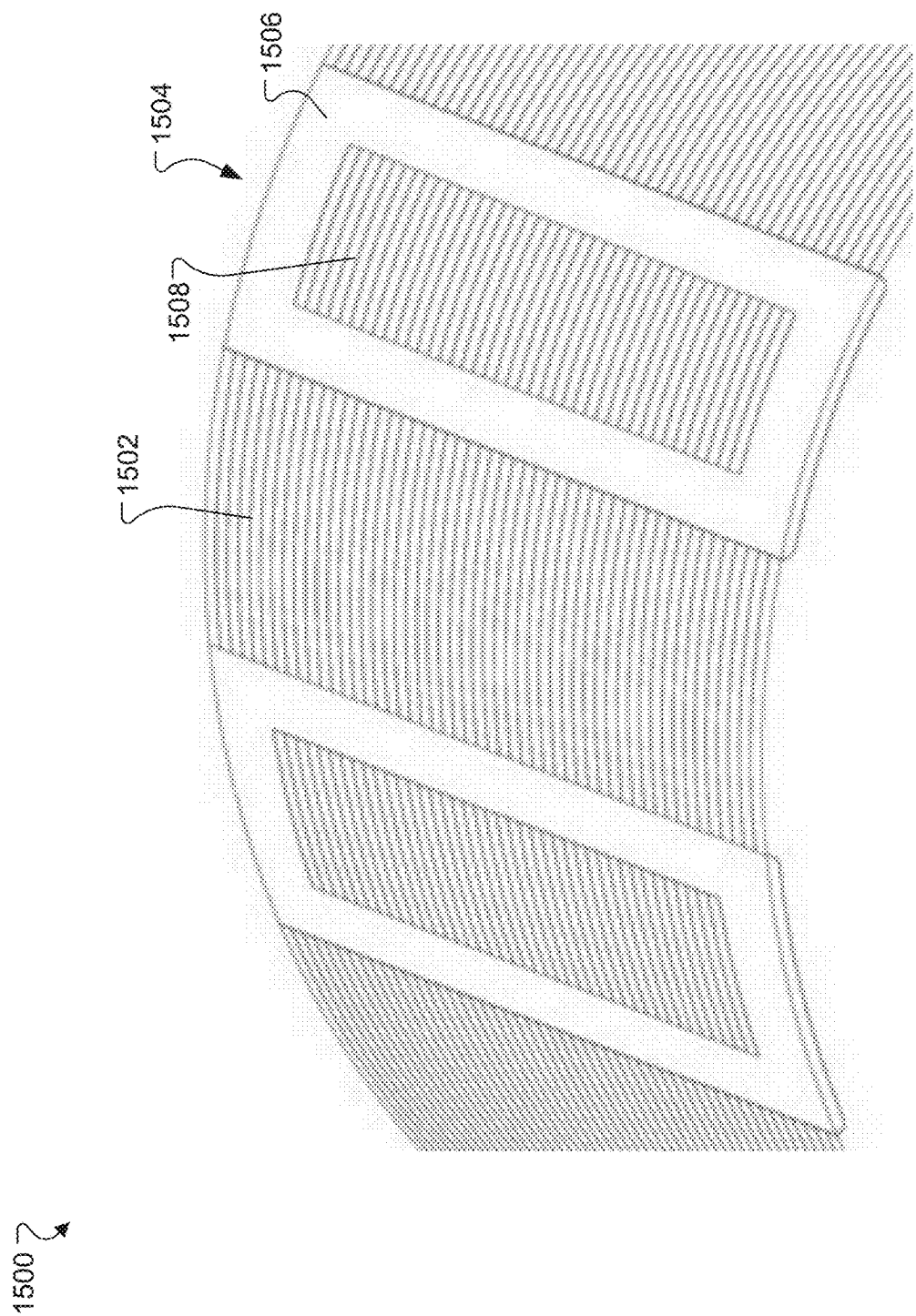
FIG. 15 is a perspective view of another rotor with flux barriers made of an electrically conductive loop about a magnetically permeable core between adjacent poles ("shielded pole").
Figure 15A:
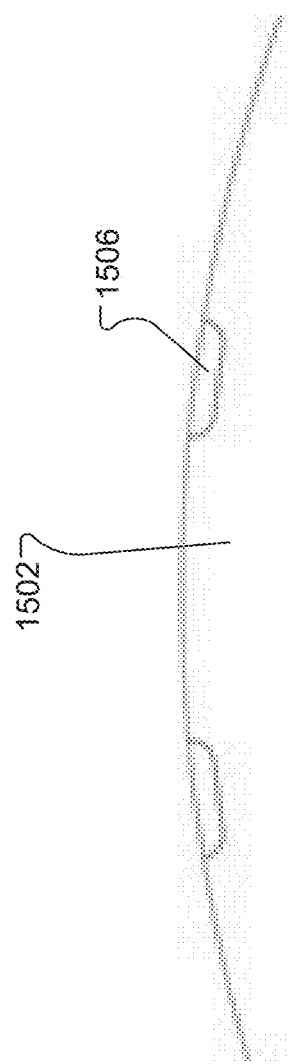
FIG. 15A is a side view of the rotor of FIG. 15.

FIG. 15 is a perspective view of another rotor 1500 with another example of shielded poles as flux barriers 1504 between adjacent rotor poles 1502. Each flux barrier 1504 is made of an electrically conductive loop 1506 about a magnetically permeable core 1508 between adjacent poles 1502. The loop 1506 can be a stack of thin layers of conductive material separated by less electrically conductive material of similar magnetic permeability, e.g., layers of copper separated by copper oxide, enamel, aluminum or aluminum oxide. Similar to the rotor 1400 of FIG. 14, the rotor poles 1502 can be made of a laminated stack of layers of ferromagnetic material separated from one another by interfaces less electrically conductive than the ferromagnetic material. The flux barriers 1504 form inter-pole surface regions between pole surface regions of the rotor poles 1502 and can be considered as surface shielded poles. The inter-pole surface regions and the pole surface regions define an outer surface (or an end surface) of the rotor 1500. Each core 1508 forms a portion of the outer surface surrounded by a respective loop 1506. Each loop 1506 forms a portion of the cylindrical outer surface of the rotor 1500, as illustrated in FIG. 15A.

The loops 1506 can be made of an electrically conductive, low energy product material. For example, the loops 1506 can be made of copper. The material of the core 1508 is more magnetically permeable than the material of the loops 1506. The core material can be ferromagnetic, e.g., iron. The core material of the cores 1508 and the ferromagnetic material of the rotor poles 1502 can be identical, such as contiguous portions of the stack of layers. In some implementations, rotor 1500 is formed by etching regions of the ferromagnetic material of the stack of the layers according to shapes and positions of the loops 1506 and then depositing/casting electrically conductive material into the etched regions to form the loops 1506. Alternatively, a flux barrier may be formed of electrically conductive, low energy product material disposed within the core 1508 itself.

The conductive loops 1506 of the flux barriers 1504 are non-overlapping and electrically isolated from one another external to the ferromagnetic material. The flux barriers 1504 are connected to each other only through the ferromagnetic material. The flux barriers 1504 define at least one electrically conductive path (e.g., the loops 1506) about the core material of the cores 1508. By 'non-overlapping' we mean that adjacent flux barriers 1504 are arranged such that any conductive path defined within the electrically conductive material of one flux barrier does not encircle any portion of any conductive path defined within the electrically conductive material of another flux barrier 1504.

As illustrated in FIG. 15, the loop 1506 of the flux barrier 1504 can form a closed circuit made of the electrically conductive material, e.g., copper. In some implementations, a flux barrier can be formed as a shielded pole by an open loop of conductive material. For example, FIG. 16 is a schematic view of another rotor 1600 with flux barriers 1604 between adjacent rotor poles 1602. The flux barrier 1604 is similar to the flux barrier 1504 of FIG. 15, except that the flux barrier 1604 has an open loop 1606 with a break 1608, e.g., an air gap, as illustrated in FIG. 16.

The open loop 1606 can be also made of electrically conductive material, e.g., copper. The open loop 1606 defines a capacitance that can be formed at a discrete location along the open loop 1606. For example, two opposing end surfaces of the open loop 1606 form an air gap 1608, forming a capacitor. The open loop 1606 can be configured to have a resonant frequency in a transmissible range of a magnetically permeable material of rotor poles 1602 of the rotor 1600, e.g., iron. In some implementations, the rotor 1600 is formed by etching regions of the magnetically permeable material according to shapes and positions of the open loops 1606 and depositing/casting electrically conductive material into the etched regions to obtain the loops 1606. The gaps 1608 can be formed during deposition of the conductive material, or may be created by ablating or otherwise removing a narrow strip of material to form each gap. Each capacitance gap 1608 preferably spans at least one layer interface of the stack.

Example Flux Barriers with Surface Layers

Figure 17:
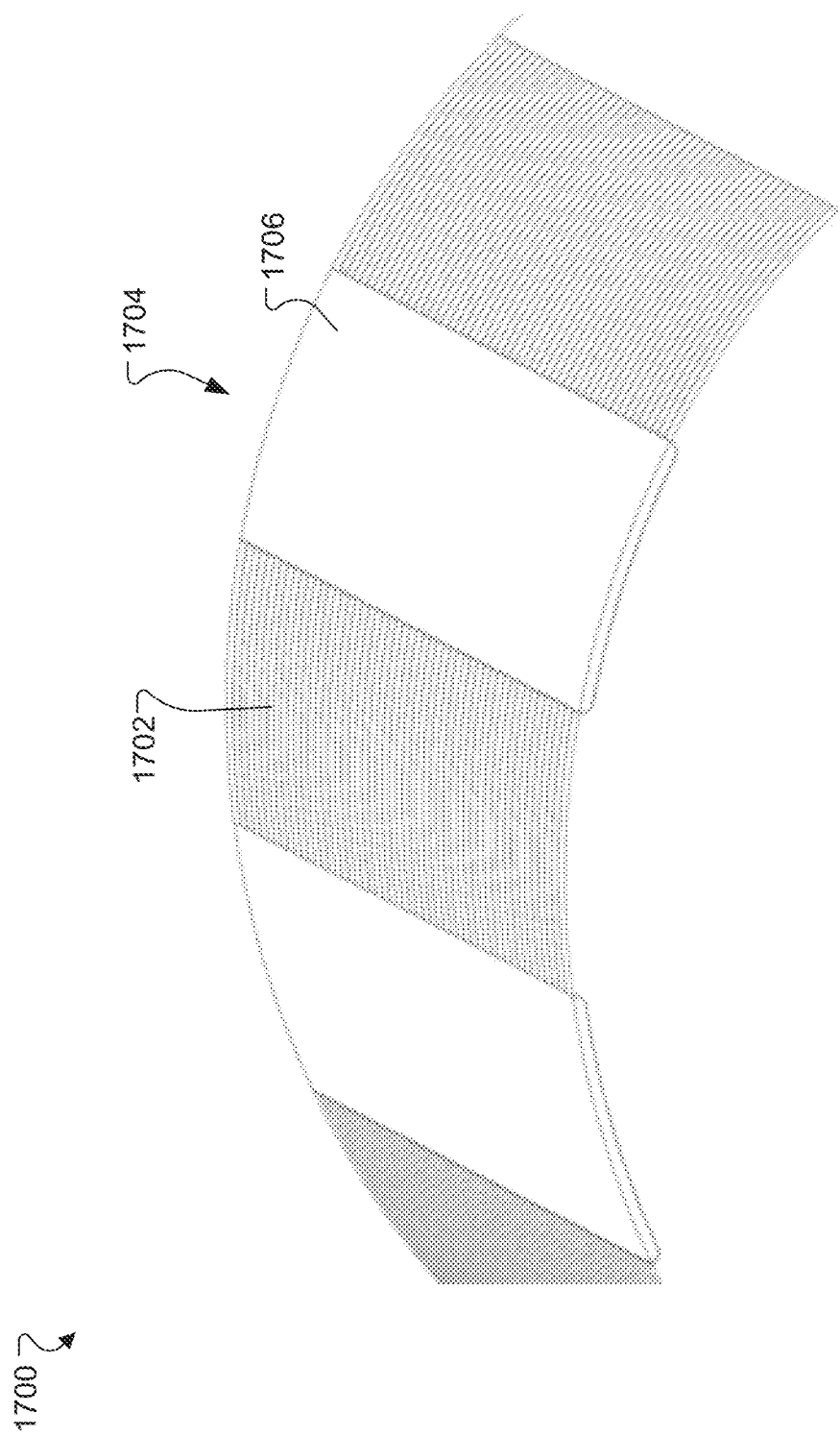
FIG. 17 is a perspective view of another rotor with flux barriers each made of an electrically conductive layer casted into an outer surface of magnetically permeable material between adjacent poles.

FIG. 17 is a perspective view of another rotor 1700 with flux barriers 1704 between adjacent rotor poles 1702. Each flux barrier 1704 includes an electrically conductive layer 1706 forming an inter-pole surface region between adjacent poles 1702. Similar to the rotor 1500 of FIG. 15, the rotor poles 1702 can be made of a laminated stack of layers of ferromagnetic material separated from one another by interfaces less electrically conductive than the ferromagnetic material. However, different from the flux barrier 1504 of FIG. 15 that has an electrically conductive loop 1506, the electrically conductive layer 1706 entirely covers the inter-pole surface region and forms a portion of an outer surface of the rotor 1700. The electrically conductive layer 1706 crosses essentially all of the magnetically active plates of the stack and is preferably in direct contact with each of the plates of the stack.

The electrically conductive layer 1706 can be formed beneath the outer surface, e.g., by etching the ferromagnetic material of the stack of layers to form inter-pole regions and casting electrically conductive material into the inter-pole regions.

Figure 18:
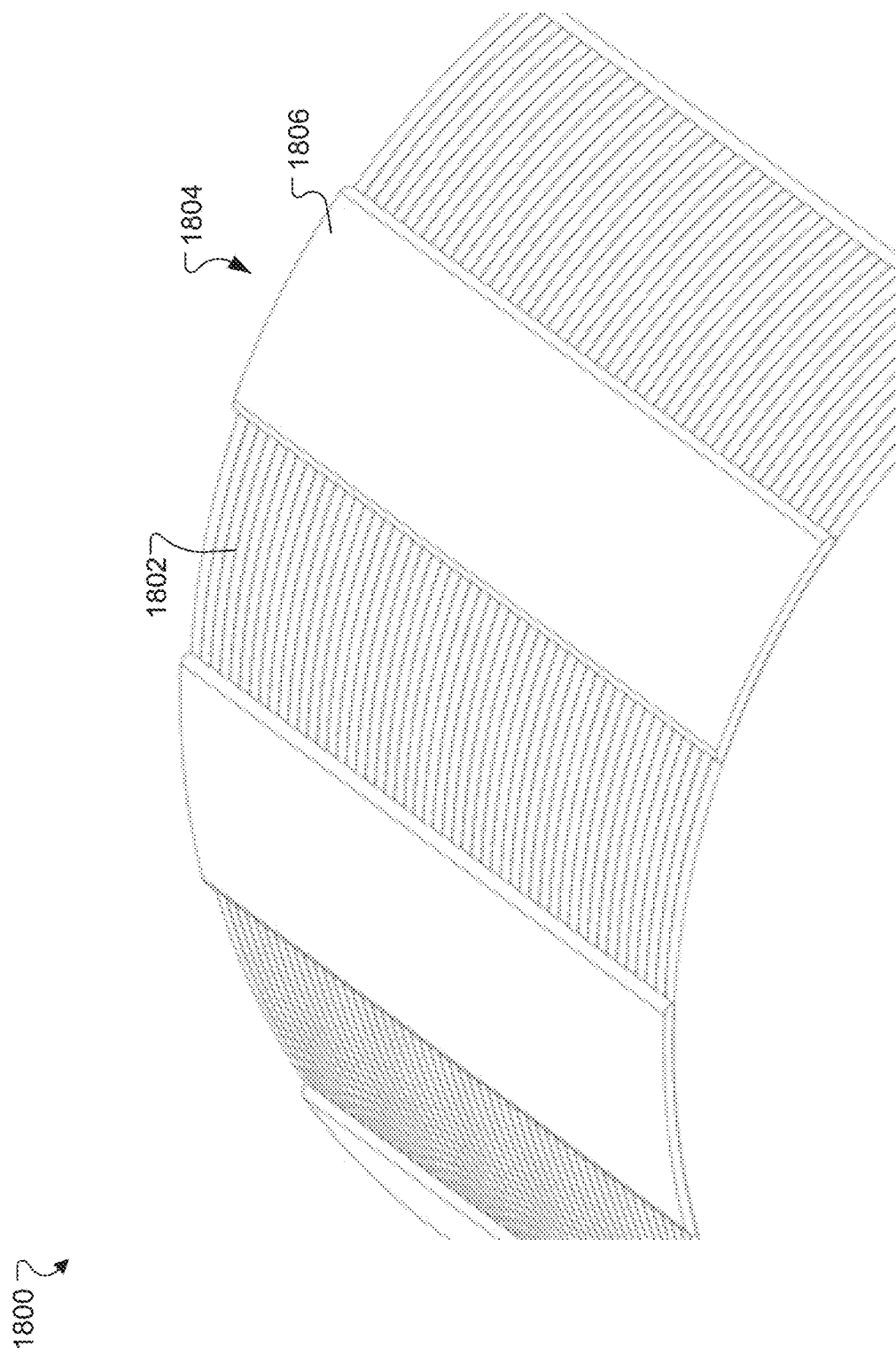
FIG. 18 is a perspective view of another rotor with flux barriers each made of an electrically conductive layer formed on an outer surface of magnetically permeable material between adjacent poles.

FIG. 18 is a perspective view of another rotor 1800 with flux barriers 1804 between adjacent rotor poles 1802. Different from the flux barrier 1704 of FIG. 17 that has the electrically conductive layer formed beneath the outer surface of the rotor 1700, each flux barrier 1804 include an electrically conductive layer 1806 formed on a cylindrical outer surface of the rotor 1800.

Figure 19:
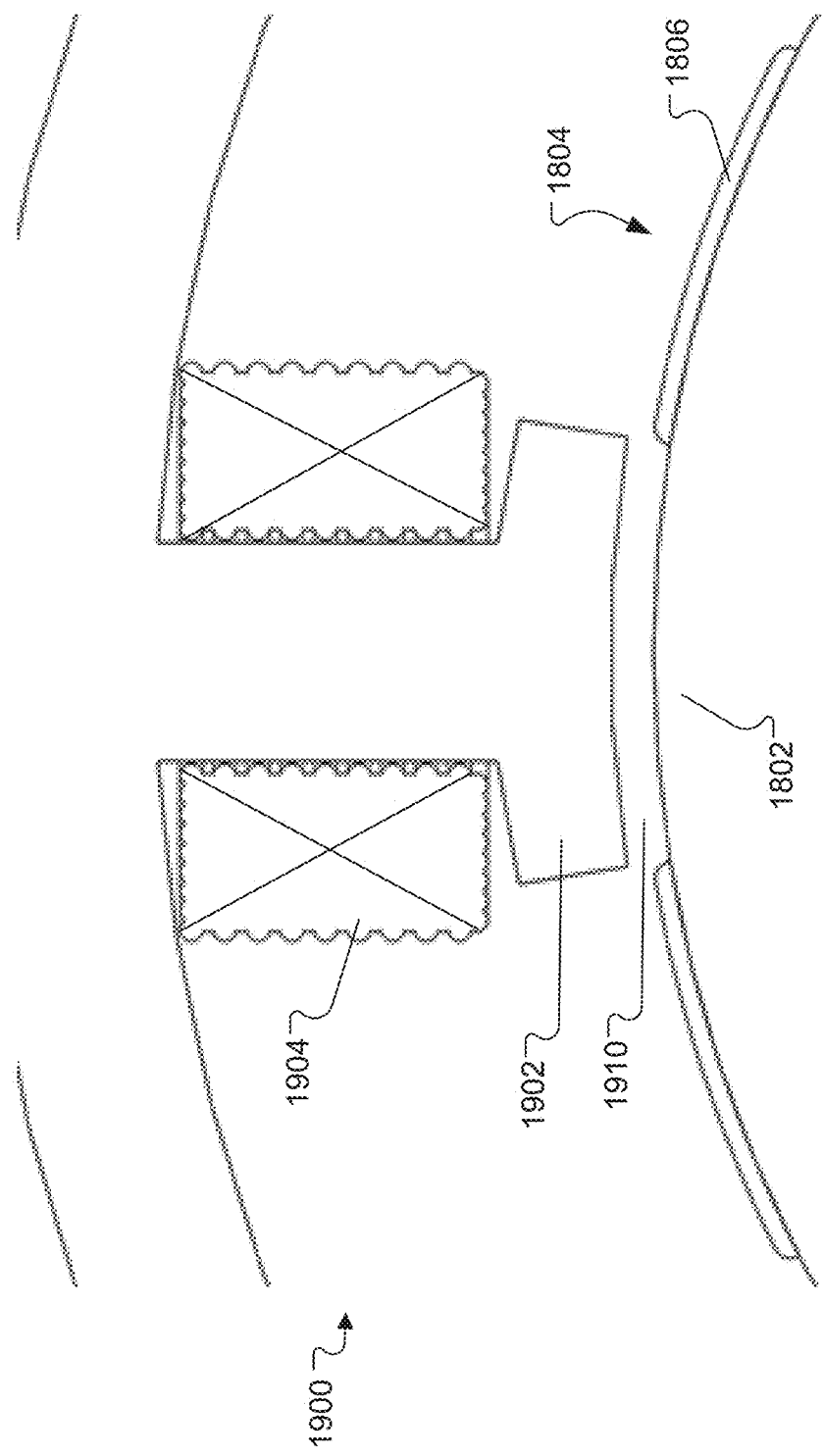
FIG. 19 illustrates a motor including a stator and the rotor of FIG. 18.

As illustrated in FIG. 19, the electrically conductive layer 1806 has a thickness extending from the outer surface towards a nominal gap 1910 that is defined by a stator 1900 and the poles 1802 of rotor 1800. The stator 1900 has an outer surface defining multiple stator poles 1902 with associated electrical windings 1904. As the electrically conductive layer 1806 is formed over the cylindrical outer surface of the rotor 1800, it resides within nominal gap 1910, making the clearance between rotor and stator lower at the layer 1806 than adjacent the layer 1806.

Effects of Flux Barrier Materials/configurations on Force

Figure 20:
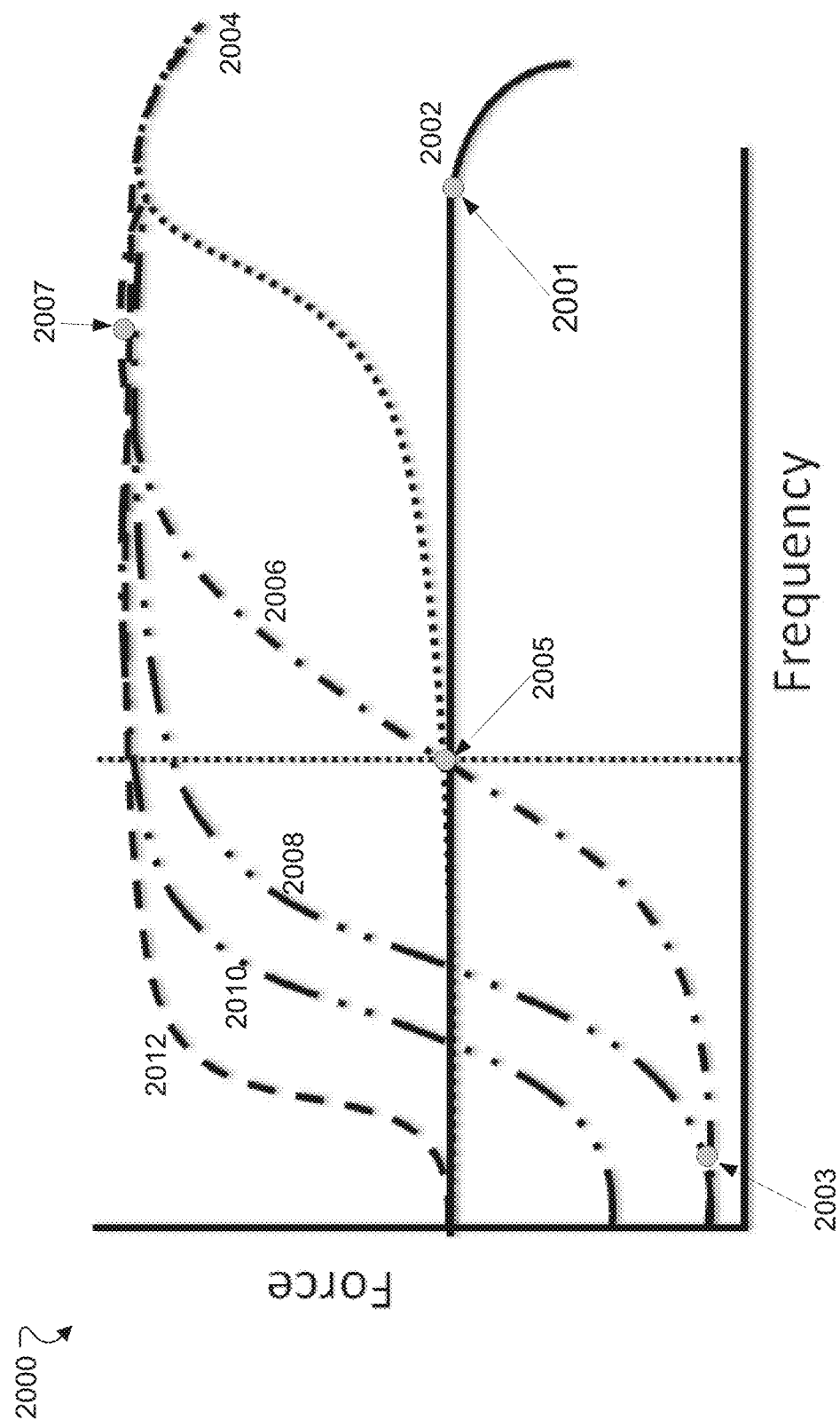
FIG. 20 illustrates effects of magnetic frequency on generated force for different flux barrier materials.

FIG. 20 illustrates forces generated by motors having different flux barriers (e.g., different materials/configurations) under a range of frequencies. Here force refers to a useful force parallel to a motion direction in which a rotor is movable with respect to a stator. Frequency refers to a magnetic frequency of an eddy current induced in a flux barrier that can be controlled by a pulse frequency of a current energizing stator poles of the stator.

Curve 2002 represents air as a passive material filling slots between adjacent rotor poles, where the useful force remains constant across low frequencies and eventually drops off rapidly at higher frequencies, e.g., over a core limit at point 2001. Curve 2004 represents a single material fill (e.g., of copper) as a dynamic non-ferromagnetic flux barrier, behaving essentially as air at low frequencies but increasing above a cross-over frequency (at cross-over point 2005). Curve 2006 represents a shielded pole (e.g., a looped pole) as a dynamic ferromagnetic flux barrier, where, at lower frequencies, e.g., below the cross-over frequency, the useful force is lower than with air, while the force drastically increases with frequency, e.g., above the cross-over frequency, faster than that with the straight non-ferromagnetic material (e.g., copper) fill represented by curve 2004. Along curve 2006, point 2003 shows a conductive slot reluctance low force limit, point 2005 shows a cross-over frequency, and point 2007 shows an air gap limited peak force.

To avoid the decrease in force at lower speeds, the motor can be operated with higher magnetic frequencies, e.g., by pulsing current through each pole winding at low revolutions per minutes (RPMs) to thereby increase the output force. The reason why the force for the shielded pole is lower than air at lower frequencies can be largely due to the fact that there is an alternative ferromagnetic flux path resulting in a relative reluctance asymmetry. At higher frequencies, the motor is dominated by a relative inductive shielding that happens at the cross-over frequency. This is the point 2005 where the saliency ratio of the shielded pole is equal to the saliency ratio of air—effectively, the skin depth of the shielded pole mimics the skin depth of air. As the frequency increases, the saliency ratio of the shielded pole continues to increase.

Curve 2012 represents a non-ferromagnetic superconductor as a straight material fill flux barrier, where a force gain is induced that is greater than that with air even at relatively low frequencies. In some cases, the flux barrier can be configured such that curve 2006 and/or the cross-over point 2005 can be moved as far to the left as possible, e.g., by adjusting the material ratio (e.g., the ratio of the electrically conductive material of the loop to the magnetically permeable material of the core), the material itself, the layering of materials (e.g., single materials or combination of materials), the orientation of material layers with respect to the magnetic interface, or the geometry (e.g., the depth, width and relative proximity with respect to the air gap). For example, if the shielded pole for curve 2006 is made of copper and rotor core iron of a 10:90 ratio, curve 2006 can become curve 2008 with the shielded pole made of copper and rotor core iron of a 66:33 ratio.

Additionally, the structure of the flux barrier may also affect the performance of the motor. When the flux barrier is made of pairs of alternating electrically conductive layer and magnetically permeable layer (e.g., copper and nickel), e.g., the flux barrier 1304 of FIG. 13, the relationship between the generated force and the frequency can be represented by curve 2010, which is closer to curve 2012 for the superconductor.

Example Flux Barriers Inside Rotor

Figure 21:
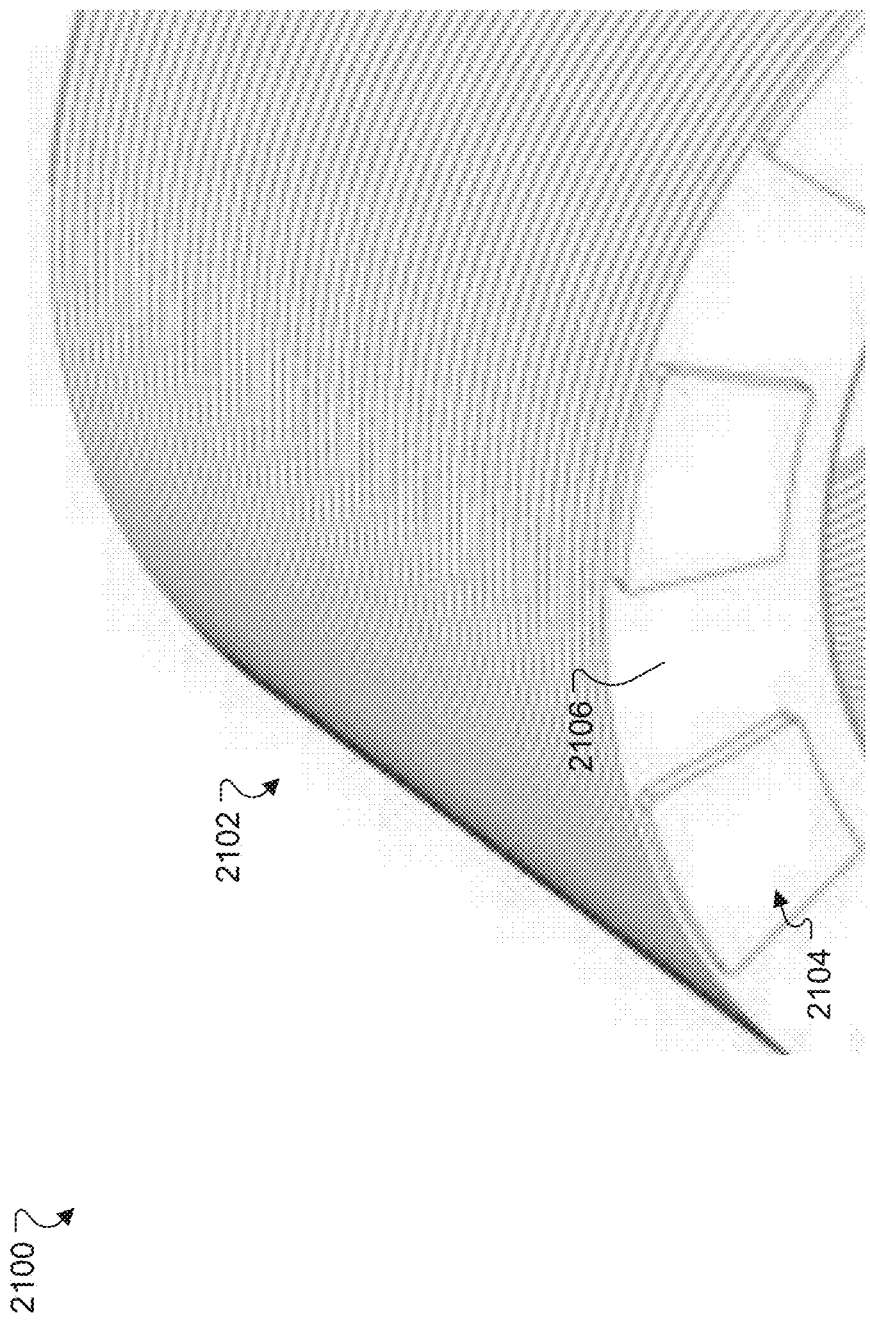
FIG. 21 is a perspective view of another rotor with flux barriers including electrically conductive bars extending longitudinally along the rotor and conductively connected by top conductive layers.
Figure 23:
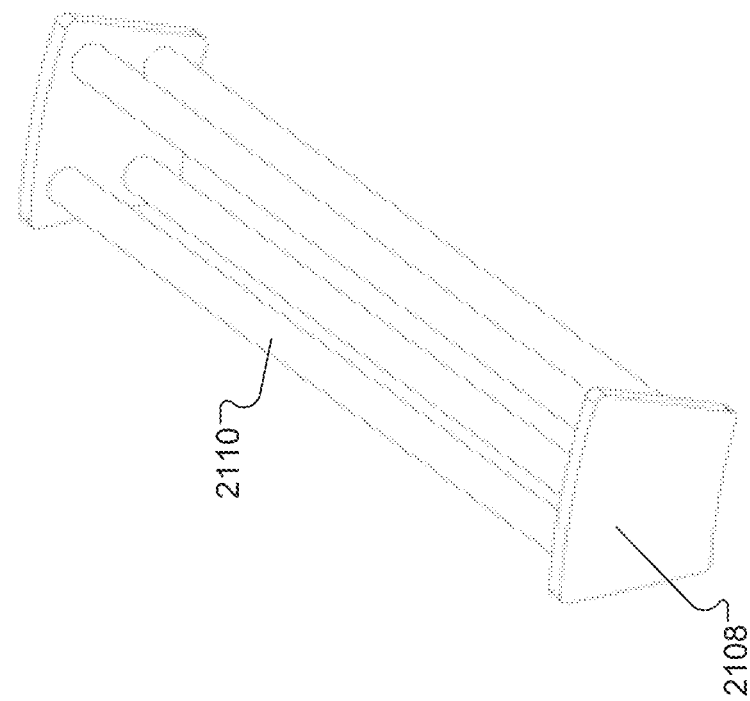
FIG. 23 illustrates a flux barrier in the rotor of FIG. 21.
Figure 22:
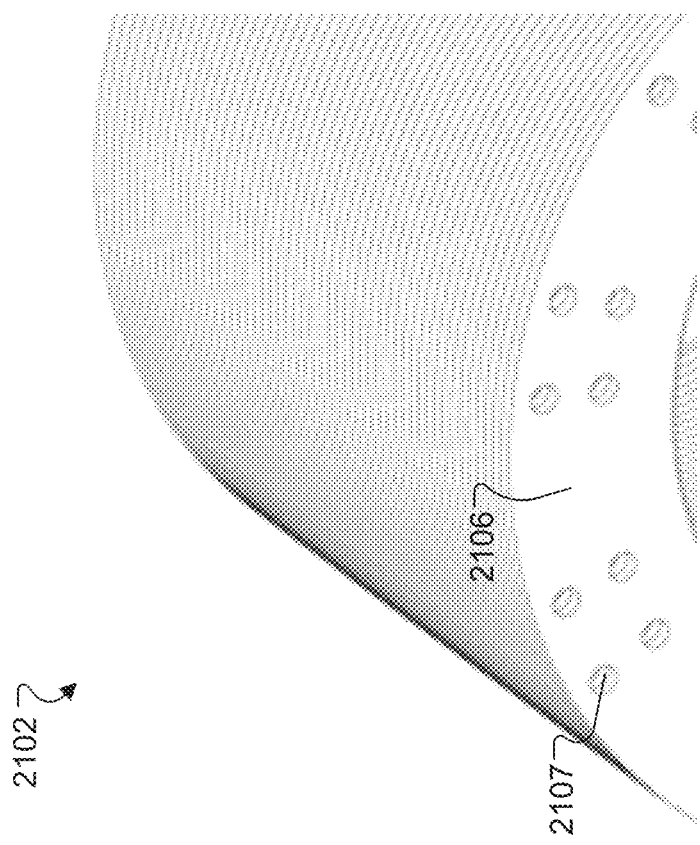
FIG. 22 illustrates the rotor of FIG. 21 without flux barriers.
Figure 24:
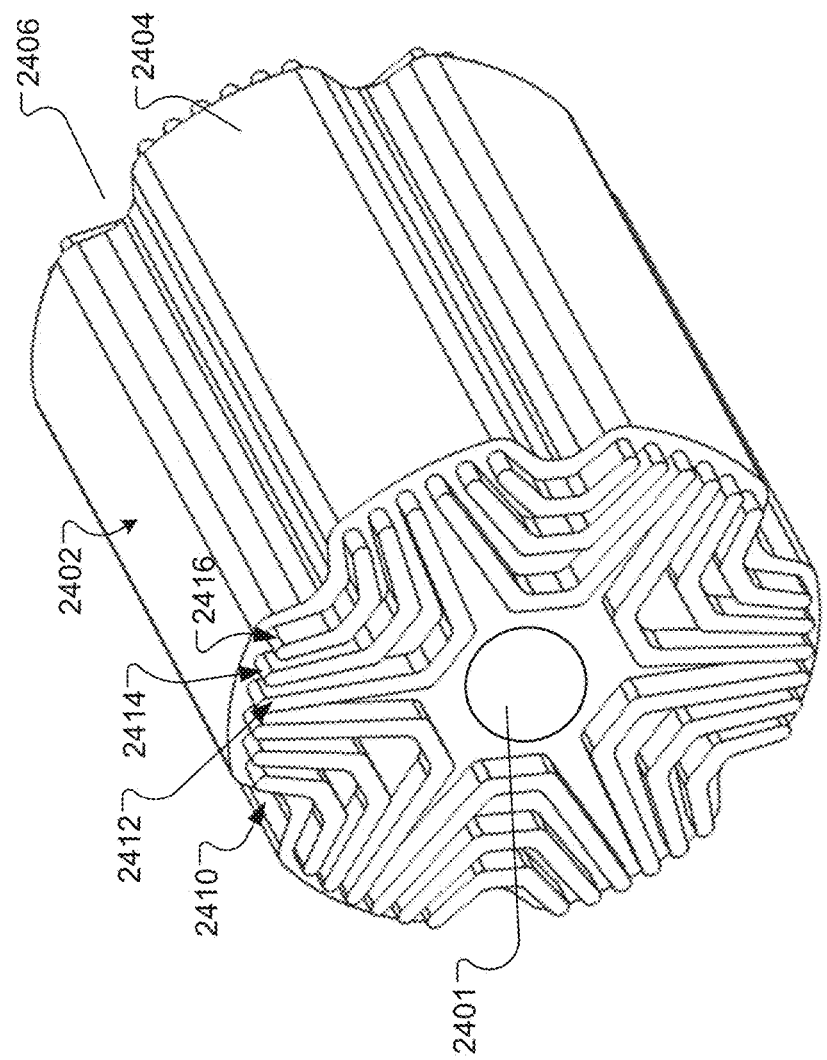
FIG. 24 is a perspective view of another rotor with distributed flux barriers inside the rotor.

FIGS. 21-23 show another rotor 2100 with flux barriers 2104 having electrically conductive elements beneath the surface of the ferromagnetic rotor material. As shown in FIG. 22, a rotor body 2102 is made of a stack of laminated layers of the ferromagnetic material. The laminated layers are separated from one another, at least at a surface of the rotor, by interfaces less electrically conductive than the ferromagnetic material. The interfaces can be current-inhibiting. The stack defines holes 2107 extending along its length, crossing the interfaces.

As shown in FIG. 23, each flux barrier includes a conductive structure having at least two electrically conductive bars 2110 (four are shown) that extend through each layer of the stack to cross each interface of the stack and are electrically connected to each other at opposite ends of the stack by conductive plates 2108 to form at least one conductive loop within the rotor. Each conductive bar is inserted into, or cast into, a corresponding longitudinal hole 2107 within the stack of rotor plates, and can then be welded or soldered to end plates 2108. Referring back to FIG. 21, each conductive structure, together with the portion of the ferromagnetic plates between and immediately surrounding the conductive bars, forms a flux barrier 2104 between two adjacent rotor poles 2106.

FIGS. 24-26A show another rotor 2400 with flux barriers 2410 having conductive elements inside a ferromagnetic material of the rotor. Similar to the rotor 600 of FIG. 6, a rotor body 2402 can be made of a stack of laminated layers of the ferromagnetic material. The laminated layers are separated from one another, at least at a surface of the rotor, by interfaces less electrically conductive than the ferromagnetic material. The interfaces can be current-inhibiting. The rotor 2400 defines a hole 2401 in a center of the rotor body 2402. The hole 2401 can be similar to the hole 605 of FIG. 6, and an output shaft, e.g., the output shaft 107 of FIG. 1, can be inserted and movable together with the rotor 2400.

Figure 25:
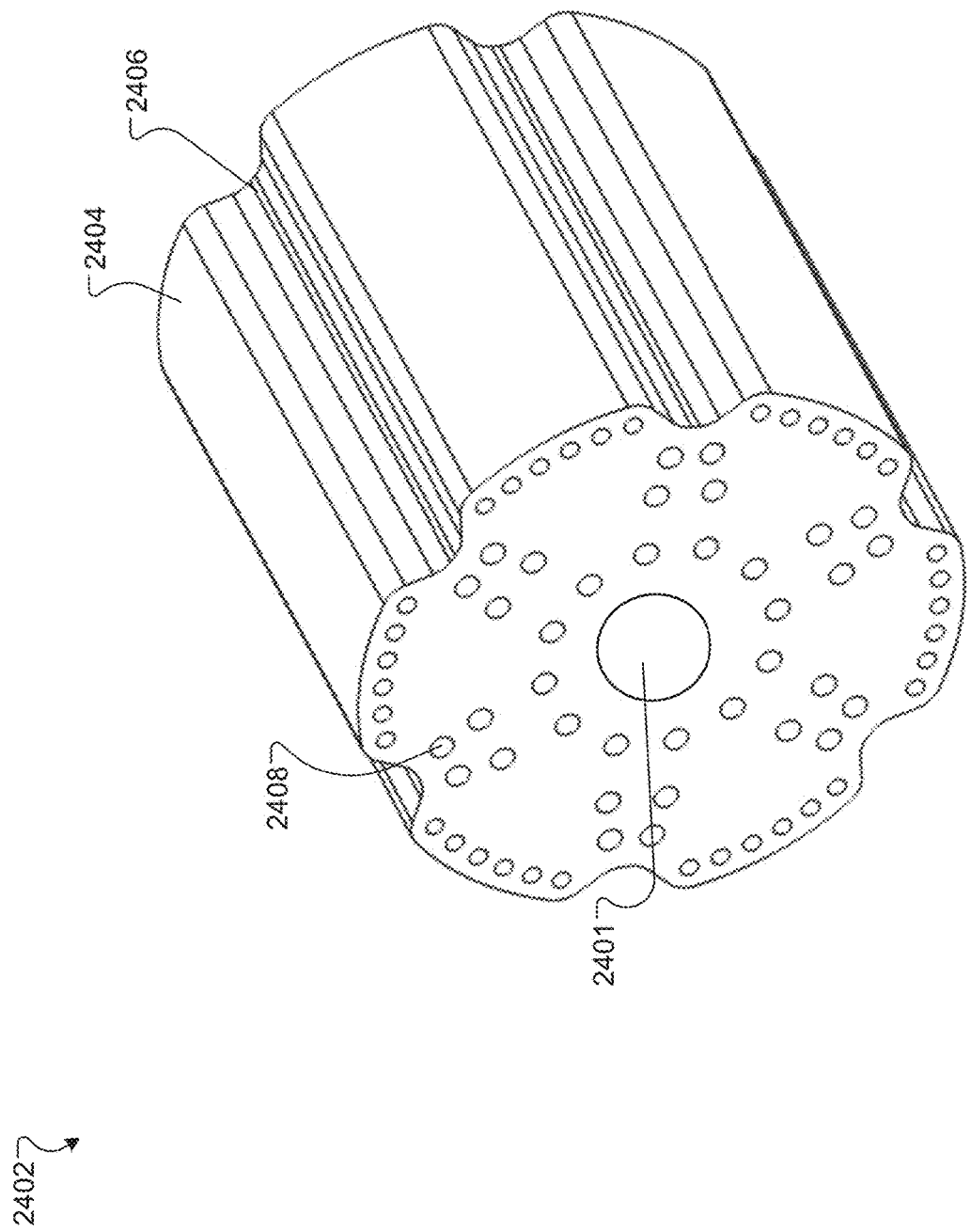
FIG. 25 is a perspective view of the rotor of FIG. 24 without the flux barriers.

As shown in FIG. 25, the rotor body 2402 defines a series of spaced-apart rotor poles 2404 forming radially outermost portions of the rotor body, with adjacent poles 2404 defining slots 2406 therebetween. The rotor body 2402 also defines holes 2408 extending in parallel along its length.

Figure 26:
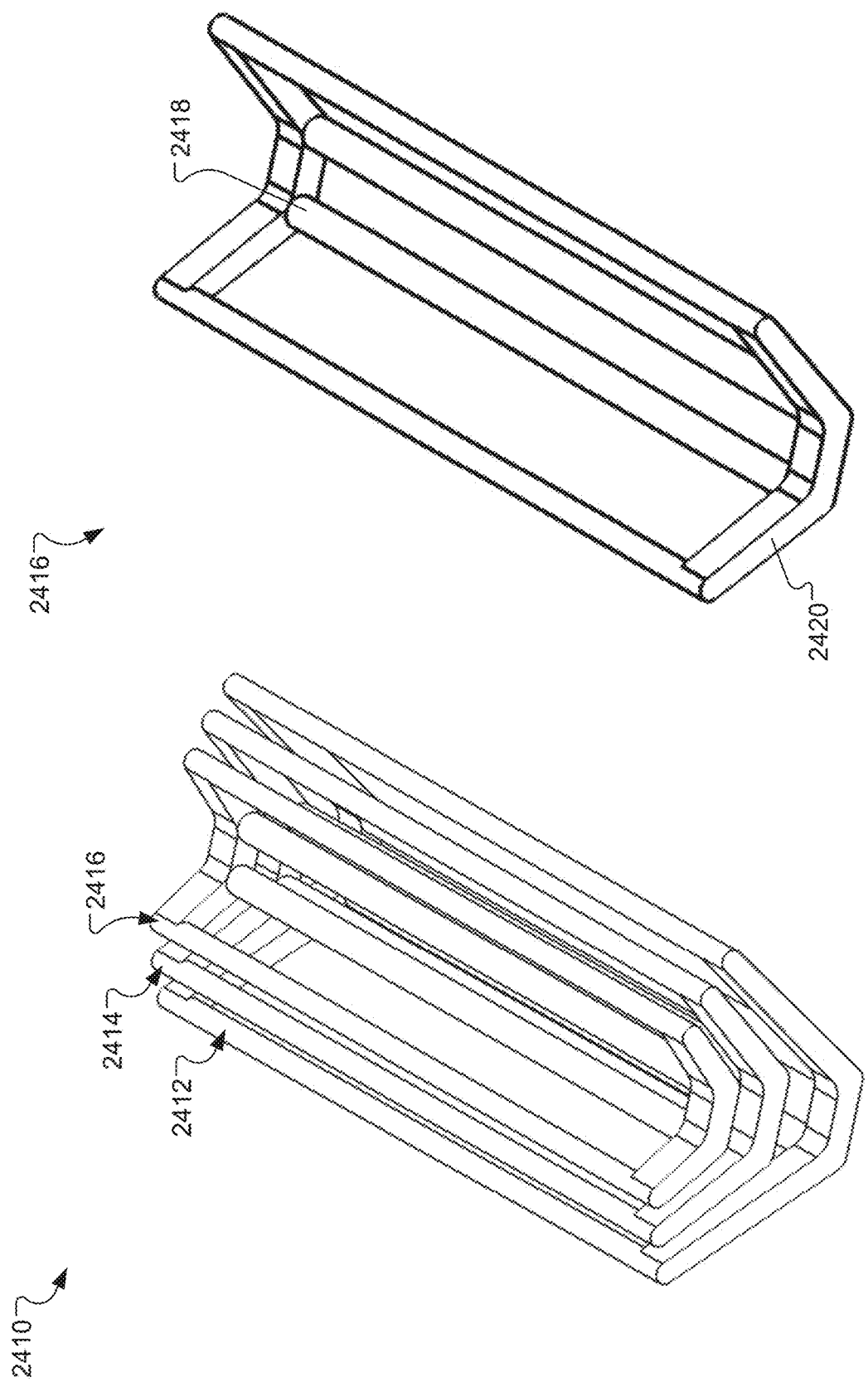
FIG. 26 is a perspective view of a flux barrier with multiple distributed portions inside the rotor of FIG. 24.

Instead of filling the slots 2406 between adjacent rotor poles 2402, each of the flux barriers 2410 includes electrically conductive elements forming at least one loop spanning a magnetically active extent of the rotor body 2402 below the rotor surface. As illustrated in FIG. 26, the conductive structure of each flux barrier 2410 includes multiple loops 2412, 2414, 2416 of electrically conductive material each isolated from one another external to the ferromagnetic material of the rotor body 2402. As illustrated in FIG. 26A, each loop, e.g., loop 2416, includes at least two electrically conductive bars 2418 electrically connected to each other at opposite ends of the stack by electrically conductive plates 2420. As assembled, each of the conductive bars extends along a corresponding hole 2408 of the rotor body, as illustrated in FIG. 25. The plates 2420 can have a curved shape with two ends on magnetically active extents of adjacent rotor poles 2404. The curved shape can be based on a shape of the slot 2406. Referring back to FIG. 24, loops 2412, 2414, 2416 of the flux barrier 2410 can be arranged in series towards the slot 2406. In a sense, the conductive loop structures of each flux barrier extend into, or span adjacent portions of, adjacent rotor poles.

The flux barriers 2410 are electrically isolated from one another external to the ferromagnetic material. Adjacent flux barriers 2410 are arranged such that any conductive path defined within the electrically conductive material of one flux barrier does not encircle any portion of any conductive path defined within the electrically conductive material of another flux barrier. The flux barriers 2410 can function as flux shields.

During operation, a transient electromagnetic field attempting to penetrate the ferromagnetic material encircled by bars 2418 and 2420 (outside bars as well) can cause current to flow in the bars and the resulting current can act to effectively block the flux from penetrating the encircled region. Magnetic flux can then follow the narrow channels between segments 2416, 2414, and 2412, resulting in paths of low reluctance flanked by paths of high reluctance. The area encircled by the flux barriers 2410 is blocked from magnetic communication, which results in clear low and high reluctance paths. The force is exerted at the shielded pole/unshielded region within the rotor, rather than at the air gap between stator and rotor poles (e.g., as illustrated in FIG. 15). The interface between an encircled core region and a non-encircled region can be considered as a pseudo-core interface.

Example Flux Barriers for Poles with Multiple, Discrete Teeth

A toothed stator-rotor interface for a motor can be created to maximize torque as a function of surface area at the stator-rotor interface. Traditional motors are generally limited by their torque as a function of surface area due to relatively weak magnetic field interactions. By including multiple, discrete teeth on each pole and effectively decreasing the tooth-to-tooth distance of the motor for the same pole, the number of cycles that a pole can be energized for a given distance traveled increases. More specifically, by putting multiple teeth on a single pole, the force as a function of surface area can be increased.

Despite achieving higher specific force for a given surface area, higher power density in such a design may be limited due to significant flux leakage. One of the primary sources of this flux leakage comes from the air of the slots that are created between the teeth, which become progressively smaller as the number of teeth increases. Accordingly, to increase motor performance using the motor with multi-teeth poles, the increased specific force that is created by increasing the number of teeth can be used at a lower current loading. Under this approach, the motor maintains a relatively low number of total poles in the system but can provide an increased number of switching cycles by enabling surface geometry on each individual pole to provide more electrical cycles per pole arc. More specifically, a given specific force can be generated in a pole with 400-700 amp*turns of magnetomotive force (MMF) whereas a typical pole would require 3,000-4,000 amp*turns of MMF to support the same force. Because fewer amp*turns require less space, this allows for a motor utilizing a multi-slot approach with proportionally smaller yoke and windings, operated at a higher frequency to achieve gains in torque and power and torque densities.

The relationship between stator and rotor teeth is preferred in a ratio of 0.6:1 and 1.4:1, more preferably 0.8:1 and 1.2:1. For a conventional slot, it is preferred that a tooth width to air gap ratio is greater than 10:1, more preferably between 30:1 and 100:1 for direct drive traction applications, and preferably 30:1 for applications requiring higher speeds. For the stator poles, it is preferred that the number of teeth per pole fall between 20-90% of the number of teeth per pole that maximize the force for the given air gap, more preferably 40-80% of the teeth that maximize the force for a given air gap.

For a given air gap, it is preferable to get the peak force with less than the maximum integer number of teeth (e.g., approximately 50-80% of the maximum). After the peak force, the gain in force starts to asymptote and becomes relatively negligible. More factors may be considered to optimize the force with a number of teeth per hole at a particular air gap for the motor design. For example, the increased air slots can cause additional flux leakage and a decrease in saliency. Also, fewer, larger poles allow for greater power density and handle higher current loading further into saturation. Moreover, as discussed below, the teeth slots can be filled with diamagnetic material, which can also affect motor performance.

For a given pole, the maximum inductance remains approximately the same as tooth size decreases and the number of teeth increases. However, the minimum inductance increases due to the permeability of air in the increasingly smaller slots. Thus, total energy per cycle decreases as a result when the number of teeth per pole increases.

Figure 27:
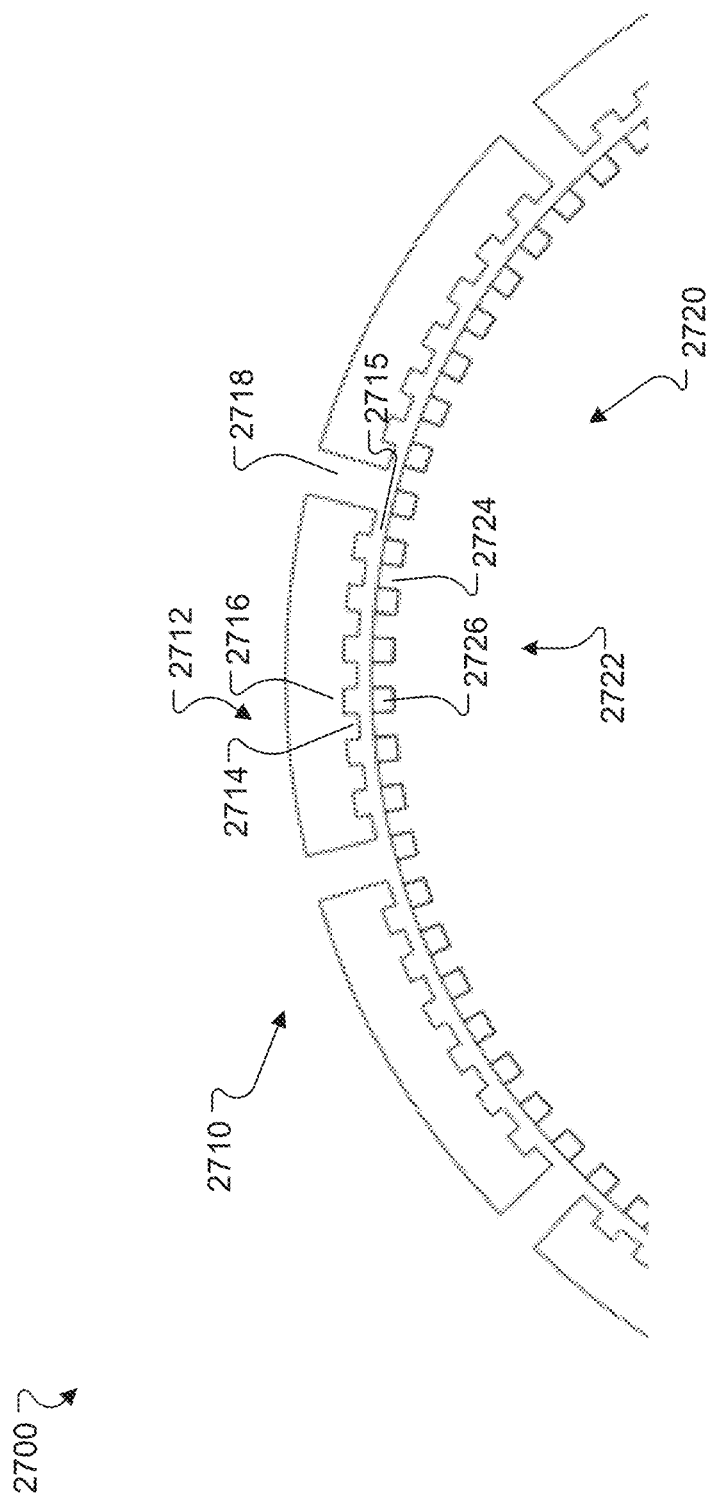
FIG. 27 illustrates multiple, discrete teeth on each pole of a motor with flux barriers in slots of adjacent rotor poles.

FIG. 27 illustrates a motor 2700 including multiple, discrete teeth on each pole of the motor. The motor 2700 includes a stator 2710 and a rotor 2720. Outer surfaces of the stator 2710 and the rotor 2720 define an air gap 2715. The motor 2700 is similar to the motor 400 of FIG. 4, except that each stator pole 2712 of the stator 2710 includes multiple teeth 2714 with slots 2716 therebetween and each rotor pole 2722 of the rotor 2720 includes multiple teeth 2724 with slots 2726 therebetween. Note that there can be slots 2718 between adjacent stator poles 2712, while the rotor 2720 can include continuous alternating tooth 2724 and slot 2726 along the outer surface of the rotor 2720.

Flux barriers can be formed between adjacent rotor teeth 2724 and/or adjacent stator teeth 2714. The flux barriers can be similar to the flux barriers 704 of FIG. 7, the flux barriers 1104 of FIG. 11, the flux barriers 1304 of FIG. 13, or the flux barriers 1404 of FIG. 14.

The flux barrier material can be an inductive material having greater diamagnetic properties than air during operation to increase the total energy per cycle. This creates a dynamic magnetic flux barrier. Using the impedance of an inductor to provide such diamagnetic property results in a greater saliency ratio during moderate, medium, and high-frequency operation, e.g., from 2 Hz to 1 MHz. As discussed above, this can be achieved by using the skin effect of an all-metal single material such as aluminum, copper, brass, silver, zinc, gold, pyrolytic graphite, bismuth, graphene, or carbon-nanotubes, or, more preferably, a super conductor. The super conductor can be operated at a frequency of 0.5 Hz or above, and copper can be operated at moderate to higher frequencies of 20 kHz to 1 MHz. In other embodiments, ferromagnetic combinations of materials can be used such as copper-iron, lead-iron, brass-iron, silver-iron, zinc-iron, gold-iron, bismuth-iron, aluminum-iron, pyrolytic graphite-iron, graphene-iron, carbon-nanotubes-iron, or Alinco (aluminum-nickel-cobalt) alloys, which can be operated at 100 Hz to 20 kHz. In other embodiments, higher inductance fillings can be used to generate equivalent impedance, such as constructing a looped pole or shielded pole (e.g., copper-shielded iron pole) at lower frequencies. Such a combination of diamagnetic and ferromagnetic materials approximates the properties of a meta-material. Structurally, this slot fill starts to approximate a smooth, continuous surface of the rotor and stator faces and, as the teeth decrease in size, such slot fill material can serve as mechanical support to prevent physical deformations caused by forces generated in operation.

As the teeth get smaller on a given pole, the slots get closer together and the resultant flux leakage causes both the saliency ratio and work per cycle, and thus torque, to decrease. By replacing air with materials that approximate a diamagnetic material (e.g., a single diamagnetic material or a combination of diamagnetic and ferromagnetic materials), it is possible to treat increasing the number of teeth of the motor as an effective electromagnetic reduction, similar to a gearbox. Whereas energy per cycle, and thus torque, go down as a result of increasing the number of teeth per pole for a given pole size, torque and power density can be attained by increasing the saliency ratio using a diamagnetic material. A further benefit of the pole design or configuration, especially with diamagnetic slot fill, is that the magnetic field on the pole with a number of teeth is going in a single direction on a given pole, as opposed to a constant reversing field in a typical motor.

As discussed above in FIG. 20, at lower frequencies the generated useful force stays constant or flat as a function of frequency, as the diamagnetic flux barrier appears like air and has no or little effect. At medium-high frequencies, the flux shielding effect begins to dominate and the force continues to increase with higher frequencies. Thus, by filling the slots with diamagnetic flux barriers, lower drive current (thus less turns) can be used, which can save money by using less wire and increase efficiency by reducing resistance loss. Moreover, the motor performance can be further improved by using higher drive current, e.g., through saturation. Also, the slot depth has an effect on the generated horizontal force. The resulting force can be substantially proportional to the depth of the slot along a direction perpendicular to the air gap.

Axial-Gap Motors with Flux Barriers

Figure 28:
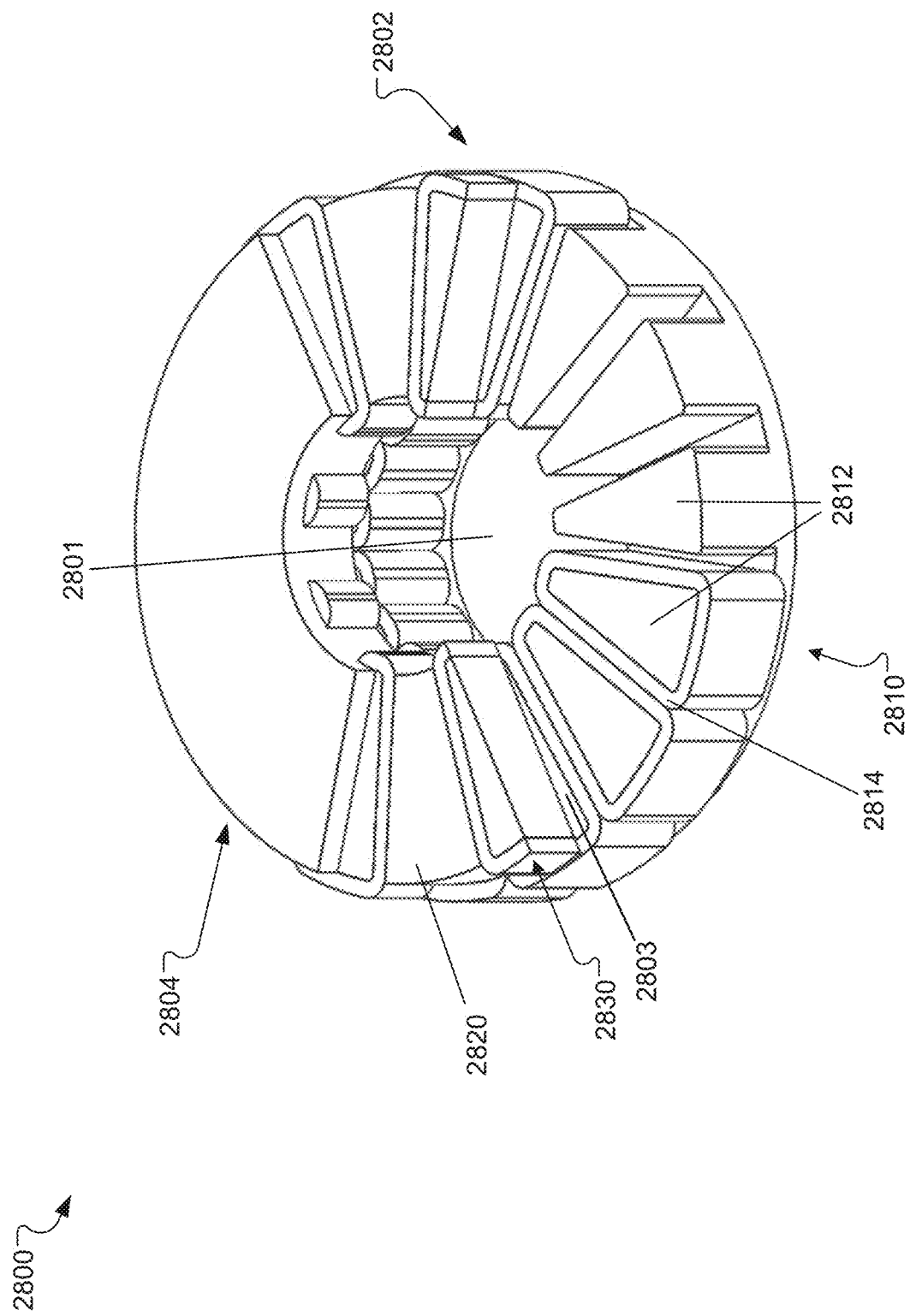
FIG. 28 is a perspective view of an axial-gap motor with flux barriers in slots of rotor poles.
Figure 30:
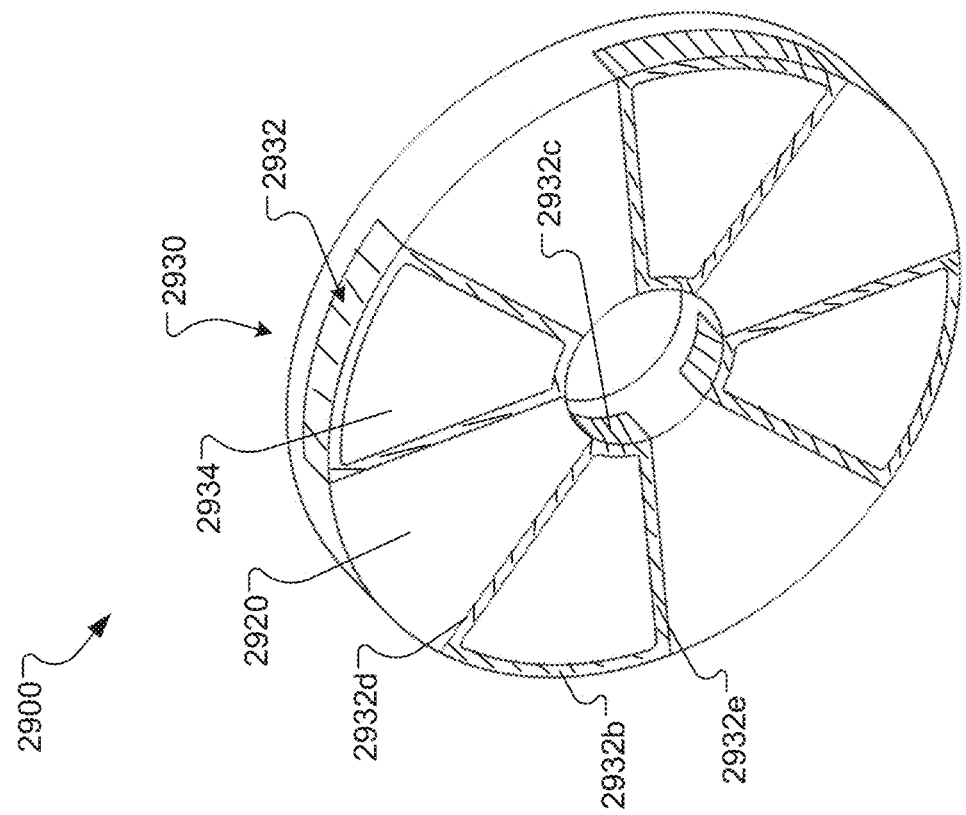
FIG. 30 is an open view of the rotor with the shielded poles of FIG. 29.
Figure 29:
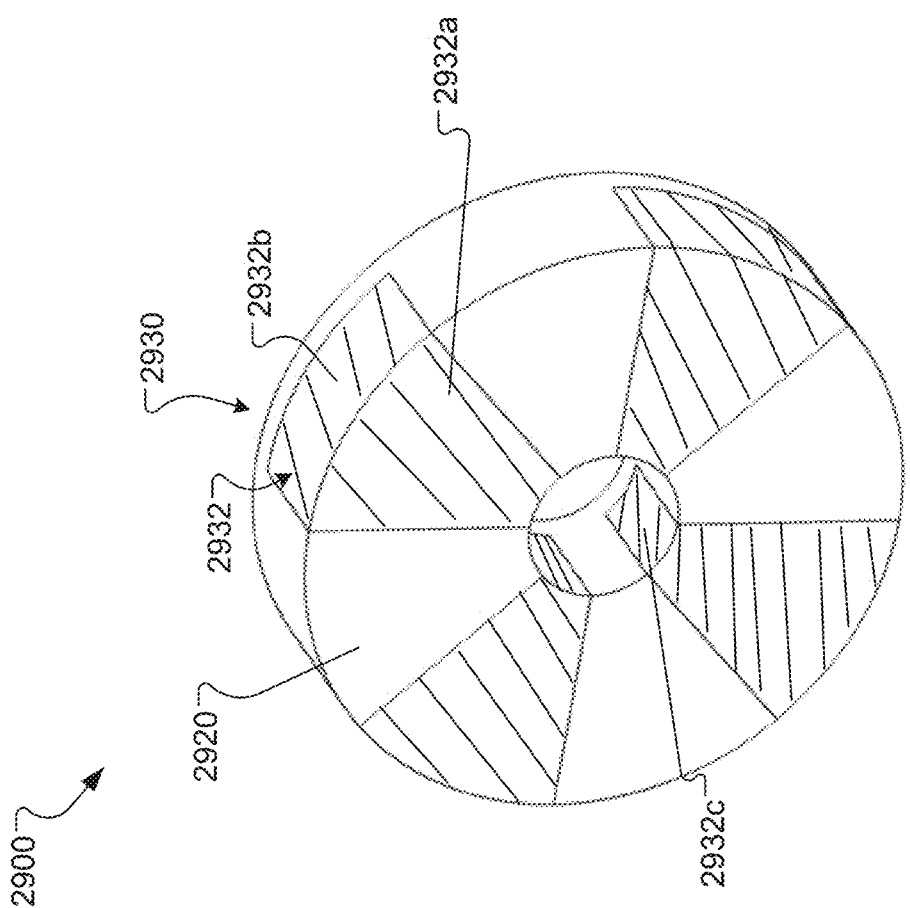
FIG. 29 illustrates a rotor in an axial-gap motor with shielded poles as flux barriers between adjacent poles.

FIG. 28 is a perspective view of an example axial-gap motor 2800 with flux barriers between adjacent rotor poles.

Axial-gap motor 2800 has a rotor 2804 arranged in parallel to a stator 2802. The rotor 2804 defines a central hole 2801, and an output shaft can be arranged in the central hole 2801 so that the rotor 2804 is rotatable together with the output shaft.

The rotor 2804 is movable with respect to the stator 2802 by rotation about a rotational axis of the rotor (or a rotational axis of the output shaft). An end surface of the rotor 2804 is perpendicular to the rotational axis of the rotor. The end surface of the rotor 2804 is spaced apart from an end surface of the stator 2802 along the rotational axis to define a nominal gap 2803. The nominal gap 2803 is an axial gap between the end surfaces of the stator 2802 and the rotor 2804 and along the rotational axis of the rotor.

The stator 2802 defines a series of stator poles 2810 each including a stator pole core 2812 surrounded by an associated electrical winding 2814. The electrical windings 2814 of the stator 2802 are independently activatable and spaced apart circumferentially about the stator. The rotor 2804 has a series of rotor poles 2820 with flux barriers 2830 between the rotor poles 2820. Each flux barrier 2830 has an electrically conductive loop surrounding a core of magnetically permeable material. The cores of the flux barriers, the rotor poles and the rotor back plate can all be portions of a contiguous piece of ferromagnetic material, such as formed by pressed, sintered powder. The conductive loops of the flux barriers can be, for example, copper rings pressed over the cores.

FIGS. 29-32 show different views of a rotor 2900 of another axial-gap motor. Rotor 2900 has a flat active end surface (facing the stator, not shown), including pole surface regions forming rotor poles 2920, and inter-pole surface regions formed by flux barriers 2930 between the pole surface regions. In this example, the flux barriers 2930 are shielded poles, similar to the shielded poles 1404 of FIG. 14.

Each flux barrier 2930 includes an electrically conductive material forming a loop 2932 about a core 2934 of a core material. The core material is more magnetically permeable than the electrically conductive material. The core material can be ferromagnetic. The core material of the cores 2934 and pole material of the rotor poles 2920 can be the same, and the cores 2934 and the rotor poles 2920 form a continuous whole rotor body, such as of sintered iron powder. The conductive material of the flux barriers can be cast into the formed rotor core.

As illustrated in FIGS. 29-32, each loop 2932 includes five loop portions 2932a, 2932b, 2932c, 2932d, and 2932e. The loop portion 2932a form a portion of the end surface of the rotor 2900.

The loop portion 2932b extends along a direction parallel to the rotational axis to an extent with a depth, and forms a portion of an outer radial surface of the rotor 2900. The end surface is perpendicular to the outer radial surface. The loop portion 2932c extends along a direction parallel to the rotational axis to an extent with a depth, and forms a portion of an inner radial surface of the rotor 2900. The depth of the loop portion 2932c can be identical to the depth of the loop portion 2932b.

The loop portions 2932d and 2932e extend along a radial direction from the inner radial surface of the rotor to the outer radial surface of the rotor to form shielding walls between adjacent rotor poles 2920 and the core 2934. The loop portions 2932d and 2932e also extend into the rotor body to an extent with a depth that can be identical to the depth of the loop portions 2932b and 2932c. Each of the loop portions can have a consistent and identical thickness, preferably greater than an electric current skin depth of the electrically conductive material of the loop 2932 at a particular operational frequency.

Stators with Flux Barriers

Flux barriers can also be provided in stators of the motors to further increase performance.

Figure 33:
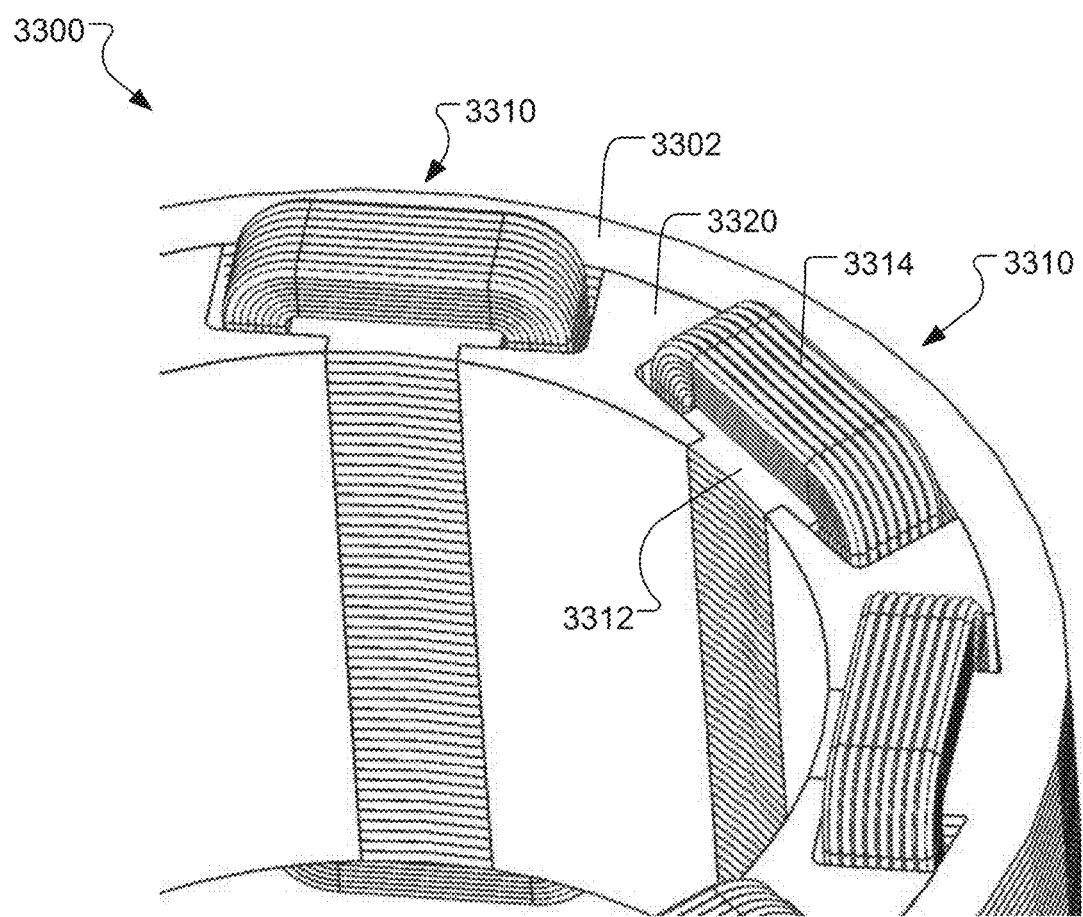
FIG. 33 is a perspective view of a stator with flux barriers including electrically conductive material extending into edges of stator poles and filled in slots between adjacent stator poles.

FIG. 33 shows a stator 3300 with flux barriers 3320 arranged between stator poles 3310. The stator poles 3310 can be housed or connected by a magnetically permeable yoke 3302. Each stator pole 3310 includes a stator core 3312 surrounded by associated electrical windings 3314. The stator cores 3312 (and yoke) can be made of a stack of layers of ferromagnetic material extending along a longitudinal axis. The layers are separated from one another by interfaces less electrically conductive than the ferromagnetic material. The stator cores 3312 can be stator projections that protrude from the yoke 3302.

Figure 34:
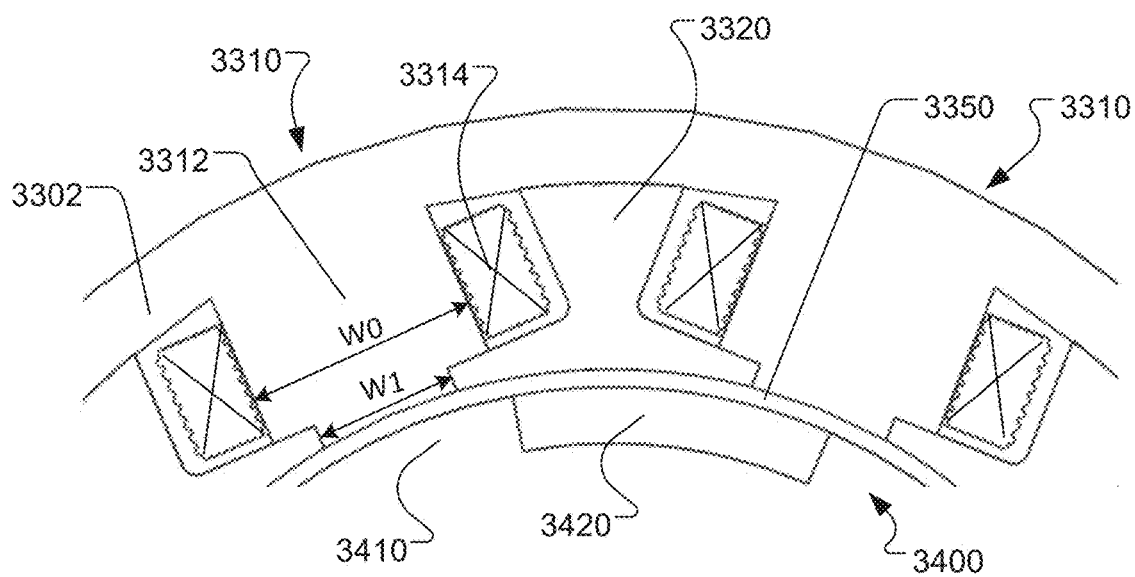
FIG. 34 is a schematic diagram of the stator of FIG. 33 with respect to a rotor.

Each flux barrier 3320 forms flux shields extending along opposite edges of the stator poles 3310 and formed of a material having a greater electrical conductivity than the ferromagnetic material of the stator cores 3312. The flux barrier 3320 can extend into gaps between adjacent electrical windings 3314. As illustrated in FIG. 34, the flux barrier 3320 can extend from an air gap 3350 to the yoke 3302 connecting adjacent stator poles 3310. The air gap 3350 is defined between two outer surfaces of the stator 3300 and a rotor 3400. The rotor 3400 includes a series of rotor poles 3410 with flux barriers 3420 therebetween, as discussed above.

As illustrated in FIGS. 33 and 34, each stator core 3312 surrounded by the electrical windings 3314 has an angular width W0 along a circumference of the stator 3300. Flux barriers 3320 extend into notches at the faces of the stator cores 3312, such that an angular width W1 of the stator core 3312 at the air gap, between opposite edges of adjacent flux barriers 3320, is smaller than the angular width W0 of the stator core 3312 surrounded by the electrical windings 3314. That is, W1<W0.

Figure 35:
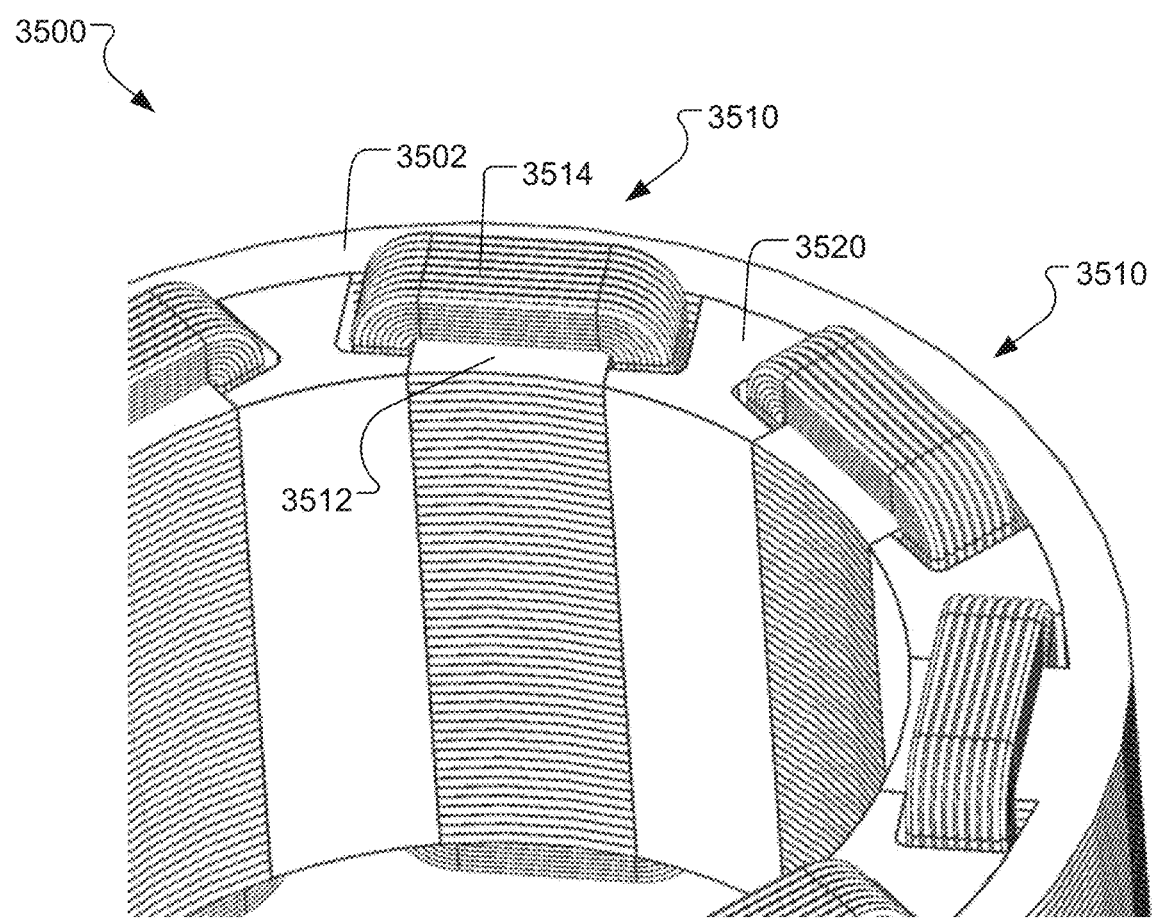
FIG. 35 is a perspective view of another stator with flux barriers including electrically conductive material formed on edges of stator poles and filled in slots between adjacent stator poles.
Figure 36:
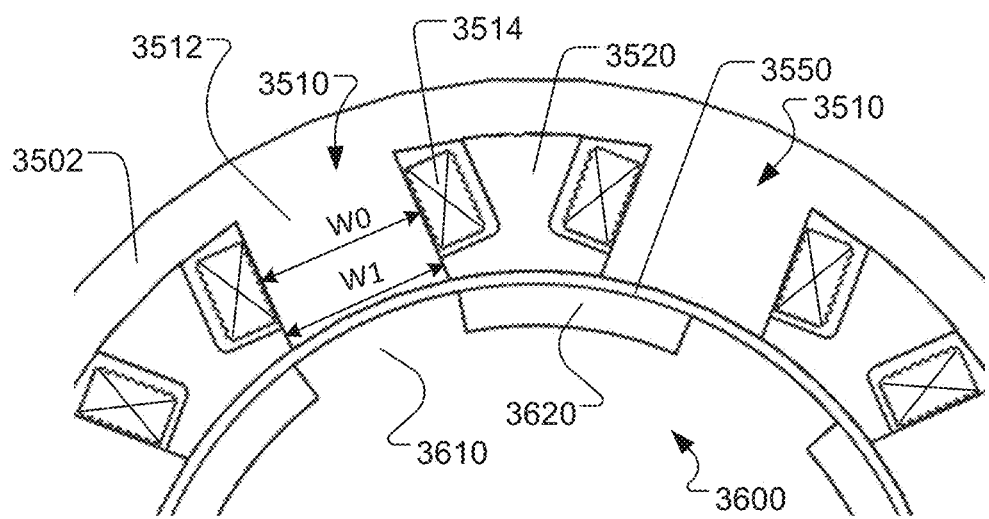
FIG. 36 is a schematic diagram of the stator of FIG. 35 with respect to a rotor.

FIG. 35 shows another stator 3500 with flux barriers 3520 arranged between stator poles 3510. Similar to the stator 3300 of FIGS. 33-34, each stator pole 3510 includes a stator core 3512 surrounded by associated electrical windings 3514. The stator cores 3312 can be stator projections that protrude from a magnetically permeable yoke 3502, formed as a stack of magnetically permeable plates with current-inhibiting interfaces. Each flux barrier 3520 is formed of a material having a greater electrical conductivity than a material of the stator cores 3512 and crossing the interfaces of the stack. As illustrated in FIG. 36, the flux barrier 3520 can extend from an air gap 3550 to the yoke 3502, connecting adjacent stator poles 3510 at the air gap 3550 defined between the stator 3500 and a rotor 3600. The rotor 3600 includes a series of rotor poles 3610 with flux barriers 3620 therebetween, as discussed above.

Motor 3500 differs from that of FIGS. 33-34 in that the angular width of the stator cores is essentially constant from the air gap to the yoke 3502. That is, W0=W1.

Figure 37:
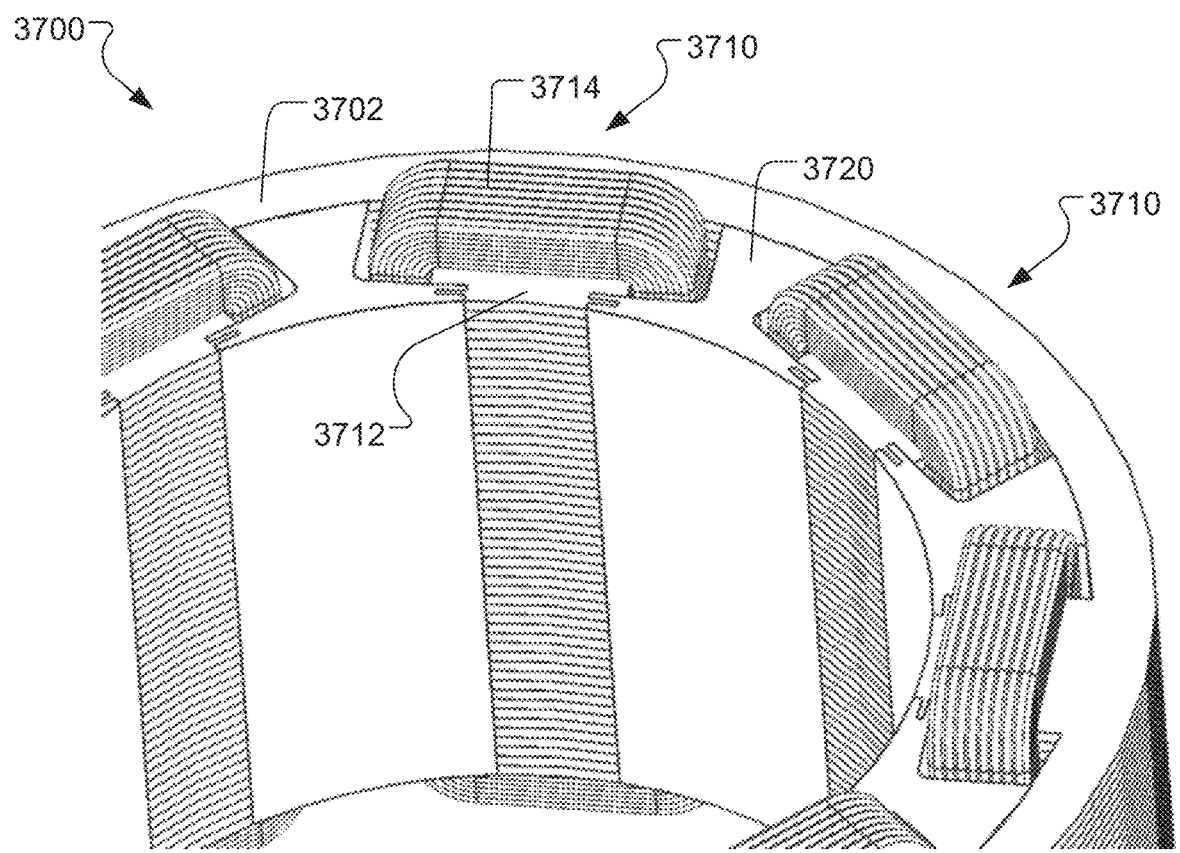
FIG. 37 is a perspective view of another stator with flux barriers including electrically conductive material fit in slots between adjacent stator poles and matched with edges of the stator poles.
Figure 38:
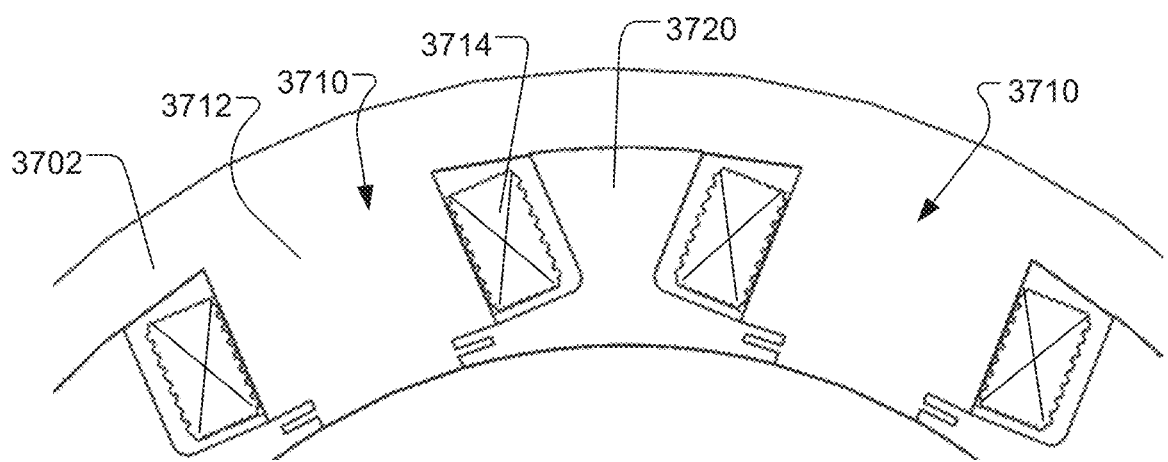
FIG. 38 is a schematic diagram of the stator of FIG. 37.

FIG. 37 shows another stator 3700 with flux barriers 3720 arranged between stator poles 3710. Similar to the stator 3300 of FIGS. 33-34, each stator poles 3710 includes a stator core 3712 surrounded by associated electrical windings 3714. The stator cores 3712 can be stator projections that protrude from a magnetically permeable yoke 3702, with stator cores and yoke formed as a stack of ferromagnetic plates with current-inhibiting interfaces. Each flux barrier 3720 is formed of an electrically conductive material and crosses at least a majority of the plate interfaces of the stator cores. As illustrated in FIG. 38, the flux barrier 3520 can extend from an inner surface of the stator 3700 to the yoke 3502 connecting adjacent stator poles 3710.

Stator cores 3712 have longitudinally continuous tabs that are received in corresponding slots of the flux barriers 3720. After the windings are assembled onto the cores, the flux barriers can be inserted longitudinally and held in place by the tabs of the stator cores, further securing the windings.

Linear Motors with Flux Barriers

As discussed above, flux barriers can be configured in radial-gap motors and axial-gap motors, in which rotor poles and/or stator poles are arranged circumferentially. In the following, linear mirrors with flux barriers are discussed, in which rotor poles and/or stator poles are arranged linearly, and the relative motion between stator and rotor is along a line.

Figure 39:
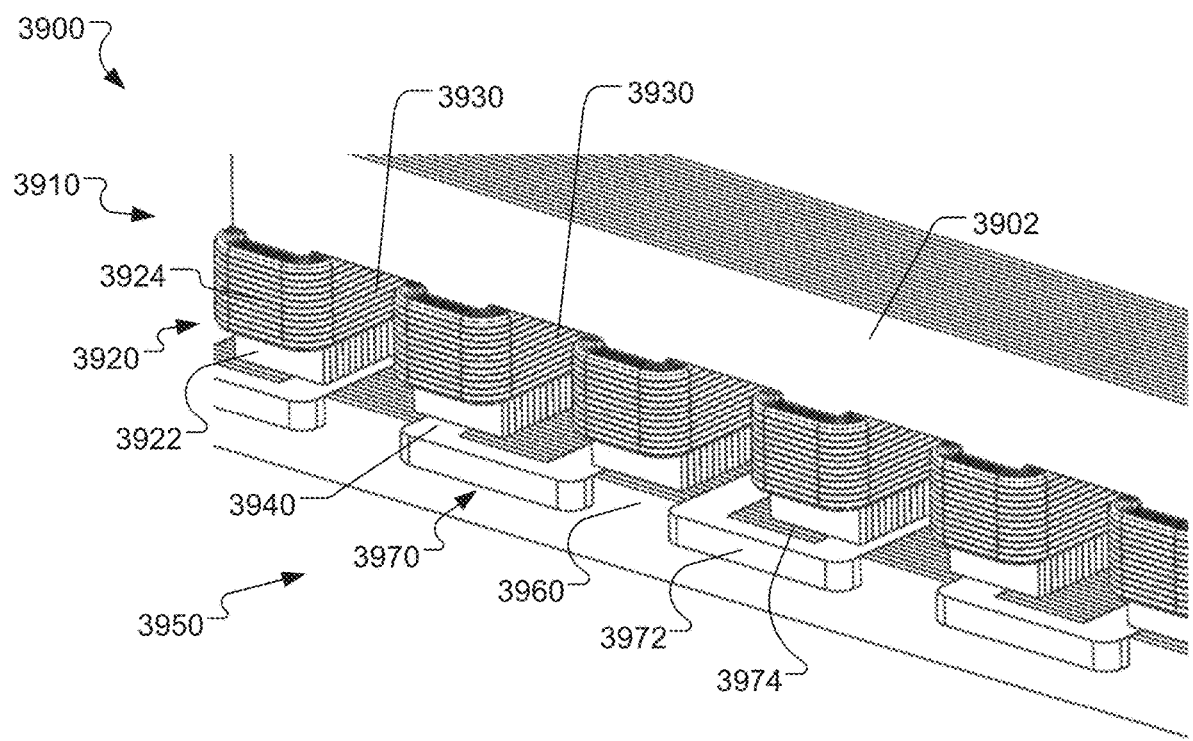
FIG. 39 is a perspective view of an example linear motor including a rotor with flux barriers between rotor poles.
Figure 40:
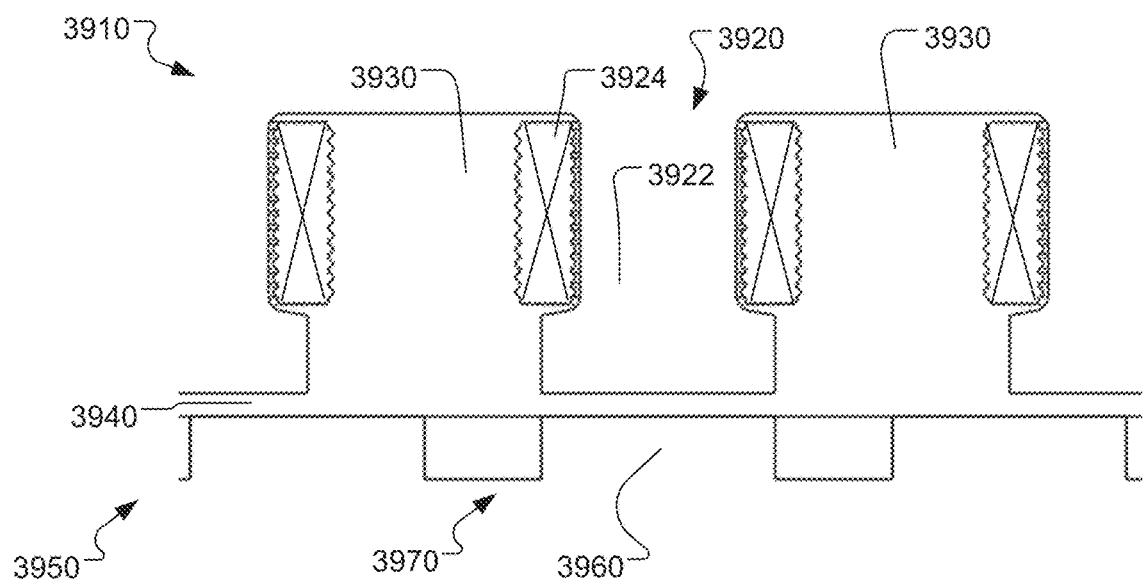
FIG. 40 is a schematic diagram of the linear motor of FIG. 39.

FIGS. 39 and 40 show an example linear motor 3900 including a stator 3910 and a rotor 3950. The rotor 3950 is movable with respect to the stator 3910 along a motion direction and defines, together with the stator 3910, a nominal gap 3940 having a width perpendicular to the motion direction.

The stator 3910 defines a series of stator poles 3920 positioned linearly along the motion direction and connected linearly by a magnetically permeable yoke or back plate 3902. Each stator pole 3920 includes a stator core 3922 surrounded by associated electrical windings 3924. The stator cores 3922 can be made of a stack of layers of ferromagnetic material, with each layer extending along the motion direction. The layers are separated from one another by interfaces less electrically conductive than the ferromagnetic material. The stator cores 3922 can be stator projections that protrude from the yoke 3902. The stator projections define slots 3930 therebetween.

The rotor 3950 includes a series of rotor poles 3960 with flux barriers 3970 therebetween and spaced apart along the motion direction. The flux barriers 3970 can be shielded poles, similar to the flux barriers 1504 of FIG. 15. Each flux barrier 3970 is made of an electrically conductive loop 3972 about a magnetically permeable core 3974 between adjacent rotor poles 3960. The rotor poles 3960 can be made of a laminated stack of layers of ferromagnetic material separated from one another by interfaces less electrically conductive than the ferromagnetic material. Flux barriers 3970 each have a flat outer surface parallel to the motion direction and forming an inter-pole surface region between pole surface regions of the rotor poles 3960. The inter-pole surface regions and the pole surface regions define an outer surface (or an end surface) of the rotor 3950. Each core 3974 forms a portion of the outer surface surrounded by a respective loop 3972. The loops 3972 can be made of an electrically conductive, low energy product material, such as copper. A material of the core 3974 is more magnetically permeable than the material of the loops 3974. The material of the cores 3974 and the ferromagnetic material of the rotor poles 3960 can be contiguous portions of the stack of the layers. The loops 3972 of the flux barriers 3970 are non-overlapping and electrically isolated from one another external to the ferromagnetic material. The flux barriers 3970 are electrically connected to each other only through the ferromagnetic material, if at all.

Figure 41:
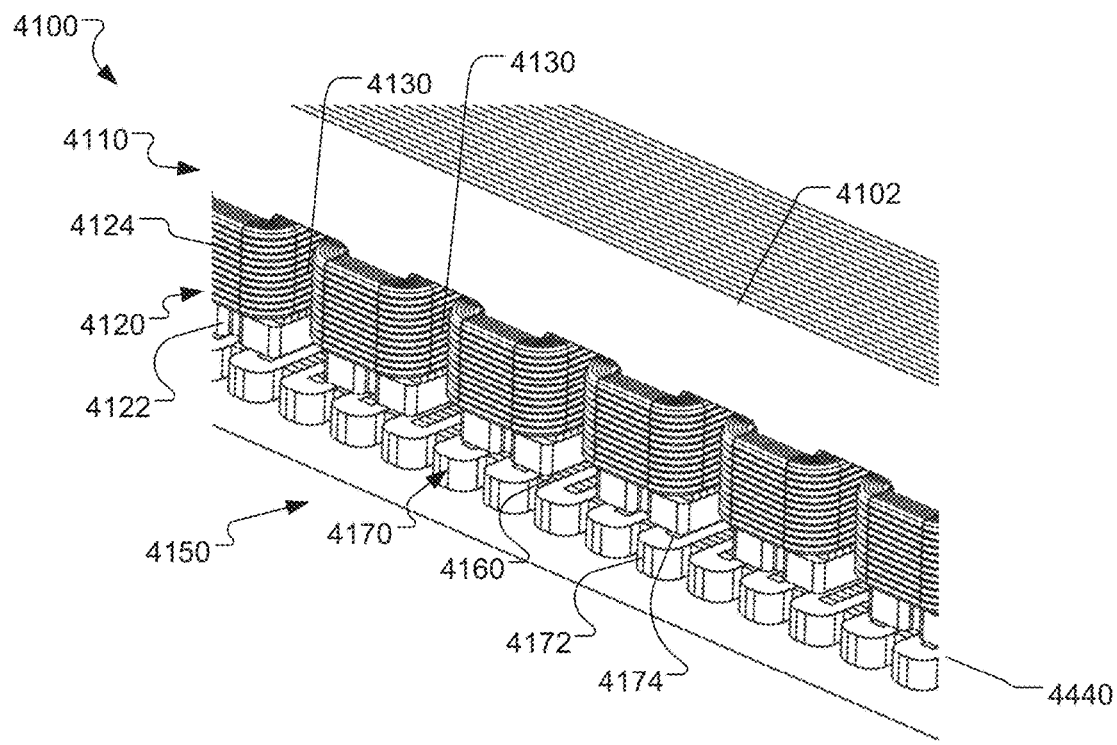
FIG. 41 is a perspective view of another example linear motor including flux barriers filled in multi-teeth stator poles and rotor poles.
Figure 42:
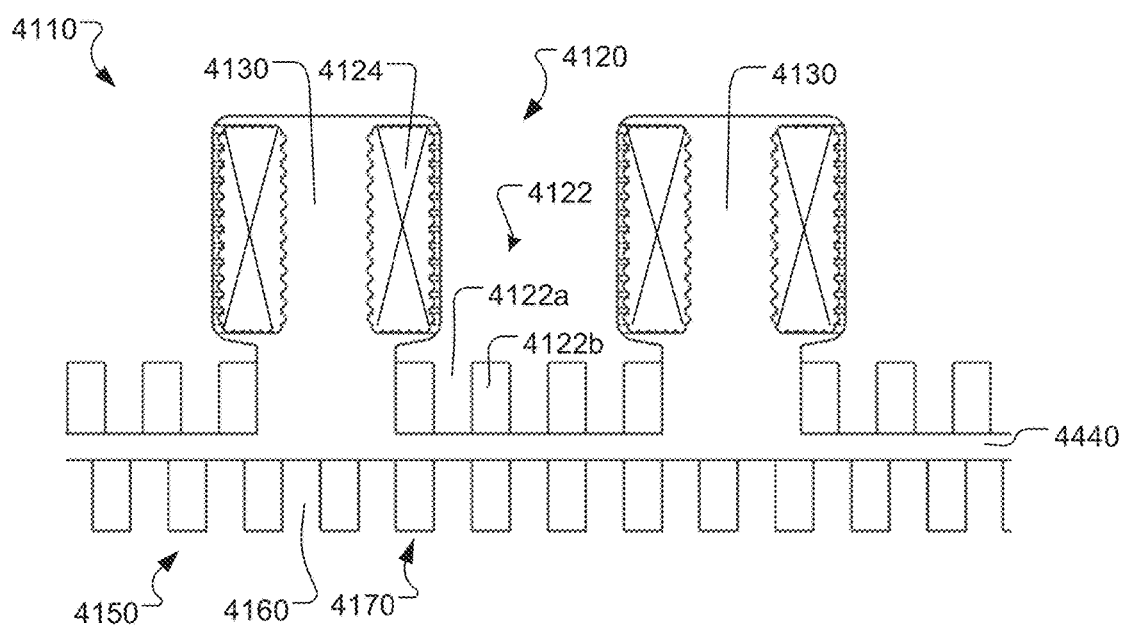
FIG. 42 is a schematic diagram of the linear motor of FIG. 41.

FIGS. 41 and 42 show another example linear motor 4100 including a stator 4110 and a rotor 4150, where the stator 4110 and the rotor 4150 each have multiple teeth poles, as described above with respect to FIG. 27, but in which the conductive material between teeth is formed into loops. The rotor 4150 is movable with respect to the stator 4110 along a motion direction and defines, together with the stator 4110, a nominal gap 4440 having a width perpendicular to the motion direction.

Similar to the stator 3910 of FIGS. 39-40, the stator 4110 defines a series of stator poles 4120 positioned linearly along the motion direction and connected linearly by a magnetically permeable yoke or back plate 4102. Each stator pole 4120 includes a stator core 4122 surrounded by associated electrical windings 4124. The stator cores 4122 can be made of a stack of layers of ferromagnetic material, each layer extending along the motion direction. The layers are separated from one another by interfaces less electrically conductive than the ferromagnetic material. The stator cores 4122 can be stator projections that protrude from the yoke 4102. The stator projections define slots 4130 therebetween. Different from the stator 3910, the stator pole 4120 (or the stator core 4122) includes multiple teeth 4122a with slots 4122b therebetween, at least at the outer surface of the stator pole 4120. As discussed above, flux barriers are formed in the slots 4122b between multiple stator pole teeth 4122a. In the configuration shown, material in the two left slots 4122b of each stator pole forms a loop around the left stator tooth 4122a, and material in the two right slots forms a second loop around the right stator tooth 4122a. In this configuration, the two loops act to shield flux penetration through the outer two stator pole teeth. Alternatively, electrically conductive material filling each of the inter-tooth slots 4122b can each act as a separate, local flux reflector through the effect of eddy currents set up within the conductive material (without forming a loop with the material of an adjacent slot). As another alternative, each slot 4122b may itself contain a shielded pole flux barrier.

The rotor 4150 includes a series of rotor poles positioned linearly along the motion direction. Each rotor pole includes multiple teeth 4160 with flux barriers 4170 in slots between adjacent teeth 4160. Each flux barrier 4170 can be shielded poles, similar to the flux barriers 3970 of FIG. 39. Each flux barrier 4170 is made of an electrically conductive loop 4172 about a magnetically permeable core 4174 between adjacent rotor pole teeth 4160. The loops 4172 can be made of an electrically conductive, low energy product material. A core material of the core 4174 is more magnetically permeable than the material of the loops 4174. The core material of the cores 4174 and the ferromagnetic material of the rotor poles 4160 can be contiguous portions of the stack of the layers. The loops 4172 of the flux barriers 4170 are non-overlapping and electrically isolated from one another external to the ferromagnetic material. The flux barriers 4170 can be connected to each other only through the ferromagnetic material.

Operation of Motors with Flux Barriers

Effects of flux barriers can vary on horizontal forces under different frequencies. As illustrated in FIG. 20, a horizontal force can start to increase above a cutoff frequency, e.g., 10 Hz, and the increase between a lower frequency, e.g., 10 Hz, and a higher frequency, e.g., $10^5$ Hz, can be more than one order of magnitude. At higher frequencies, a flux barrier can exhibit stronger diamagnetic properties to concentrate the magnetic flux towards the rotor pole, which in turns increases the component of force along the motion direction.

The useful force can be also affected by operating conditions. Under saturated conditions and at a high frequency, the flux barriers can exhibit stronger diamagnetic properties to concentrate the magnetic flux towards the rotor pole, compared to in unsaturated conditions. The useful force can keep increasing when the frequency increases. For example, at a higher frequency, e.g., $10^5$ Hz, the horizontal force can increase two orders of magnitude when a drive current increases from 10 Amp*turns (corresponding to an unsaturated operation condition) to 200 Amp*turns (corresponding to a saturated operation condition).

As noted above, a number of teeth per pole can also have an effect on useful force. An increase in the number of teeth per pole can cause gradual increase in the force. However, when a gap size becomes larger, e.g., at 1.0 mm, the force may decrease when the number of teeth per pole increases.

For configurations with flux barriers, each pole set may be operated under pulse-DC or pulse-AC current.

The operation utilizes high-inductance and low-resistance flux barriers, resulting in a high reactance that is in phase with the magnetic field. As the magnetic field climbs through the primary coils and reluctance teeth, the magnetic field is reflected through the shielded teeth and results in high impedance to the magnetic field. This system can be operated through an alternating magnetic signal only through 50% of duty cycle (e.g., from unaligned to aligned). Continuing throughout the duty cycle (e.g., from aligned to unaligned) can result in inverse torque.

A higher reactance flux barrier can also enable a higher power factor system that can generate torque more efficiently compared to a conventional machine. The high reactance, high impedance flux barrier design can prevent substantially all of the magnetic flux from penetrating the flux barriers throughout the entire cycle of operation. In this way, the motor can benefit from diamagnetic properties previously only experienced in super conducting motors at a broad range of temperatures (e.g., room temp-elevated temp). This can also be less sensitive to temp as compared with permanent magnet motors, which tend to demagnetize above a critical temperature.

The motors described above with flux barriers can be driven dynamically with a square wave current. If it is driven dynamically, a square wave may be used at a relatively lower switching frequency than an equivalent sine wave to induce large reactance in the flux barrier while pulsing at a relatively low frequency (such as 50 Hz). This is due in part to the high proportion of harmonic values in a square wave as opposed to a sine wave. This also decreases switching losses required by a power electronic device due to high frequently required by pulse-width modulation (PWM) switching. In such operation, relatively thin (e.g., 0.127 mm) laminations can be used to decrease eddy current loss in core iron and low gauge (e.g., 0.2 mm) or even Litz wire windings can be utilized in the primary coils to decrease skin effect losses in the core windings.

The motors described above can also benefit from higher winding efficiency of the coils. Whereas the typical slot fill ratio of a winding is 30-40% of a given slot area, by utilizing casting techniques to fill flux barriers in slots between adjacent poles the motor can utilize substantially all (e.g., 85-95%) of the slot volume for the flux barriers. This can decrease the amount of total wire necessary for the primary winding of the motor, which can enable the primary winding to use less turns compared to a typical motor.

As noted above, filling the slots with a diamagnetic flux material offers a means to concentrate the magnetic flux in operation of the motor. Specifically, when the stator and rotor are disposed in an unaligned state, significant internal electromagnetic reflection prevents the majority of magnetic communication from the opposing pole surfaces. This diamagnetic shielding allows the field slots to effectively push the rotor while the reluctance of the electromagnetic poles pull the rotor. This effect allows more energy per cycle to be produced from the system and is similar to the effect permanent magnets can produce in certain configurations.

This effect provides a notably advantage over permanent magnets, which may be subject to demagnetization by high eddy currents. This effect may be seen in a B-H curve examining coercivity of a permanent magnet. In the motors described above, a high reactance flux barrier can approximate a permanent magnet in the opposite direction with an infinite coercivity. Thus, the flux barrier can reflect the imposed magnetic field to achieve magnetic field levels beyond what may be achieved in typical permanent magnet motors, which can increase torque density, power density, and efficiency by creating a larger back EMF. Moreover, whereas permanent magnets demagnetize at elevated temperatures as previously mentioned, flux barriers can be constructed of materials capable of withstanding temperatures over 100 degrees Fahrenheit hotter than typical permanent magnets.

Moreover, where permanent magnets produce a constant magnetic field, the diamagnetic flux barrier exists dynamically in a transient state. This benefits both efficiency and safety, as permanent magnet motors can result in dent torque, cogging torque, and braking torque, which can sometimes be catastrophic due to the EMF that can be produced whether or not power it utilized. The above motors can be controlled to effectively freewheel for long periods of time, with losses only from the resistance of the bearings.

Further, unlike an IM having significant inductive load that generates a continuous current, the current in each flux barrier is allowed to go back to near zero each cycle. The higher the operating frequency of the motor, the lower the necessary current is required in each flux barrier to maintain reflection. Because the system is reactive, energy is either returned elastically or translated into kinetic energy of the rotor in each switching cycle.

The diamagnetic flux barrier slot filling can be tuned, both for a given application and dynamically during operation. Unlike air, the magnetic properties of the system can be tuned, both in amplitude of magnetomotive force (MMF) for a given position, and in frequency of the MMF. This allows for real time adaptation by weakening or strengthening the magnetic flux properties of the system by changing the switching frequency of the motor. This can change the back-EMF on the primary coil, which can allow the motor to achieve broader speed ranges than traditional motors. Traditional motors have a fixed back-EMF based on a fixed saliency ratio, which is used to change the magnitude of magnetic field. The motor can change the magnitude of the magnetic field, in addition to the activating frequency of the motor's operation.

At higher speeds, the motor can operate as a reactive reluctance motor. In conventional SRM operation, peak voltage is applied at onset of the unaligned position of stator and rotor (or the stator-rotor teeth) and current is rapidly increased until the stator and rotor (or the stator-rotor teeth) reach a point of alignment. At this point, a reverse voltage is applied and current then drops to zero. In a locked rotor (stall) condition in a conventional SRM, current is continuously applied rather than pulsed. In a motor with flux barriers, during stall current is pulsed through an active coil. Once pole switching frequency exceeds the cross-over frequency of the flux barriers during motor acceleration, each pole may be excited by a single pulse.

Example Process

Implementations of the present disclosure provide a method of driving an electric motor. The electric motor can be the electric motor 102 of FIG. 1, and the method can be performed by a motor controller, e.g., the motor controller 104 of FIG. 1.

During operation, the motor controller energizes a first active pole of a series of active poles disposed along an air gap between the series of active poles and a passive magnetic component having a series of passive poles disposed along the air gap, by pulsing current through an electrical winding associated with the first active pole. The pulsed current includes a sequence of at least three pulses during which sequence windings of adjacent active poles of the series of active poles are not energized. Pulsing current through the electrical winding associated with the first active pole can cause current to pass through the electrical winding associated with the first active pole according to a current waveform in which a ratio of a maximum current to a minimum current during pulsing of current through the electrical winding associated with the first active pole is at least 4:1, 7:1, or even 10:1.

In some cases, the electrical winding associated with the first active pole includes multiple coils conductively connected in parallel and wound about a common core. The motor controller can pulse the current through the multiple coils conductively connected in parallel.

Figure 2A:
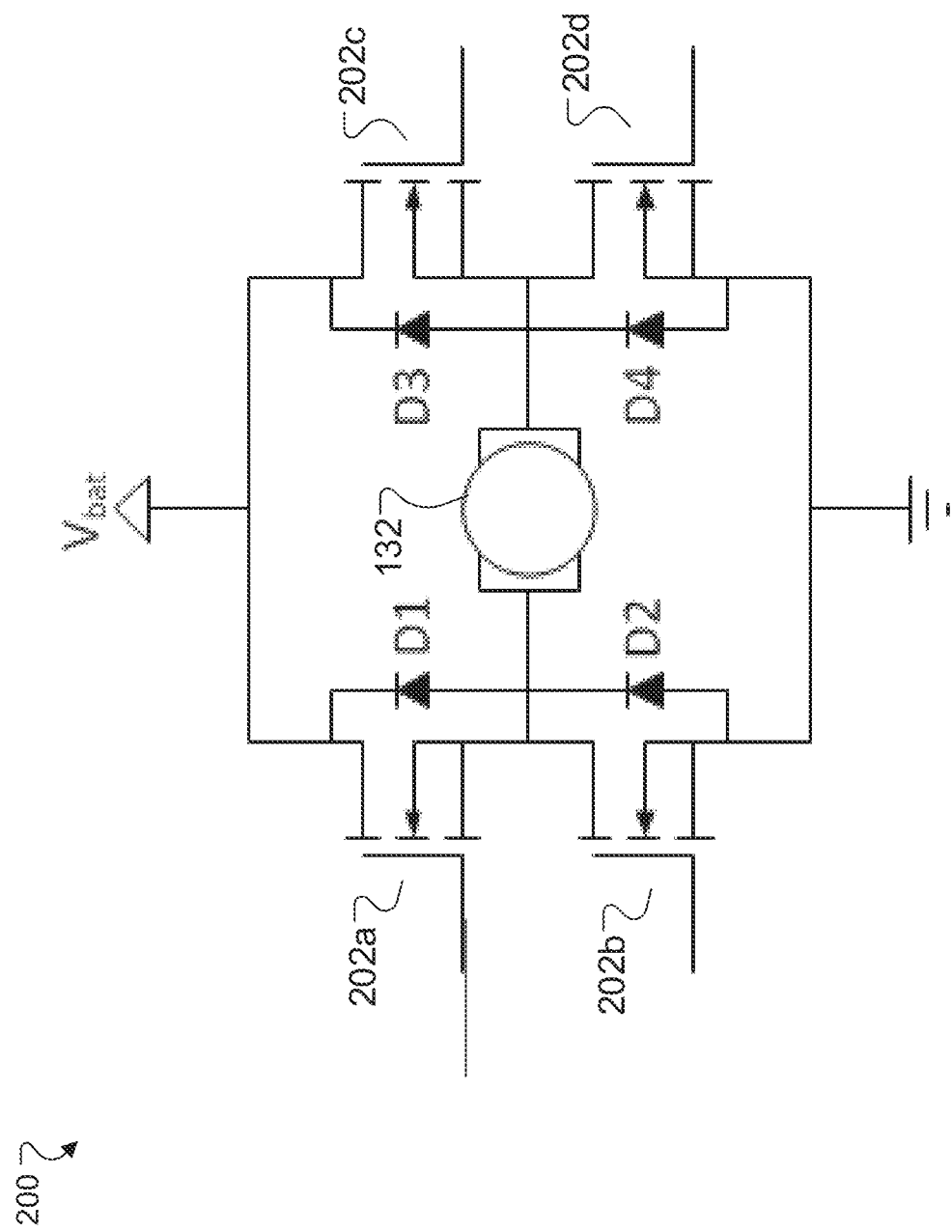
FIG. 2A is a schematic illustration of an example power switch for an electrical winding.

In some examples, the motor controller pulses the current through the electrical winding associated with the first active pole by operating a first switch to open and close in multiple cycles between a voltage source and the electrical winding associated with the first active pole. The first switch can be associated with the first active pole and conductively coupled to the first active pole. The first switch can be the switch 134 of FIG. 2 or the power switch 200 of FIG. 2A.

After the first active pole has been energized (by multiple current pulses), the motor controller then energizes a second active pole of the series of active poles, by pulsing current through an electrical winding associated with the second active pole. The pulsed current for the second active pole also includes a sequence of at least three pulses during which sequence the winding of the first active pole is not energized, causing current to pass through the electrical winding associated with the second active pole according to a current waveform. In the current waveform, a ratio of a maximum current to a minimum current during pulsing of current through the electrical winding associated with the second active pole is at least 4:1, 7:1, or even 10:1.

The first active pole can be energized by pulsing current at a pulse frequency of between 2 Hz and 1 MHz, in some cases between 10 Hz and 20 kHz, and in some cases between 100 Hz and 5 kHz. Energizing the first active pole and then energizing the second active pole can generate a first force between the first active pole and a passive pole across the air gap from the first active pole, and a second force between the second active pole and a passive pole across the air gap from the second active pole. The first and second forces can induce a relative motion between the active poles and the passive poles. The relative motion can include a motion of the passive magnetic component with respect to the active poles.

In some examples, the passive magnetic component is a rotor of the motor, and the relative motion includes rotation of the rotor. The motor controller can further detect a rotor speed and control a frequency of the pulsed current (or the pulse frequency) as a function of the detected rotor speed. The motor controller can further maintain a current pulse frequency during rotor speed changes, up to at least a rotor speed at which a frequency at which each active pole is energized is at least one-half the pulse frequency. The current can be pulsed through the electrical windings associated with the first and second poles only below a rotor speed corresponding to one pulse per pole energization.

After energizing the second active pole, the motor controller can energize a third active pole of the series of active poles, disposed on an opposite side of the second active pole than the first active pole, by pulsing current through an electrical winding associated with the third active pole, including a sequence of at least three pulses during which sequence the windings of the first and second active poles are not energized. After energizing the third active pole, the motor controller can again energize the first active pole by pulsing current through the electrical winding associated with the first active pole, and then again energize the second active pole by pulsing current through the electrical winding associated with the second active pole, and then again energizing the third active pole, and so on.

As noted above, flux barriers can be implemented in the passive magnetic component. In some examples, pulsing the current through the electrical winding associated with the first active pole generates eddy current in a first flux barrier adjacent a passive pole across the air gap from the first active pole. The flux barrier has an electrical conductivity higher than the passive pole across the air gap. The passive magnetic component can further include a second flux barrier, with the passive pole across the air gap from the first active pole disposed between the first and second flux barriers. The first and second flux barriers are electrically isolated from one another external to the passive poles.

In some motors, the passive poles are formed by a stack of layers of magnetically permeable material. The eddy current in the first flux barrier acts to repel magnetic flux from the first active pole. In some examples, the first flux barrier is disposed between the passive pole across the air gap from the first active pole and an adjacent passive pole, and the flux barrier forms a conductive loop of an electrically conductive material about a core of a core material more magnetically permeable than the electrically conductive material.

In some cases, the passive magnetic component further includes flux barriers between adjacent pairs of passive poles of the series of passive poles, and the flux barriers each include an electrically conductive material differing from material forming the passive poles and defining at least one electrically conductive path about magnetically permeable core material. The flux barriers are electrically isolated from one another external to the series of passive poles. Adjacent flux barriers can be arranged such that any conductive path defined within the electrically conductive material of one flux barrier does not encircle any portion of any conductive path defined within the electrically conductive material of another flux barrier.

In some implementations, the motor further includes flux shields extending along opposite edges of each active pole and formed of a material having a greater electrical conductivity than material of the active pole disposed between the flux shields. The flux shields can extend into gaps between adjacent electrical windings. The flux shields can extend from the air gap to a magnetically permeable yoke connecting adjacent active poles.

Example Cooling and Heat Mitigation

Electric motors can generate significant heat during operation and require cooling, especially during higher frequency operation. An active cooling system can be used to provide intermittent or continuous cooling of surface by circulating a fluid coolant through the motor. The cooling system can be the cooling system as described in pending patent application Ser. No. 62/675,207, filed on May 23, 2018 and entitled "Electric Motor," the contents of which are expressly incorporated herein by reference as if set forth in their entirety.

Also, if operating temperatures are depressed, the efficiency and power of a flux barrier can increase for a given frequency. Typically operating conditions are −80° C. to 300° C. Coolant may be added to the motor system to further suppress the temperature and increase the diamagnetic properties of a flux barrier.

A coolant may be any conventional fluid used for heat mitigation. At operating conditions, the coolant may be a low viscosity fluid in the range of 1 to 500 centipoise, such as water or motor oil to allow for both high cooling efficiency and rotational dynamics. Coolant may also provide the damping of vibration generated during operation, as well as providing restorative force to harmonics that are generated at higher rotational speeds.

Active cooling may enable greater power density by providing a medium to absorb heat from electrical coils and mechanical contact surfaces. An active lubrication system may be used to provide intermittent or continuous lubrication of surface by circulating a fluid lubricant through the motor. For example, a fluid pump may mechanically promote a lubricant to flow from the fluid pump to the motor via fluid lines, where it may be discharged via directional nozzles to provide active lubrication and/or fluid cooling to specific locations within the motor. Fluid may then gravitationally collect in an oil pan at the base of the motor and flow via a return fluid line back to the pump for recirculation. In this way, a motor rotor assembly may operate in a cool, non-submerged environment. In addition, a portion of the lubricant may pass through a heat exchanger to add or remove heat from the lubricant in order to modulate the temperature and/or viscosity of the lubricant to meet the specific needs of an application.

A coolant may be any conventional fluid used for heat mitigation. At operating conditions, the coolant may be a low viscosity fluid in the range of 1 to 500 centipoise, such as water or motor oil to allow for both high cooling efficiency and rotational dynamics. Coolant may also provide the dampening of vibration generated during operation, as well as providing restorative force to harmonics that are generated at higher rotational speeds.

The motor may include a collection pan to gravitationally collect the coolant discharged within the motor assembly and direct it toward a return fluid line.

The coolant system may have a fluid pump that provides a pressure gradient to the coolant resulting in circulation through the fluid system. Such a pump may be a fixed displacement pump, such as a rotary pump, or a variable displacement pumps, such as a gear or piston pump. The pump may be operationally connected to a mechanical or electrical power source and may be operated continuously or intermittently during motor operation. A wet sump active lubrication system may have a single fluid pump operationally connected to a collection pan to circulate oil through fluid lines and within the cooled system. In this case, the majority of the oil supply is located in the collection pan. Alternatively, multiple fluid pumps may be operated in a dry sump active coolant configuration where fluid from the collection pan is continuously pumped into a holding tank, preferably with a large height relative to its cross-sectional area, and a second pump may pump the fluid under a separate, controlled flow rate back to the motor to complete coolant circulation.

The coolant system may have one or more directional nozzles to direct coolant to specific locations within the motor assembly including, for example, the stator poles.

Other Embodiments

Any of the above-described motors can be controlled to generate electrical energy from dynamic energy (such as for regeneratively braking the motor). This may be accomplished by altering the timing of the excitation signal such that stator current is pulsed at the point of minimum air gap (or even slightly lagging the point of minimum air gap) to generate forward EMF during expansion. In this manner, electrical current can be generated and directed to storage in an associated battery while a deceleration torque is applied to the rotor to slow the motor, even though the motor is not mechanically back drivable by torque applied to the output shaft.

Any of the above-described motors can be controlled to generate electrical energy from dynamic energy (such as for regeneratively braking the motor). This may be accomplished by altering the timing of the compression wave such that stator current is pulsed at the point of minimum air gap (or even slightly lagging the point of minimum air gap) to generate forward EMF during expansion. In this manner, electrical current can be generated and directed to storage in an associated battery while a deceleration torque is applied to the rotor to slow the motor, even though the motor is not mechanically backdrivable by torque applied to the output shaft.

While a number of examples have been described for illustration purposes, the foregoing description is not intended to limit the scope of the invention, which is defined by the scope of the appended claims. There are and will be other examples and modifications within the scope of the following claims.

What is claimed is:

1. An electric motor comprising:
   a stator defining multiple stator poles with associated electrical windings; and
   a rotor comprising multiple rotor poles, the rotor movable with respect to the stator and defining, together with the stator, a nominal gap between the stator poles and the rotor poles, the rotor poles comprising a magnetically permeable pole material;
   wherein the rotor comprises flux barriers between adjacent rotor poles, the flux barriers each comprising a second material having an electrical conductivity different than the magnetically permeable pole material;
   wherein the flux barriers are electrically isolated from one another external to the rotor poles;
   wherein the stator comprises an active magnetic component with multiple active poles associated with the electrical windings;
   wherein the rotor comprises a passive magnetic component defining a series of spaced-apart passive poles of the magnetically permeable pole material defining slots therebetween, the slots extending at a non-zero angle to a first direction;

wherein each slot contains a respective flux barrier comprising the second material extending along the slot and forming an electrically conductive path along the slot; and wherein the flux barriers are secured to the magnetically permeable pole material within the slots and are connected to each other only through the magnetically permeable pole material; and a motor controller comprising multiple switches coupled to respective electrical windings or sets of windings of the active magnetic component, wherein the motor controller is configured to:
   sequentially operate the switches for respective pole energization duty cycles to generate magnetic flux across the nominal gap between the active poles and passive poles; and
   during an energization duty cycle of each active pole, to pulse current through the winding of the active pole, including a sequence of at least three pulses during which sequence windings of adjacent active poles are not energized.

2. The electric motor of claim 1, wherein the electrical conductivity of the flux barriers is greater than the electrical conductivity of the magnetically permeable pole material.

3. The electric motor of claim 1, wherein the magnetically permeable pole material of the rotor poles comprise a stack of layers of ferromagnetic material separated from one another, at least at a surface of the rotor, by interfaces less electrically conductive than the ferromagnetic material.

4. The electric motor of claim 1,
   wherein the passive magnetic component comprises multiple passive poles comprising magnetically permeable pole material;
   wherein the passive magnetic component further comprises the flux barriers connecting adjacent passive poles of the passive magnetic component, the flux barriers each comprising an electrically conductive material differing from the magnetically permeable pole material and defining at least one electrically conductive path about the magnetically permeable pole material; and
   wherein adjacent flux barriers are arranged such that any conductive path defined within the electrically conductive material of any flux barrier does not encircle any portion of any conductive path defined within the electrically conductive material of another flux barrier.

5. The electric motor of claim 1, wherein the electrical windings of the motor are configured such that a ratio of maximum and minimum current through the winding of an energized active pole during current pulsing is at least 4:1.

6. The electric motor of claim 1, wherein the second material of each flux barrier forms an electrically conductive loop about a respective rotor pole.

7. The electric motor of claim 6, wherein the loop defines a capacitance.

8. The electric motor of claim 7, wherein the capacitance is formed at a discrete location along the loop.

9. An electric motor comprising:
   a stator defining multiple stator poles with associated electrical windings; and
   a rotor comprising multiple rotor poles, the rotor movable with respect to the stator and defining, together with the stator, a nominal gap between the stator poles and the rotor poles, the rotor poles being of a stack of layers of ferromagnetic material separated from one another, at least at a surface of the rotor, by interfaces less electrically conductive than the ferromagnetic material;
   wherein the rotor comprises a plurality of conductors arranged about the rotor, wherein adjacent conductors are arranged such that any conductive path defined by the conductor does not encircle any portion of any conductive path defined within electrically conductive material of another conductor;
   wherein the conductors are electrically isolated from one another external to the ferromagnetic material;
   wherein the stator comprises an active magnetic component with multiple active poles associated with the electrical windings;
   wherein the rotor comprises a passive magnetic component defining a series of spaced-apart passive poles of the ferromagnetic material defining spaced-apart pole surface regions of a first material;
   wherein the passive magnetic component comprises magnetically permeable material defining internal paths connecting respective adjacent pairs of the pole surface regions on opposite sides of respective inter-pole surface regions; and
   wherein the inter-pole surface regions comprise an electrically conductive, low energy product second material and are each electrically isolated from one another external to the magnetically permeable material.

10. The electric motor of claim 9 further comprising a motor controller comprising multiple switches coupled to respective electrical windings or sets of windings of the active magnetic component, wherein the motor controller is configured to:
   sequentially operate the switches for respective pole energization duty cycles to generate magnetic flux across the nominal gap between the active poles and passive poles; and,
   during an energization duty cycle of each active pole, to pulse current through the winding of the active pole, including a sequence of at least three pulses during which sequence windings of adjacent active poles are not energized; and
   wherein the electrical windings of the motor are configured such that a ratio of maximum and minimum current through the winding of an energized active pole during current pulsing is at least 4:1.

11. The electric motor of claim 9, wherein the conductor forms an electrically conductive loop about a respective pole.

12. The electric motor of claim 11, wherein the loop defines a capacitance.

13. The electric motor of claim 12, wherein the capacitance is formed at a discrete location along the loop.

14. A method of driving an electric motor, the method comprising:
   energizing a first active pole of a series of active poles disposed along an air gap between the series of active poles and a passive magnetic component having a series of passive poles disposed along the air gap, by pulsing current through an electrical winding associated with the first active pole, including a sequence of at least three pulses during which sequence windings of adjacent active poles of the series of active poles are not energized; and then
   energizing a second active pole of the series of active poles, by pulsing current through an electrical winding associated with the second active pole, including a sequence of at least three pulses during which sequence the winding of the first active pole is not energized, causing current to pass through the electrical winding associated with the second active pole according to a current waveform in which a ratio of a maximum current to a minimum current during pulsing of current through the electrical winding associated with the second active pole is at least 4:1.

15. The method of claim 14, further comprising detecting rotor speed and controlling a frequency of the pulsed current as a function of the detected rotor speed.

16. The method of claim 15, further comprising maintaining current pulse frequency during rotor speed changes, up to at least a rotor speed at which a frequency at which each active pole is energized is at least one-half the pulse frequency.

17. The method of claim 14, wherein pulsing current through the electrical winding associated with a first active pole generates eddy current in a first flux barrier adjacent a passive pole across the air gap from the first active pole, the flux barrier having an electrical conductivity higher than the passive pole across the air gap.

* * * * *